(12) United States Patent
Low et al.

(10) Patent No.: US 8,938,062 B2
(45) Date of Patent: *Jan. 20, 2015

(54) METHOD FOR ACCESSING SERVICE RESOURCE ITEMS THAT ARE FOR USE IN A TELECOMMUNICATIONS SYSTEM

(75) Inventors: Colin Low, Gloucestershire (GB); Andrew Franklin Seaborne, Bristol (GB); Nicolas Bouthors, Les Bealires (FR)

(73) Assignee: Comcast IP Holdings I, LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/525,454

(22) Filed: Jun. 18, 2012

(65) Prior Publication Data
US 2012/0250842 A1   Oct. 4, 2012

Related U.S. Application Data

(60) Continuation of application No. 13/369,754, filed on Feb. 9, 2012, now Pat. No. 8,223,752, which is a continuation of application No. 12/852,787, filed on Aug. 9, 2010, now Pat. No. 8,204,046, which is a
(Continued)

(30) Foreign Application Priority Data

Dec. 11, 1995  (GB) .................................. 9525190.6
Dec. 22, 1995  (EP) .................................... 95410148
Feb. 20, 1996  (GB) .................................. 9603582.9

(51) Int. Cl.
*H04M 3/00*  (2006.01)
*H04L 29/12*  (2006.01)
(Continued)

(52) U.S. Cl.
CPC ...... *H04L 29/12066* (2013.01); *H04L 12/2856* (2013.01); *H04L 12/2867* (2013.01);
(Continued)

(58) Field of Classification Search
USPC ...................... 379/93.01, 221.08; 395/200.12; 370/352, 401; 455/33.1
See application file for complete search history.

(56) References Cited

U.S. PATENT DOCUMENTS 4,051,326 A   9/1977  Badagnani et al.
4,054,756 A   10/1977 Comella et al.
(Continued)

FOREIGN PATENT DOCUMENTS

DE   3333511 A1   4/1985
DE   4337055 A1   5/1994
(Continued)

OTHER PUBLICATIONS

RFC#1464, Rosenbaum, Using the Domain Name System to Store Arbitrary String Attributes, May 1993, 5 pages.
(Continued)

*Primary Examiner* — Fan Tsang
*Assistant Examiner* — Van D Huynh
(74) *Attorney, Agent, or Firm* — Banner & Witcoff, Ltd.

(57) ABSTRACT

Service resource items for use in call setup in a telephone system are held on servers that are connected to a computer network which is logically distinct from the telephone system infrastructure; this computer network may, for example, make use of the Internet. Each service item is locatable on the network at a corresponding URI and is associated with a particular telephone number. A mapping is provided between telephone numbers and the URIs of associated service resource items. When it is desired to access a service resource item associated with a particular telephone number, this mapping is used to retrieve the corresponding URI which is then used to access the desired service resource item.

34 Claims, 14 Drawing Sheets

Related U.S. Application Data continuation of application No. 11/066,880, filed on Feb. 25, 2005, now Pat. No. 7,804,816, which is a division of application No. 10/052,285, filed on Jan. 18, 2002, now Pat. No. 7,012,916, which is a division of application No. 09/077,795, filed as application No. PCT/GB96/03055 on Dec. 11, 1996, now Pat. No. 6,466,570.

(51) Int. Cl.

| | |
|---|---|
| H04L 12/28 | (2006.01) |
| H04L 29/06 | (2006.01) |
| H04M 3/42 | (2006.01) |
| H04M 3/493 | (2006.01) |
| H04M 7/00 | (2006.01) |
| H04Q 3/00 | (2006.01) |
| H04M 3/428 | (2006.01) |
| H04M 3/48 | (2006.01) |
| H04M 3/51 | (2006.01) |
| H04M 3/523 | (2006.01) |
| H04M 3/533 | (2006.01) |
| H04M 3/54 | (2006.01) |
| H04M 7/12 | (2006.01) |

(52) U.S. Cl.
CPC .......... *H04L29/06* (2013.01); *H04L 29/06027* (2013.01); *H04L 29/12018* (2013.01); *H04L 29/1216* (2013.01); *H04L 29/12594* (2013.01); *H04L 61/10* (2013.01); *H04L 61/1511* (2013.01); *H04L 61/157* (2013.01); *H04L 61/301* (2013.01); *H04L 61/303* (2013.01); *H04M 3/4228* (2013.01); *H04M 3/4938* (2013.01); *H04M 7/0009* (2013.01); *H04M 7/003* (2013.01); *H01M 7/006* (2013.01); *H04Q 3/0029* (2013.01); *H04Q 3/005* (2013.01); *H04L 65/1069* (2013.01); *H04L 61/308* (2013.01); *H04M 3/42* (2013.01); *H04M 3/42161* (2013.01); *H04M 3/42229* (2013.01); *H04M 3/428* (2013.01); *H04M 3/48* (2013.01); *H04M 3/5191* (2013.01); *H04M 3/523* (2013.01); *H04M 3/533* (2013.01); *H04M 3/54* (2013.01); *H04M 7/12* (2013.01); *H04M 2201/60* (2013.01); *H04M 2203/1041* (2013.01); *H04Q 2213/13097* (2013.01); *H04Q 2213/13102* (2013.01); *H04Q 2213/13106* (2013.01); *H04Q 2213/13109* (2013.01); *H04Q 2213/13141* (2013.01); *H04Q 2213/13175* (2013.01); *H04Q 2213/13176* (2013.01); *H04Q 2213/13204* (2013.01); *H04Q 2213/13209* (2013.01); *H04Q 2213/13282* (2013.01); *H04Q 2213/13298* (2013.01); *H04Q 2213/13332* (2013.01); *H04Q 2213/13345* (2013.01); *H04Q 2213/13349* (2013.01); *H04Q 2213/13389* (2013.01); *H04Q 2213/13405* (2013.01); *H04Q 2213/13504* (2013.01); *H04Q 2213/13526* (2013.01); *H04Q 2213/13527* (2013.01); *H04Q 2213/13528* (2013.01); *H04Q 2213/13534* (2013.01); *H04Q 2213/13546* (2013.01); *Y10S 379/90* (2013.01); *H01L 67/16* (2013.01); *H04L 69/16* (2013.01)
USPC ............ 379/243; 379/230; 370/352; 379/900

(56) References Cited

U.S. PATENT DOCUMENTS

| | | |
|---|---|---|
| 4,076,964 A | 2/1978 | Henrion et al. |
| 4,100,377 A | 7/1978 | Flanagan |
| 4,160,129 A | 7/1979 | Peyser et al. |
| 4,191,860 A | 3/1980 | Weber |
| 4,201,891 A | 5/1980 | Lawrence et al. |
| 4,258,387 A | 3/1981 | Lemelson et al. |
| 4,310,727 A | 1/1982 | Lawser |
| 4,313,035 A | 1/1982 | Jordan et al. |
| 4,313,036 A | 1/1982 | Jabara et al. |
| 4,345,315 A | 8/1982 | Cadotte et al. |
| 4,360,910 A | 11/1982 | Segal et al. |
| 4,371,751 A | 2/1983 | Hilligoss, Jr. et al. |
| 4,371,752 A | 2/1983 | Matthews et al. |
| 4,375,097 A | 2/1983 | Ulug |
| 4,464,543 A | 8/1984 | Kline et al. |
| 4,511,762 A | 4/1985 | Stockdale |
| 4,539,676 A | 9/1985 | Lucas |
| 4,555,594 A | 11/1985 | Friedes et al. |
| 4,565,903 A | 1/1986 | Riley |
| 4,577,066 A | 3/1986 | Bimonte et al. |
| 4,585,906 A | 4/1986 | Matthews et al. |
| 4,589,107 A | 5/1986 | Middleton et al. |
| 4,602,129 A | 7/1986 | Matthews et al. |
| 4,609,778 A | 9/1986 | Franklin et al. |
| 4,611,094 A | 9/1986 | Asmuth et al. |
| 4,611,096 A | 9/1986 | Asmuth et al. |
| 4,625,081 A | 11/1986 | Lotito et al. |
| 4,630,262 A | 12/1986 | Callens et al. |
| 4,652,700 A | 3/1987 | Matthews et al. |
| 4,653,045 A | 3/1987 | Stanley et al. |
| 4,653,090 A | 3/1987 | Hayden |
| 4,659,877 A | 4/1987 | Dorsey et al. |
| 4,672,700 A | 6/1987 | Poncy |
| 4,679,190 A | 7/1987 | Dias et al. |
| 4,685,125 A | 8/1987 | Zave |
| 4,694,483 A | 9/1987 | Cheung |
| 4,707,826 A | 11/1987 | Froggatt |
| 4,710,917 A | 12/1987 | Tompkins et al. |
| 4,713,806 A | 12/1987 | Oberlander et al. |
| 4,718,005 A | 1/1988 | Feigenbaum et al. |
| 4,723,238 A | 2/1988 | Isreal et al. |
| 4,730,071 A | 3/1988 | Schoenthal et al. |
| 4,734,931 A | 3/1988 | Bourg et al. |
| 4,741,820 A | 5/1988 | Coughlin et al. |
| 4,747,130 A | 5/1988 | Ho |
| 4,748,618 A | 5/1988 | Brown et al. |
| 4,765,924 A | 8/1988 | Inoue et al. |
| 4,766,604 A | 8/1988 | Axberg |
| 4,771,425 A | 9/1988 | Baran et al. |
| 4,782,485 A | 11/1988 | Gollub |
| 4,788,718 A | 11/1988 | McNabb et al. |
| 4,790,003 A | 12/1988 | Kepley et al. |
| 4,809,272 A | 2/1989 | Torgrim et al. |
| 4,817,050 A | 3/1989 | Komatsu et al. |
| 4,821,034 A | 4/1989 | Anderson et al. |
| 4,823,373 A | 4/1989 | Takahashi et al. |
| 4,827,500 A | 5/1989 | Binkerd et al. |
| 4,829,324 A | 5/1989 | Drake et al. |
| 4,837,798 A | 6/1989 | Cohen et al. |
| 4,852,149 A | 7/1989 | Zwick et al. |
| 4,852,151 A | 7/1989 | Dittakavi et al. |
| 4,865,763 A | 9/1989 | Inoue et al. |
| 4,866,758 A | 9/1989 | Heinzelmann |
| 4,866,763 A | 9/1989 | Cooper et al. |
| 4,872,157 A | 10/1989 | Hemmady et al. |
| 4,872,159 A | 10/1989 | Hemmady et al. |
| 4,872,160 A | 10/1989 | Hemmady et al. |
| 4,872,197 A | 10/1989 | Pemmaraju |
| 4,875,206 A | 10/1989 | Nichols et al. |
| 4,877,949 A | 10/1989 | Danielson et al. |
| 4,882,476 A | 11/1989 | White |
| 4,885,739 A | 12/1989 | Read et al. |
| 4,893,248 A | 1/1990 | Pitts et al. |
| 4,893,302 A | 1/1990 | Hemmady et al. |
| 4,894,824 A | 1/1990 | Hemmady et al. |

(56) References Cited

U.S. PATENT DOCUMENTS

| | | |
|---|---|---|
| 4,897,866 A | 1/1990 | Majmudar et al. |
| 4,897,874 A | 1/1990 | Lidinsky et al. |
| 4,899,333 A | 2/1990 | Roediger |
| 4,899,373 A | 2/1990 | Lee et al. |
| 4,903,260 A | 2/1990 | Boettle et al. |
| 4,903,261 A | 2/1990 | Baran et al. |
| 4,904,100 A | 2/1990 | Enix |
| 4,907,277 A | 3/1990 | Callens et al. |
| 4,907,724 A | 3/1990 | Wing, Jr. et al. |
| 4,910,794 A | 3/1990 | Mahany |
| 4,916,691 A | 4/1990 | Goodman |
| 4,918,722 A | 4/1990 | Duehren et al. |
| 4,922,348 A | 5/1990 | Gillon et al. |
| 4,922,486 A | 5/1990 | Lidinsky et al. |
| 4,922,529 A | 5/1990 | Kiel |
| 4,924,510 A | 5/1990 | Le |
| 4,933,931 A | 6/1990 | Kokubo |
| 4,937,676 A | 6/1990 | Finelli et al. |
| 4,942,574 A | 7/1990 | Zelle |
| 4,958,341 A | 9/1990 | Hemmady et al. |
| 4,961,088 A | 10/1990 | Gilliland et al. |
| 4,969,184 A | 11/1990 | Gordon et al. |
| 4,970,723 A | 11/1990 | Lin |
| 4,972,504 A | 11/1990 | Daniel, Jr. et al. |
| 4,977,556 A | 12/1990 | Noguchi |
| 4,979,206 A | 12/1990 | Padden et al. |
| 4,979,207 A | 12/1990 | Baum et al. |
| 4,995,074 A | 2/1991 | Goldman et al. |
| 4,996,685 A | 2/1991 | Farese et al. |
| 4,996,707 A | 2/1991 | O'Malley et al. |
| D315,573 S | 3/1991 | Schultz et al. |
| 5,008,906 A | 4/1991 | Reichwein |
| 5,008,926 A | 4/1991 | Misholi |
| 5,009,337 A | 4/1991 | Bimbi |
| 5,012,511 A | 4/1991 | Hanle et al. |
| 5,014,266 A | 5/1991 | Bales et al. |
| 5,018,191 A | 5/1991 | Catron et al. |
| 5,019,699 A | 5/1991 | Koenck |
| 5,023,868 A | 6/1991 | Davidson et al. |
| 5,025,254 A | 6/1991 | Hess |
| 5,027,388 A | 6/1991 | Bradshaw et al. |
| 5,029,196 A | 7/1991 | Morganstein |
| 5,029,199 A | 7/1991 | Jones et al. |
| 5,029,200 A | 7/1991 | Haas et al. |
| 5,031,098 A | 7/1991 | Miller et al. |
| 5,034,975 A | 7/1991 | Grimes |
| 5,041,972 A | 8/1991 | Frost |
| 5,042,027 A | 8/1991 | Takase et al. |
| 5,046,088 A | 9/1991 | Margulies |
| 5,052,020 A | 9/1991 | Koenck et al. |
| 5,052,943 A | 10/1991 | Davis |
| 5,062,103 A | 10/1991 | Davidson et al. |
| 5,065,393 A | 11/1991 | Sibbitt et al. |
| 5,068,888 A | 11/1991 | Scherk et al. |
| 5,070,536 A | 12/1991 | Mahany et al. |
| 5,072,442 A | 12/1991 | Todd |
| 5,075,771 A | 12/1991 | Hashimoto |
| 5,088,052 A | 2/1992 | Spielman et al. |
| 5,091,905 A | 2/1992 | Amada |
| 5,097,528 A | 3/1992 | Gursahaney et al. |
| 5,098,877 A | 3/1992 | Coughlin et al. |
| 5,103,449 A | 4/1992 | Jolissaint |
| 5,107,492 A | 4/1992 | Roux et al. |
| 5,113,430 A | 5/1992 | Richardson, Jr. et al. |
| 5,113,499 A | 5/1992 | Ankney et al. |
| 5,115,431 A | 5/1992 | Williams et al. |
| 5,115,495 A | 5/1992 | Tsuchiya et al. |
| 5,123,064 A | 6/1992 | Hacker et al. |
| 5,131,020 A | 7/1992 | Liebesny et al. |
| 5,134,647 A | 7/1992 | Pugh et al. |
| 5,136,707 A | 8/1992 | Block et al. |
| 5,140,626 A | 8/1992 | Ory et al. |
| 5,144,282 A | 9/1992 | Sutterlin et al. |
| 5,144,340 A | 9/1992 | Hotomi et al. |
| 5,146,488 A | 9/1992 | Okada et al. |
| 5,146,491 A | 9/1992 | Silver et al. |
| 5,153,738 A | 10/1992 | Stemmle |
| 5,155,484 A | 10/1992 | Chambers, IV |
| 5,155,502 A | 10/1992 | Kimura et al. |
| 5,155,761 A | 10/1992 | Hammond |
| 5,157,390 A | 10/1992 | Yoshie et al. |
| 5,157,662 A | 10/1992 | Tadamura et al. |
| 5,159,592 A | 10/1992 | Perkins |
| 5,159,624 A | 10/1992 | Makita |
| 5,163,055 A | 11/1992 | Lee et al. |
| 5,163,080 A | 11/1992 | Amoroso et al. |
| 5,164,938 A | 11/1992 | Jurkevich et al. |
| 5,179,936 A | 1/1993 | O'Hara et al. |
| 5,180,232 A | 1/1993 | Chadima, Jr. et al. |
| 5,181,236 A | 1/1993 | LaVallee et al. |
| 5,182,748 A | 1/1993 | Sakata et al. |
| 5,185,785 A | 2/1993 | Funk et al. |
| 5,185,860 A | 2/1993 | Wu |
| 5,187,710 A | 2/1993 | Chau et al. |
| 5,191,410 A | 3/1993 | McCalley et al. |
| 5,193,110 A | 3/1993 | Jones et al. |
| 5,195,085 A | 3/1993 | Bertsch et al. |
| 5,195,086 A | 3/1993 | Baumgartner et al. |
| 5,195,128 A | 3/1993 | Knitl |
| 5,195,183 A | 3/1993 | Miller et al. |
| 5,197,127 A | 3/1993 | Waclawsky et al. |
| 5,199,062 A | 3/1993 | Von Meister et al. |
| 5,200,993 A | 4/1993 | Wheeler et al. |
| 5,202,817 A | 4/1993 | Koenck et al. |
| 5,202,825 A | 4/1993 | Miller et al. |
| 5,204,894 A | 4/1993 | Darden |
| 5,206,901 A | 4/1993 | Harlow et al. |
| 5,206,903 A | 4/1993 | Kohler et al. |
| 5,208,809 A | 5/1993 | Fergeson et al. |
| 5,208,848 A | 5/1993 | Pula |
| 5,208,908 A | 5/1993 | Harrison et al. |
| 5,215,011 A | 6/1993 | Monney |
| 5,216,233 A | 6/1993 | Main et al. |
| 5,218,187 A | 6/1993 | Koenck et al. |
| 5,218,188 A | 6/1993 | Hanson |
| 5,223,699 A | 6/1993 | Flynn et al. |
| 5,223,820 A | 6/1993 | Sutterlin et al. |
| 5,225,071 A | 7/1993 | Coughlin et al. |
| 5,226,075 A | 7/1993 | Funk et al. |
| 5,227,614 A | 7/1993 | Danielson et al. |
| 5,228,076 A | 7/1993 | Hopner et al. |
| 5,231,492 A | 7/1993 | Dangi et al. |
| 5,235,317 A | 8/1993 | Sutterlin et al. |
| 5,237,604 A | 8/1993 | Ryan |
| 5,239,542 A | 8/1993 | Breidenstein et al. |
| 5,239,677 A | 8/1993 | Jasinski |
| 5,241,588 A | 8/1993 | Babson, III et al. |
| 5,243,645 A | 9/1993 | Bissell et al. |
| 5,243,654 A | 9/1993 | Hunter |
| 5,245,533 A | 9/1993 | Marshall |
| 5,247,347 A | 9/1993 | Litteral et al. |
| 5,247,571 A | 9/1993 | Kay et al. |
| 5,253,341 A | 10/1993 | Rozmanith et al. |
| 5,254,971 A | 10/1993 | Sutterlin et al. |
| 5,255,314 A | 10/1993 | Applegate et al. |
| 5,260,986 A | 11/1993 | Pershan |
| 5,262,760 A | 11/1993 | Iwamura et al. |
| 5,263,080 A | 11/1993 | Jones et al. |
| 5,265,033 A | 11/1993 | Vajk et al. |
| 5,265,155 A | 11/1993 | Castro |
| 5,268,957 A | 12/1993 | Albrecht |
| 5,272,749 A | 12/1993 | Masek |
| 5,274,696 A | 12/1993 | Perelman |
| 5,274,700 A | 12/1993 | Gechter et al. |
| 5,276,731 A | 1/1994 | Arbel et al. |
| 5,280,159 A | 1/1994 | Schultz et al. |
| RE34,536 E | 2/1994 | Frimmel, Jr. |
| 5,285,494 A | 2/1994 | Sprecher et al. |
| 5,287,199 A | 2/1994 | Zoccolillo |
| 5,287,270 A | 2/1994 | Hardy et al. |
| 5,289,378 A | 2/1994 | Miller et al. |
| 5,289,468 A | 2/1994 | Yoshida |
| 5,291,302 A | 3/1994 | Gordon et al. |
| 5,293,619 A | 3/1994 | Dean |

(56) References Cited

U.S. PATENT DOCUMENTS

| | | | |
|---|---|---|---|
| 5,294,782 A | 3/1994 | Kumar | |
| 5,295,154 A | 3/1994 | Meier et al. | |
| 5,303,297 A | 4/1994 | Hillis | |
| 5,305,181 A | 4/1994 | Schultz | |
| 5,307,354 A | 4/1994 | Cramer et al. | |
| 5,308,966 A | 5/1994 | Danielson et al. | |
| 5,309,437 A | 5/1994 | Perlman et al. | |
| 5,311,583 A | 5/1994 | Friedes et al. | |
| 5,313,053 A | 5/1994 | Koenck et al. | |
| 5,313,598 A | 5/1994 | Yamakawa | |
| 5,315,093 A | 5/1994 | Stewart | |
| 5,315,636 A | 5/1994 | Patel | |
| 5,315,705 A | 5/1994 | Iwami et al. | |
| 5,317,566 A | 5/1994 | Joshi | |
| 5,317,691 A | 5/1994 | Traeger | |
| 5,318,719 A | 6/1994 | Hughes et al. | |
| 5,322,991 A | 6/1994 | Hanson | |
| 5,325,290 A | 6/1994 | Cauffman et al. | |
| 5,325,421 A | 6/1994 | Hou et al. | |
| 5,325,426 A | 6/1994 | Held | |
| 5,327,421 A | 7/1994 | Hiller et al. | |
| 5,327,486 A | 7/1994 | Wolff et al. | |
| 5,329,520 A | 7/1994 | Richardson | |
| 5,329,578 A | 7/1994 | Brennan et al. | |
| 5,331,580 A | 7/1994 | Miller et al. | |
| 5,333,173 A | 7/1994 | Seazholtz et al. | |
| 5,333,266 A | 7/1994 | Boaz et al. | |
| 5,335,276 A | 8/1994 | Thompson et al. | |
| 5,337,044 A | 8/1994 | Folger et al. | |
| 5,341,374 A | 8/1994 | Lewen et al. | |
| 5,341,425 A | 8/1994 | Wasilewski et al. | |
| 5,341,430 A | 8/1994 | Aulia et al. | |
| 5,341,477 A | 8/1994 | Pitkin et al. | |
| 5,345,446 A | 9/1994 | Hiller et al. | |
| 5,346,611 A | 9/1994 | Coughlin et al. | |
| 5,347,512 A | 9/1994 | Fechalos et al. | |
| 5,347,516 A | 9/1994 | Yoshida | |
| 5,347,633 A | 9/1994 | Ashfield et al. | |
| 5,349,497 A | 9/1994 | Hanson et al. | |
| 5,349,638 A | 9/1994 | Pitroda et al. | |
| 5,349,678 A | 9/1994 | Morris et al. | |
| 5,351,276 A | 9/1994 | Doll, Jr. et al. | |
| 5,351,286 A | 9/1994 | Nici | |
| 5,353,331 A | 10/1994 | Emery et al. | |
| 5,359,185 A | 10/1994 | Hanson | |
| 5,361,256 A | 11/1994 | Doeringer et al. | |
| 5,361,259 A | 11/1994 | Hunt et al. | |
| 5,363,431 A | 11/1994 | Schull et al. | |
| 5,365,524 A | 11/1994 | Hiller et al. | |
| 5,365,546 A | 11/1994 | Koenck et al. | |
| 5,367,566 A | 11/1994 | Moe et al. | |
| 5,369,571 A | 11/1994 | Metts | |
| 5,371,858 A | 12/1994 | Miller et al. | |
| 5,375,068 A | 12/1994 | Palmer et al. | |
| 5,375,159 A | 12/1994 | Williams | |
| 5,375,161 A | 12/1994 | Fuller et al. | |
| 5,377,186 A | 12/1994 | Wegner et al. | |
| 5,379,327 A | 1/1995 | Sharma et al. | |
| 5,381,407 A | 1/1995 | Chao | |
| 5,381,465 A | 1/1995 | Carter et al. | |
| 5,381,471 A | 1/1995 | Balakrishnan et al. | |
| 5,384,831 A | 1/1995 | Creswell et al. | |
| 5,384,840 A | 1/1995 | Blatchford et al. | |
| 5,386,467 A * | 1/1995 | Ahmad | 379/221.08 |
| 5,388,267 A | 2/1995 | Chan et al. | |
| 5,390,175 A | 2/1995 | Hiller et al. | |
| 5,390,335 A | 2/1995 | Stephan et al. | |
| 5,392,344 A | 2/1995 | Ash et al. | |
| 5,392,400 A | 2/1995 | Berkowitz et al. | |
| 5,394,436 A | 2/1995 | Meier et al. | |
| 5,396,542 A | 3/1995 | Alger et al. | |
| 5,396,543 A | 3/1995 | Beeson, Jr. et al. | |
| 5,400,393 A | 3/1995 | Knuth et al. | |
| 5,402,424 A | 3/1995 | Kou | |
| 5,402,478 A | 3/1995 | Hluchyj et al. | |
| 5,406,557 A | 4/1995 | Baudoin | |
| 5,408,237 A | 4/1995 | Patterson et al. | |
| 5,408,382 A | 4/1995 | Schultz et al. | |
| 5,408,669 A | 4/1995 | Stewart et al. | |
| 5,410,141 A | 4/1995 | Koenck et al. | |
| 5,410,754 A | 4/1995 | Klotzbach et al. | |
| 5,414,762 A | 5/1995 | Flisik et al. | |
| 5,416,842 A | 5/1995 | Aziz | |
| 5,418,844 A | 5/1995 | Morrisey et al. | |
| 5,420,211 A | 5/1995 | Hughes et al. | |
| 5,420,916 A | 5/1995 | Sekiguchi | |
| 5,422,882 A | 6/1995 | Hiller et al. | |
| 5,422,940 A | 6/1995 | Endo et al. | |
| 5,422,941 A | 6/1995 | Hasenauer et al. | |
| 5,423,003 A | 6/1995 | Berteau | |
| 5,425,028 A | 6/1995 | Britton et al. | |
| 5,425,051 A | 6/1995 | Mahany | |
| 5,425,085 A | 6/1995 | Weinberger et al. | |
| 5,425,090 A | 6/1995 | Orriss | |
| 5,425,091 A | 6/1995 | Josephs | |
| 5,426,636 A | 6/1995 | Hiller et al. | |
| 5,426,694 A | 6/1995 | Hebert | |
| 5,428,608 A | 6/1995 | Freeman et al. | |
| 5,428,636 A | 6/1995 | Meier | |
| 5,428,771 A | 6/1995 | Daniels et al. | |
| 5,430,719 A | 7/1995 | Weisser, Jr. | |
| 5,430,727 A | 7/1995 | Callon | |
| 5,432,715 A | 7/1995 | Shigematsu et al. | |
| 5,434,797 A | 7/1995 | Barris | |
| 5,434,852 A | 7/1995 | La Porta et al. | |
| 5,434,906 A | 7/1995 | Robinson et al. | |
| 5,434,913 A | 7/1995 | Tung et al. | |
| 5,436,957 A | 7/1995 | McConnell | |
| 5,436,963 A | 7/1995 | Fitzpatrick et al. | |
| 5,438,568 A | 8/1995 | Weisser, Jr. | |
| 5,440,563 A | 8/1995 | Isidoro et al. | |
| 5,440,620 A | 8/1995 | Slusky | |
| 5,440,621 A | 8/1995 | Castro | |
| 5,440,624 A | 8/1995 | Schoof, II | |
| 5,440,653 A | 8/1995 | Greggain et al. | |
| 5,440,699 A | 8/1995 | Farrand et al. | |
| 5,440,741 A | 8/1995 | Morales et al. | |
| 5,442,387 A | 8/1995 | Loofbourow et al. | |
| 5,442,690 A | 8/1995 | Nazif et al. | |
| 5,444,709 A | 8/1995 | Riddle | |
| 5,446,730 A | 8/1995 | Lee et al. | |
| 5,448,626 A | 9/1995 | Kajiya et al. | |
| 5,448,633 A | 9/1995 | Jamaleddin et al. | |
| 5,449,970 A | 9/1995 | Kumar et al. | |
| 5,450,411 A | 9/1995 | Heil | |
| 5,450,483 A | 9/1995 | Williams | |
| 5,452,287 A | 9/1995 | DiCecco et al. | |
| 5,452,289 A | 9/1995 | Sharma et al. | |
| 5,452,350 A | 9/1995 | Reynolds et al. | |
| 5,452,446 A | 9/1995 | Johnson | |
| 5,453,986 A | 9/1995 | Davis et al. | |
| 5,455,821 A | 10/1995 | Schaeffer et al. | |
| 5,457,629 A | 10/1995 | Miller et al. | |
| 5,457,735 A | 10/1995 | Erickson | |
| 5,459,720 A | 10/1995 | Iliev et al. | |
| 5,459,775 A | 10/1995 | Isono et al. | |
| 5,461,611 A | 10/1995 | Drake, Jr. et al. | |
| 5,463,677 A | 10/1995 | Bash et al. | |
| 5,465,207 A | 11/1995 | Boatwright et al. | |
| 5,466,170 A | 11/1995 | Pavek | |
| 5,468,947 A | 11/1995 | Danielson et al. | |
| 5,468,950 A | 11/1995 | Hanson | |
| 5,469,496 A | 11/1995 | Emery et al. | |
| 5,469,497 A | 11/1995 | Pierce et al. | |
| 5,469,500 A | 11/1995 | Satter et al. | |
| 5,471,519 A | 11/1995 | Howe et al. | |
| 5,471,522 A | 11/1995 | Sells et al. | |
| 5,473,608 A | 12/1995 | Gagne et al. | |
| 5,473,677 A | 12/1995 | D'Amato et al. | |
| 5,475,732 A | 12/1995 | Pester, III | |
| 5,475,737 A | 12/1995 | Garner et al. | |
| 5,475,748 A | 12/1995 | Jones | |
| 5,475,817 A | 12/1995 | Waldo et al. | |
| 5,475,836 A | 12/1995 | Harris et al. | |

(56) References Cited

U.S. PATENT DOCUMENTS

| | | |
|---|---|---|
| 5,477,531 A | 12/1995 | McKee et al. |
| 5,478,581 A | 12/1995 | Christie et al. |
| 5,479,411 A | 12/1995 | Klein |
| 5,479,473 A | 12/1995 | Zey |
| 5,479,494 A | 12/1995 | Clitherow |
| 5,479,650 A | 12/1995 | Archibald et al. |
| 5,481,542 A | 1/1996 | Logston et al. |
| 5,481,600 A | 1/1996 | Alesio |
| 5,481,603 A | 1/1996 | Gutierrez et al. |
| 5,483,524 A | 1/1996 | Lev et al. |
| 5,483,527 A | 1/1996 | Doshi et al. |
| 5,483,549 A | 1/1996 | Weinberg et al. |
| 5,483,586 A | 1/1996 | Sussman |
| 5,483,587 A | 1/1996 | Hogan et al. |
| 5,483,588 A | 1/1996 | Eaton et al. |
| 5,483,596 A | 1/1996 | Rosenow et al. |
| 5,483,676 A | 1/1996 | Mahany et al. |
| 5,487,111 A | 1/1996 | Slusky |
| 5,488,575 A | 1/1996 | Danielson et al. |
| 5,490,060 A | 2/1996 | Malec et al. |
| 5,490,247 A | 2/1996 | Tung et al. |
| 5,491,743 A | 2/1996 | Shiio et al. |
| 5,491,779 A | 2/1996 | Bezjian |
| 5,491,796 A | 2/1996 | Wanderer et al. |
| 5,493,409 A | 2/1996 | Maeda et al. |
| 5,493,568 A | 2/1996 | Sampat et al. |
| 5,493,573 A | 2/1996 | Kobayashi et al. |
| 5,495,521 A | 2/1996 | Rangachar |
| 5,497,411 A | 3/1996 | Pellerin |
| 5,500,859 A | 3/1996 | Sharma et al. |
| 5,500,889 A | 3/1996 | Baker et al. |
| 5,500,929 A | 3/1996 | Dickinson |
| 5,504,746 A | 4/1996 | Meier |
| 5,506,887 A | 4/1996 | Emery et al. |
| 5,506,893 A | 4/1996 | Buscher et al. |
| 5,511,111 A | 4/1996 | Serbetcioglu et al. |
| 5,511,114 A | 4/1996 | Stimson et al. |
| 5,513,127 A | 4/1996 | Gard et al. |
| 5,515,303 A | 5/1996 | Cargin, Jr. et al. |
| 5,517,434 A | 5/1996 | Hanson et al. |
| 5,517,560 A | 5/1996 | Greenspan |
| 5,517,562 A | 5/1996 | McConnell |
| 5,517,563 A | 5/1996 | Norell |
| 5,519,772 A | 5/1996 | Akman et al. |
| 5,520,470 A | 5/1996 | Willett |
| 5,521,719 A | 5/1996 | Yamada |
| 5,521,924 A | 5/1996 | Kakuma et al. |
| 5,524,137 A | 6/1996 | Rhee |
| 5,524,145 A | 6/1996 | Parker |
| 5,526,257 A | 6/1996 | Lerner |
| 5,526,344 A | 6/1996 | Diaz et al. |
| 5,526,353 A | 6/1996 | Henley et al. |
| 5,526,416 A | 6/1996 | Dezonno et al. |
| 5,526,489 A | 6/1996 | Nilakantan et al. |
| 5,530,744 A | 6/1996 | Charalambous et al. |
| 5,530,852 A | 6/1996 | Meske, Jr. et al. |
| 5,533,019 A | 7/1996 | Jayapalan |
| 5,533,108 A | 7/1996 | Harris et al. |
| 5,533,115 A | 7/1996 | Hollenbach et al. |
| 5,534,913 A | 7/1996 | Majeti et al. |
| 5,534,937 A | 7/1996 | Zhu et al. |
| 5,535,371 A | 7/1996 | Stewart et al. |
| 5,537,461 A | 7/1996 | Bridges et al. |
| 5,537,470 A | 7/1996 | Lee |
| 5,537,611 A | 7/1996 | Rajagopal et al. |
| 5,539,193 A | 7/1996 | Gibbs et al. |
| 5,539,194 A | 7/1996 | Miller et al. |
| 5,539,734 A | 7/1996 | Burwell et al. |
| 5,539,884 A | 7/1996 | Robrock, II |
| 5,539,886 A | 7/1996 | Aldred et al. |
| 5,541,398 A | 7/1996 | Hanson |
| 5,541,917 A | 7/1996 | Farris |
| 5,541,927 A | 7/1996 | Kristol et al. |
| 5,541,930 A | 7/1996 | Klingman |
| 5,544,010 A | 8/1996 | Schultz et al. |
| 5,546,398 A | 8/1996 | Tucker et al. |
| 5,546,452 A | 8/1996 | Andrews et al. |
| 5,548,726 A | 8/1996 | Pettus |
| 5,550,914 A | 8/1996 | Clarke et al. |
| 5,551,025 A | 8/1996 | O'Reilly et al. |
| 5,551,035 A | 8/1996 | Arnold et al. |
| 5,551,044 A | 8/1996 | Shah et al. |
| 5,553,124 A | 9/1996 | Brinskele |
| 5,555,276 A | 9/1996 | Koenck et al. |
| 5,555,290 A | 9/1996 | McLeod et al. |
| 5,557,541 A | 9/1996 | Schulhof et al. |
| 5,557,668 A | 9/1996 | Brady |
| 5,559,068 A | 9/1996 | Chen et al. |
| 5,559,721 A | 9/1996 | Ishii |
| 5,559,871 A | 9/1996 | Smith |
| 5,559,932 A | 9/1996 | Machida et al. |
| 5,561,670 A | 10/1996 | Hoffert et al. |
| 5,561,802 A | 10/1996 | Orimo et al. |
| 5,563,805 A | 10/1996 | Arbuckle et al. |
| 5,563,882 A | 10/1996 | Bruno et al. |
| 5,564,077 A | 10/1996 | Obayashi et al. |
| 5,566,316 A | 10/1996 | Fechner et al. |
| 5,566,351 A | 10/1996 | Crittenden et al. |
| 5,568,645 A | 10/1996 | Morris et al. |
| 5,570,410 A | 10/1996 | Hooshiari |
| 5,572,442 A | 11/1996 | Schulhof et al. |
| 5,572,579 A | 11/1996 | Orriss et al. |
| 5,572,583 A | 11/1996 | Wheeler, Jr. et al. |
| 5,574,782 A | 11/1996 | Baird et al. |
| 5,575,961 A | 11/1996 | Kuwabara et al. |
| 5,576,529 A | 11/1996 | Koenck et al. |
| 5,579,472 A | 11/1996 | Keyworth, II et al. |
| 5,583,564 A | 12/1996 | Rao et al. |
| 5,583,920 A | 12/1996 | Wheeler, Jr. |
| 5,583,926 A | 12/1996 | Venier et al. |
| 5,583,929 A | 12/1996 | Ardon |
| 5,584,784 A | 12/1996 | Wu |
| 5,586,175 A | 12/1996 | Hogan et al. |
| 5,586,177 A | 12/1996 | Farris et al. |
| 5,586,260 A | 12/1996 | Hu |
| 5,587,577 A | 12/1996 | Schultz |
| 5,590,127 A | 12/1996 | Bales et al. |
| 5,590,133 A | 12/1996 | Billstrom et al. |
| 5,590,181 A | 12/1996 | Hogan et al. |
| 5,590,186 A | 12/1996 | Liao et al. |
| 5,590,346 A | 12/1996 | West et al. |
| 5,594,490 A | 1/1997 | Dawson et al. |
| 5,594,717 A | 1/1997 | Watanabe et al. |
| 5,594,769 A | 1/1997 | Pellegrino et al. |
| 5,594,782 A | 1/1997 | Zicker et al. |
| 5,594,789 A | 1/1997 | Seazholtz et al. |
| 5,598,411 A | 1/1997 | Matsukawa |
| 5,598,464 A | 1/1997 | Hess et al. |
| 5,598,487 A | 1/1997 | Hacker et al. |
| 5,600,710 A | 2/1997 | Weisser, Jr. et al. |
| 5,600,791 A | 2/1997 | Carlson et al. |
| 5,602,456 A | 2/1997 | Cargin, Jr. et al. |
| 5,602,846 A | 2/1997 | Holmquist et al. |
| 5,602,854 A | 2/1997 | Luse et al. |
| 5,602,909 A | 2/1997 | Carkner et al. |
| 5,602,918 A | 2/1997 | Chen et al. |
| 5,602,991 A | 2/1997 | Berteau |
| 5,603,084 A * | 2/1997 | Henry et al. .................. 455/419 |
| 5,603,085 A | 2/1997 | Shedlo |
| 5,604,682 A | 2/1997 | McLaughlin et al. |
| 5,604,737 A | 2/1997 | Iwami et al. |
| 5,606,596 A | 2/1997 | Jain et al. |
| 5,608,446 A | 3/1997 | Carr et al. |
| 5,608,447 A | 3/1997 | Farry et al. |
| 5,608,786 A | 3/1997 | Gordon |
| 5,610,910 A | 3/1997 | Focsaneanu et al. |
| 5,610,915 A | 3/1997 | Elliott et al. |
| 5,610,972 A | 3/1997 | Emery et al. |
| 5,610,976 A | 3/1997 | Uota et al. |
| 5,610,977 A | 3/1997 | Williams et al. |
| 5,615,251 A | 3/1997 | Hogan et al. |
| 5,617,343 A | 4/1997 | Danielson et al. |
| 5,617,422 A | 4/1997 | Litzenberger et al. |
| 5,617,540 A | 4/1997 | Civanlar et al. |

(56) References Cited

U.S. PATENT DOCUMENTS

| | | |
|---|---|---|
| 5,619,555 A | 4/1997 | Fenton et al. |
| 5,619,557 A | 4/1997 | Van Berkum |
| 5,619,562 A | 4/1997 | Maurer et al. |
| 5,621,727 A | 4/1997 | Vaudreuil |
| 5,621,787 A | 4/1997 | McKoy et al. |
| 5,623,581 A | 4/1997 | Attenberg |
| 5,623,601 A | 4/1997 | Vu |
| 5,625,180 A | 4/1997 | Hanson et al. |
| 5,625,404 A | 4/1997 | Grady et al. |
| 5,625,407 A | 4/1997 | Biggs et al. |
| 5,625,555 A | 4/1997 | Davis |
| 5,625,669 A | 4/1997 | McGregor et al. |
| 5,625,675 A | 4/1997 | Katsumaru et al. |
| 5,625,677 A | 4/1997 | Feiertag et al. |
| 5,625,681 A | 4/1997 | Butler, II |
| 5,625,682 A | 4/1997 | Gray et al. |
| 5,627,886 A | 5/1997 | Bowman |
| 5,629,978 A | 5/1997 | Blumhardt et al. |
| 5,630,066 A | 5/1997 | Gosling |
| 5,631,847 A | 5/1997 | Kikinis |
| 5,633,916 A | 5/1997 | Goldhagen et al. |
| 5,633,919 A | 5/1997 | Hogan et al. |
| 5,634,012 A | 5/1997 | Stefik et al. |
| 5,635,980 A | 6/1997 | Lin et al. |
| 5,636,216 A | 6/1997 | Fox et al. |
| 5,638,430 A | 6/1997 | Hogan et al. |
| 5,640,001 A | 6/1997 | Danielson et al. |
| 5,640,319 A | 6/1997 | Beuning et al. |
| 5,640,388 A | 6/1997 | Woodhead et al. |
| 5,644,471 A | 7/1997 | Schultz et al. |
| 5,646,982 A | 7/1997 | Hogan et al. |
| 5,651,006 A | 7/1997 | Fujino et al. |
| 5,652,787 A | 7/1997 | O'Kelly |
| 5,652,789 A | 7/1997 | Miner et al. |
| 5,652,894 A | 7/1997 | Hu et al. |
| 5,654,957 A | 8/1997 | Koyama |
| 5,657,250 A | 8/1997 | Park et al. |
| 5,657,317 A | 8/1997 | Mahany et al. |
| 5,659,599 A | 8/1997 | Arumainayagam et al. |
| 5,661,197 A | 8/1997 | Villiger et al. |
| 5,661,782 A | 8/1997 | Bartholomew et al. |
| 5,661,790 A | 8/1997 | Hsu |
| 5,661,792 A | 8/1997 | Akinpelu et al. |
| 5,663,208 A | 9/1997 | Martin |
| 5,664,005 A | 9/1997 | Emery et al. |
| 5,664,013 A | 9/1997 | Rossi |
| 5,664,102 A | 9/1997 | Faynberg |
| 5,668,857 A | 9/1997 | McHale |
| 5,669,062 A | 9/1997 | Olds et al. |
| 5,671,436 A | 9/1997 | Morris et al. |
| 5,672,860 A | 9/1997 | Miller et al. |
| 5,673,031 A | 9/1997 | Meier |
| 5,673,263 A | 9/1997 | Basso et al. |
| 5,675,507 A | 10/1997 | Bobo, II |
| 5,675,741 A | 10/1997 | Aggarwal et al. |
| 5,679,943 A | 10/1997 | Schultz et al. |
| 5,680,116 A | 10/1997 | Hashimoto et al. |
| 5,680,392 A | 10/1997 | Semaan |
| 5,680,442 A | 10/1997 | Bartholomew et al. |
| 5,680,446 A | 10/1997 | Fleischer, III et al. |
| 5,680,633 A | 10/1997 | Koenck et al. |
| 5,682,379 A | 10/1997 | Mahany et al. |
| 5,687,167 A | 11/1997 | Bertin et al. |
| 5,689,416 A | 11/1997 | Shimizu et al. |
| 5,689,550 A | 11/1997 | Garson et al. |
| 5,689,553 A | 11/1997 | Ahuja et al. |
| 5,689,698 A | 11/1997 | Jones et al. |
| 5,689,726 A | 11/1997 | Lin |
| 5,691,973 A | 11/1997 | Ramstrom et al. |
| 5,692,039 A | 11/1997 | Brankley et al. |
| 5,694,318 A | 12/1997 | Miller et al. |
| 5,694,463 A | 12/1997 | Christie et al. |
| 5,694,466 A | 12/1997 | Xie et al. |
| 5,696,903 A | 12/1997 | Mahany |
| 5,699,089 A | 12/1997 | Murray |
| 5,699,352 A | 12/1997 | Kriete et al. |
| 5,699,528 A | 12/1997 | Hogan |
| 5,701,295 A | 12/1997 | Bales et al. |
| 5,701,301 A | 12/1997 | Weisser, Jr. |
| 5,701,465 A | 12/1997 | Baugher et al. |
| 5,703,935 A | 12/1997 | Raissyan et al. |
| 5,703,940 A | 12/1997 | Sattar et al. |
| 5,703,942 A | 12/1997 | Pinard et al. |
| 5,706,286 A | 1/1998 | Reiman et al. |
| 5,708,680 A | 1/1998 | Gollnick et al. |
| 5,708,780 A * | 1/1998 | Levergood et al. ........... 709/229 |
| 5,708,833 A | 1/1998 | Kinney et al. |
| 5,710,728 A | 1/1998 | Danielson et al. |
| 5,710,884 A | 1/1998 | Dedrick |
| 5,712,903 A | 1/1998 | Bartholomew et al. |
| 5,712,906 A | 1/1998 | Grady et al. |
| 5,712,907 A | 1/1998 | Wegner et al. |
| 5,712,908 A | 1/1998 | Brinkman et al. |
| 5,719,854 A | 2/1998 | Choudhury et al. |
| 5,719,936 A | 2/1998 | Hillenmayer |
| 5,721,825 A | 2/1998 | Lawson et al. |
| 5,721,916 A | 2/1998 | Pardikar |
| 5,721,937 A | 2/1998 | Kurihara et al. |
| 5,722,067 A | 2/1998 | Fougnies et al. |
| 5,724,355 A | 3/1998 | Bruno et al. |
| 5,724,406 A | 3/1998 | Juster |
| 5,724,412 A | 3/1998 | Srinivasan |
| 5,726,984 A | 3/1998 | Kubler et al. |
| 5,727,002 A | 3/1998 | Miller et al. |
| 5,727,129 A | 3/1998 | Barrett et al. |
| 5,729,542 A | 3/1998 | Dupont |
| 5,729,544 A | 3/1998 | Lev et al. |
| 5,729,599 A | 3/1998 | Plomondon et al. |
| 5,732,078 A | 3/1998 | Arango |
| 5,732,213 A | 3/1998 | Gessel et al. |
| 5,732,219 A | 3/1998 | Blumer et al. |
| 5,737,333 A | 4/1998 | Civanlar et al. |
| 5,737,395 A | 4/1998 | Irribarren |
| 5,737,404 A | 4/1998 | Segal |
| 5,737,407 A | 4/1998 | Graumann |
| 5,737,414 A | 4/1998 | Walker et al. |
| 5,740,164 A | 4/1998 | Liron |
| 5,740,366 A | 4/1998 | Mahany et al. |
| 5,742,596 A | 4/1998 | Baratz et al. |
| 5,742,668 A | 4/1998 | Pepe et al. |
| 5,742,670 A | 4/1998 | Bennett |
| 5,742,675 A | 4/1998 | Kilander et al. |
| 5,742,905 A | 4/1998 | Pepe et al. |
| 5,744,533 A | 4/1998 | Iwamoto et al. |
| 5,745,556 A | 4/1998 | Ronen |
| 5,745,694 A | 4/1998 | Egawa et al. |
| 5,747,785 A | 5/1998 | Miller et al. |
| 5,747,786 A | 5/1998 | Cargin, Jr. et al. |
| 5,748,468 A | 5/1998 | Notenboom et al. |
| 5,748,619 A | 5/1998 | Meier |
| 5,751,707 A | 5/1998 | Voit et al. |
| 5,751,903 A | 5/1998 | Swaminathan et al. |
| 5,751,961 A | 5/1998 | Smyk |
| 5,754,542 A | 5/1998 | Ault et al. |
| 5,754,639 A | 5/1998 | Flockhart et al. |
| 5,754,641 A | 5/1998 | Voit et al. |
| 5,757,772 A | 5/1998 | Thornberg et al. |
| 5,757,784 A | 5/1998 | Liebowitz et al. |
| 5,758,110 A | 5/1998 | Boss et al. |
| 5,758,172 A | 5/1998 | Seo |
| 5,758,281 A | 5/1998 | Emery et al. |
| 5,761,290 A | 6/1998 | Farris et al. |
| 5,761,294 A | 6/1998 | Shaffer et al. |
| 5,763,867 A | 6/1998 | Main et al. |
| 5,764,736 A | 6/1998 | Shachar et al. |
| 5,764,741 A | 6/1998 | Barak |
| 5,764,919 A | 6/1998 | Hashimoto |
| 5,768,513 A | 6/1998 | Kuthyar et al. |
| 5,774,530 A | 6/1998 | Montgomery et al. |
| 5,774,533 A | 6/1998 | Patel |
| 5,774,535 A | 6/1998 | Castro |
| 5,774,660 A | 6/1998 | Brendel et al. |
| 5,774,668 A | 6/1998 | Choquier et al. |
| 5,774,670 A | 6/1998 | Montulli |

(56) References Cited

U.S. PATENT DOCUMENTS

| | | |
|---|---|---|
| 5,774,695 A | 6/1998 | Autrey et al. |
| 5,777,991 A | 7/1998 | Adachi et al. |
| 5,778,313 A | 7/1998 | Fougnies |
| 5,781,550 A | 7/1998 | Templin et al. |
| 5,781,620 A | 7/1998 | Montgomery et al. |
| 5,781,624 A | 7/1998 | Mitra et al. |
| 5,784,617 A | 7/1998 | Greenstein et al. |
| 5,787,160 A | 7/1998 | Chaney et al. |
| 5,787,163 A | 7/1998 | Taylor et al. |
| 5,787,254 A | 7/1998 | Maddalozzo, Jr. et al. |
| 5,790,172 A | 8/1998 | Imanaka |
| 5,790,532 A | 8/1998 | Sharma et al. |
| 5,790,536 A | 8/1998 | Mahany et al. |
| 5,790,548 A | 8/1998 | Sistanizadeh et al. |
| 5,790,779 A | 8/1998 | Ben-Natan et al. |
| 5,790,780 A | 8/1998 | Brichta et al. |
| 5,790,806 A | 8/1998 | Koperda |
| 5,793,672 A | 8/1998 | Wong et al. |
| 5,793,762 A | 8/1998 | Penners et al. |
| 5,793,763 A | 8/1998 | Mayes et al. |
| 5,793,771 A | 8/1998 | Darland et al. |
| 5,795,228 A | 8/1998 | Trumbull et al. |
| 5,796,790 A | 8/1998 | Brunner |
| 5,796,953 A | 8/1998 | Zey |
| 5,799,063 A | 8/1998 | Krane |
| 5,799,072 A | 8/1998 | Vulcan et al. |
| 5,799,156 A | 8/1998 | Hogan et al. |
| 5,799,317 A | 8/1998 | He et al. |
| 5,802,146 A | 9/1998 | Dulman |
| 5,802,265 A | 9/1998 | Bressoud et al. |
| 5,802,304 A | 9/1998 | Stone |
| 5,802,502 A | 9/1998 | Gell et al. |
| 5,802,510 A | 9/1998 | Jones |
| 5,802,513 A | 9/1998 | Bowie, III |
| 5,804,805 A | 9/1998 | Koenck et al. |
| 5,805,298 A | 9/1998 | Ho et al. |
| 5,805,474 A | 9/1998 | Danielson et al. |
| 5,805,587 A | 9/1998 | Norris et al. |
| 5,805,602 A | 9/1998 | Cloutier et al. |
| 5,805,682 A | 9/1998 | Voit et al. |
| 5,805,807 A | 9/1998 | Hanson et al. |
| 5,805,910 A | 9/1998 | Lee et al. |
| 5,809,128 A | 9/1998 | McMullin |
| 5,809,129 A | 9/1998 | Andersson et al. |
| 5,809,133 A | 9/1998 | Bartkowiak et al. |
| 5,809,415 A | 9/1998 | Rossmann |
| 5,812,533 A | 9/1998 | Cox et al. |
| 5,812,534 A | 9/1998 | Davis et al. |
| 5,812,639 A | 9/1998 | Bartholomew et al. |
| 5,812,656 A | 9/1998 | Garland et al. |
| 5,812,776 A | 9/1998 | Gifford et al. |
| 5,812,795 A | 9/1998 | Horovitz et al. |
| 5,812,865 A | 9/1998 | Theimer et al. |
| 5,815,652 A | 9/1998 | Ote et al. |
| 5,815,665 A | 9/1998 | Teper et al. |
| 5,818,836 A | 10/1998 | DuVal |
| 5,818,921 A | 10/1998 | Vander Meiden et al. |
| 5,825,772 A | 10/1998 | Dobbins et al. |
| 5,825,780 A | 10/1998 | Christie |
| 5,825,862 A | 10/1998 | Voit et al. |
| 5,825,863 A | 10/1998 | Walker |
| 5,825,869 A | 10/1998 | Brooks et al. |
| 5,826,051 A | 10/1998 | Porter et al. |
| 5,826,268 A | 10/1998 | Schaefer et al. |
| 5,828,737 A | 10/1998 | Sawyer |
| 5,828,740 A | 10/1998 | Khuc et al. |
| 5,828,844 A | 10/1998 | Civanlar et al. |
| 5,832,197 A | 11/1998 | Houji |
| 5,834,753 A | 11/1998 | Danielson et al. |
| 5,835,579 A | 11/1998 | Gersi et al. |
| 5,835,723 A | 11/1998 | Andrews et al. |
| 5,835,724 A | 11/1998 | Smith |
| 5,835,757 A | 11/1998 | Oulid-Aissa et al. |
| 5,838,665 A | 11/1998 | Kahn et al. |
| 5,838,682 A * | 11/1998 | Dekelbaum et al. .......... 370/401 |
| 5,838,686 A | 11/1998 | Ozkan |
| 5,838,768 A | 11/1998 | Sumar et al. |
| 5,838,774 A | 11/1998 | Weisser, Jr. |
| 5,838,916 A | 11/1998 | Domenikos et al. |
| 5,838,970 A | 11/1998 | Thomas |
| 5,841,764 A | 11/1998 | Roderique et al. |
| 5,842,028 A | 11/1998 | Vajapey |
| 5,844,893 A | 12/1998 | Gollnick et al. |
| 5,844,896 A | 12/1998 | Marks et al. |
| 5,845,138 A | 12/1998 | Nowlin, Jr. |
| 5,845,267 A | 12/1998 | Ronen |
| 5,848,142 A | 12/1998 | Yaker |
| 5,848,143 A | 12/1998 | Andrews et al. |
| 5,848,413 A | 12/1998 | Wolff |
| 5,850,358 A | 12/1998 | Danielson et al. |
| 5,850,433 A | 12/1998 | Rondeau |
| 5,854,833 A | 12/1998 | Hogan et al. |
| 5,854,975 A | 12/1998 | Fougnies et al. |
| 5,862,171 A | 1/1999 | Mahany |
| 5,862,325 A | 1/1999 | Reed et al. |
| 5,862,377 A | 1/1999 | Lee |
| 5,864,604 A | 1/1999 | Moen et al. |
| 5,864,610 A | 1/1999 | Ronen |
| 5,864,670 A | 1/1999 | Hayashi et al. |
| 5,867,495 A | 2/1999 | Elliott et al. |
| 5,867,562 A | 2/1999 | Scherer |
| 5,867,566 A | 2/1999 | Hogan et al. |
| 5,867,571 A | 2/1999 | Borchering |
| 5,870,454 A | 2/1999 | Dahlen |
| 5,870,474 A | 2/1999 | Wasilewski et al. |
| 5,870,561 A | 2/1999 | Jarvis et al. |
| 5,870,565 A | 2/1999 | Glitho |
| 5,872,847 A | 2/1999 | Boyle et al. |
| 5,873,077 A | 2/1999 | Kanoh et al. |
| 5,873,099 A | 2/1999 | Hogan et al. |
| 5,875,296 A | 2/1999 | Shi et al. |
| 5,878,126 A | 3/1999 | Velamuri et al. |
| 5,878,128 A | 3/1999 | Kantola |
| 5,878,130 A | 3/1999 | Andrews et al. |
| 5,878,209 A | 3/1999 | Manssen |
| 5,878,212 A | 3/1999 | Civanlar et al. |
| 5,878,219 A | 3/1999 | Vance, Jr. et al. |
| 5,881,134 A | 3/1999 | Foster et al. |
| 5,883,891 A | 3/1999 | Williams et al. |
| 5,883,894 A | 3/1999 | Patel et al. |
| 5,884,032 A | 3/1999 | Bateman et al. |
| 5,884,037 A | 3/1999 | Aras et al. |
| 5,888,087 A | 3/1999 | Hanson et al. |
| 5,889,774 A | 3/1999 | Mirashrafi et al. |
| 5,889,777 A | 3/1999 | Miyao et al. |
| 5,890,167 A | 3/1999 | Bridge, Jr. et al. |
| 5,892,754 A | 4/1999 | Kompella et al. |
| 5,892,822 A | 4/1999 | Gottlieb et al. |
| 5,892,971 A | 4/1999 | Danielson et al. |
| 5,895,431 A | 4/1999 | Miller et al. |
| 5,895,906 A | 4/1999 | Danielson et al. |
| 5,898,668 A | 4/1999 | Shaffer |
| 5,898,673 A | 4/1999 | Riggan et al. |
| 5,898,697 A | 4/1999 | Hurme et al. |
| 5,901,140 A | 5/1999 | Van As et al. |
| 5,901,313 A | 5/1999 | Wolf et al. |
| 5,903,558 A | 5/1999 | Jones et al. |
| 5,903,559 A | 5/1999 | Acharya et al. |
| 5,903,735 A | 5/1999 | Kidder et al. |
| 5,905,736 A | 5/1999 | Ronen et al. |
| 5,907,547 A | 5/1999 | Foladare et al. |
| 5,907,602 A | 5/1999 | Peel et al. |
| 5,909,430 A | 6/1999 | Reaves |
| 5,910,946 A | 6/1999 | Csapo |
| 5,912,882 A | 6/1999 | Yafuso et al. |
| 5,912,887 A | 6/1999 | Sehgal |
| 5,914,481 A | 6/1999 | Danielson et al. |
| 5,915,001 A | 6/1999 | Uppaluru |
| 5,915,005 A | 6/1999 | He |
| 5,915,008 A | 6/1999 | Dulman |
| 5,915,012 A | 6/1999 | Miloslavsky |
| 5,916,303 A | 6/1999 | Scott |
| 5,917,175 A | 6/1999 | Miller et al. |
| 5,917,424 A | 6/1999 | Goldman et al. |

(56) References Cited

U.S. PATENT DOCUMENTS

| | | |
|---|---|---|
| 5,917,817 A | 6/1999 | Dunn et al. |
| 5,918,059 A | 6/1999 | Tavallaei et al. |
| 5,918,179 A | 6/1999 | Foladare et al. |
| 5,923,659 A | 7/1999 | Curry et al. |
| 5,923,736 A | 7/1999 | Shachar |
| 5,926,482 A | 7/1999 | Christie et al. |
| 5,928,292 A | 7/1999 | Miller et al. |
| 5,930,343 A | 7/1999 | Vasquez |
| 5,930,348 A | 7/1999 | Regnier et al. |
| 5,930,700 A | 7/1999 | Pepper et al. |
| 5,933,412 A | 8/1999 | Choudhury et al. |
| 5,933,425 A | 8/1999 | Iwata |
| 5,933,486 A | 8/1999 | Norby et al. |
| 5,933,604 A | 8/1999 | Inakoshi |
| 5,933,836 A | 8/1999 | Gobat |
| 5,936,958 A | 8/1999 | Soumiya et al. |
| 5,937,045 A | 8/1999 | Yaoya et al. |
| 5,940,479 A | 8/1999 | Guy et al. |
| 5,940,598 A | 8/1999 | Strauss et al. |
| 5,940,616 A | 8/1999 | Wang |
| 5,940,771 A | 8/1999 | Gollnick et al. |
| 5,943,399 A | 8/1999 | Bannister et al. |
| 5,944,795 A | 8/1999 | Civanlar |
| 5,946,299 A | 8/1999 | Blonder |
| 5,946,381 A | 8/1999 | Danne et al. |
| 5,946,386 A | 8/1999 | Rogers et al. |
| 5,949,056 A | 9/1999 | White |
| 5,949,419 A | 9/1999 | Domine et al. |
| 5,949,776 A | 9/1999 | Mahany et al. |
| 5,949,869 A | 9/1999 | Sink et al. |
| 5,949,977 A | 9/1999 | Hernandez |
| 5,951,694 A | 9/1999 | Choquier et al. |
| 5,953,322 A | 9/1999 | Kimball |
| 5,953,338 A | 9/1999 | Ma et al. |
| 5,953,392 A | 9/1999 | Rhie et al. |
| 5,953,504 A | 9/1999 | Sokal et al. |
| 5,953,651 A | 9/1999 | Lu et al. |
| 5,956,391 A | 9/1999 | Melen et al. |
| 5,956,482 A | 9/1999 | Agraharam et al. |
| 5,956,697 A | 9/1999 | Usui |
| 5,958,013 A | 9/1999 | King et al. |
| 5,958,016 A | 9/1999 | Chang et al. |
| 5,958,052 A | 9/1999 | Bellovin et al. |
| 5,959,998 A | 9/1999 | Takahashi et al. |
| 5,960,416 A | 9/1999 | Block |
| 5,961,601 A | 10/1999 | Iyengar |
| 5,964,836 A | 10/1999 | Rowe et al. |
| 5,966,427 A | 10/1999 | Shaffer et al. |
| 5,966,431 A | 10/1999 | Reiman et al. |
| 5,966,434 A | 10/1999 | Schafer et al. |
| 5,969,321 A | 10/1999 | Danielson et al. |
| 5,970,065 A | 10/1999 | Miloslavsky |
| 5,970,120 A | 10/1999 | Kasrai |
| 5,970,477 A | 10/1999 | Roden |
| 5,974,043 A | 10/1999 | Solomon |
| 5,974,052 A | 10/1999 | Johnson et al. |
| 5,974,133 A | 10/1999 | Fleischer, III et al. |
| 5,974,429 A | 10/1999 | Strub et al. |
| 5,974,453 A | 10/1999 | Andersen et al. |
| 5,974,563 A | 10/1999 | Beeler, Jr. |
| 5,978,569 A | 11/1999 | Traeger |
| 5,978,773 A | 11/1999 | Hudetz et al. |
| 5,978,840 A | 11/1999 | Nguyen et al. |
| 5,979,768 A | 11/1999 | Koenck |
| 5,982,774 A | 11/1999 | Foladare et al. |
| 5,983,227 A | 11/1999 | Nazem et al. |
| 5,987,108 A | 11/1999 | Jagadish et al. |
| 5,987,499 A | 11/1999 | Morris et al. |
| 5,987,517 A | 11/1999 | Firth et al. |
| 5,991,291 A | 11/1999 | Asai et al. |
| 5,991,292 A | 11/1999 | Focsaneanu et al. |
| 5,991,301 A | 11/1999 | Christie |
| 5,991,308 A | 11/1999 | Fuhrmann et al. |
| 5,991,803 A | 11/1999 | Glitho et al. |
| 5,991,810 A | 11/1999 | Shapiro et al. |
| 5,991,864 A | 11/1999 | Kinney et al. |
| 5,995,503 A | 11/1999 | Crawley et al. |
| 5,995,606 A | 11/1999 | Civanlar et al. |
| 5,995,969 A | 11/1999 | Lee et al. |
| 5,996,018 A | 11/1999 | Duault et al. |
| 5,999,524 A | 12/1999 | Corbalis et al. |
| 5,999,525 A | 12/1999 | Krishnaswamy et al. |
| 5,999,610 A | 12/1999 | Lin et al. |
| 6,003,035 A | 12/1999 | Breame |
| 6,005,859 A | 12/1999 | Harvell et al. |
| 6,005,870 A | 12/1999 | Leung et al. |
| 6,005,926 A | 12/1999 | Mashinsky |
| 6,006,100 A | 12/1999 | Koenck et al. |
| 6,006,253 A | 12/1999 | Kumar et al. |
| 6,009,469 A | 12/1999 | Mattaway et al. |
| 6,011,975 A | 1/2000 | Emery et al. |
| 6,011,978 A | 1/2000 | Ault et al. |
| 6,012,088 A | 1/2000 | Li et al. |
| 6,014,090 A | 1/2000 | Rosen et al. |
| 6,014,379 A | 1/2000 | White et al. |
| 6,014,437 A | 1/2000 | Acker et al. |
| 6,014,687 A | 1/2000 | Watanabe et al. |
| 6,016,307 A | 1/2000 | Kaplan et al. |
| 6,016,343 A | 1/2000 | Hogan et al. |
| 6,018,360 A | 1/2000 | Stewart et al. |
| 6,018,567 A | 1/2000 | Dulman |
| 6,021,126 A | 2/2000 | White et al. |
| 6,021,263 A | 2/2000 | Kujoory et al. |
| 6,023,147 A | 2/2000 | Cargin, Jr. et al. |
| 6,023,474 A | 2/2000 | Gardner et al. |
| 6,023,699 A | 2/2000 | Knoblock et al. |
| 6,023,724 A | 2/2000 | Bhatia et al. |
| 6,026,087 A | 2/2000 | Mirashrafi et al. |
| 6,026,091 A | 2/2000 | Christie et al. |
| 6,026,433 A | 2/2000 | D'Arlach et al. |
| 6,026,441 A | 2/2000 | Ronen |
| 6,028,858 A | 2/2000 | Rivers et al. |
| 6,029,062 A | 2/2000 | Hanson |
| 6,029,203 A | 2/2000 | Bhatia et al. |
| 6,029,252 A | 2/2000 | Manning |
| 6,029,261 A | 2/2000 | Hartmann |
| 6,031,836 A | 2/2000 | Haserodt |
| 6,031,840 A | 2/2000 | Christie et al. |
| 6,035,028 A | 3/2000 | Ward et al. |
| 6,035,214 A | 3/2000 | Henderson |
| 6,035,379 A | 3/2000 | Raju et al. |
| 6,036,093 A | 3/2000 | Schultz |
| 6,041,109 A | 3/2000 | Cardy et al. |
| 6,041,117 A | 3/2000 | Androski et al. |
| 6,041,357 A | 3/2000 | Kunzelman et al. |
| 6,044,081 A | 3/2000 | Bell et al. |
| 6,046,992 A | 4/2000 | Meier et al. |
| 6,047,051 A | 4/2000 | Ginzboorg et al. |
| 6,047,326 A | 4/2000 | Kilkki |
| 6,047,376 A | 4/2000 | Hosoe |
| 6,048,269 A | 4/2000 | Burns et al. |
| 6,049,450 A | 4/2000 | Cho et al. |
| 6,049,545 A | 4/2000 | Stephenson et al. |
| 6,049,796 A | 4/2000 | Siitonen et al. |
| 6,049,813 A | 4/2000 | Danielson et al. |
| 6,052,445 A | 4/2000 | Bashoura et al. |
| 6,052,450 A | 4/2000 | Allison et al. |
| 6,058,000 A | 5/2000 | Koenck et al. |
| 6,058,113 A | 5/2000 | Chang |
| 6,061,678 A | 5/2000 | Klein et al. |
| 6,064,492 A | 5/2000 | Eldridge et al. |
| 6,064,653 A | 5/2000 | Farris |
| 6,067,516 A | 5/2000 | Levay et al. |
| 6,069,711 A | 5/2000 | Iwata |
| 6,069,890 A | 5/2000 | White et al. |
| 6,073,160 A | 6/2000 | Grantham et al. |
| 6,075,783 A | 6/2000 | Voit |
| 6,078,579 A | 6/2000 | Weingarten |
| 6,078,581 A | 6/2000 | Shtivelman et al. |
| 6,078,582 A | 6/2000 | Curry et al. |
| 6,078,583 A | 6/2000 | Takahara et al. |
| 6,078,943 A | 6/2000 | Yu |
| 6,081,525 A | 6/2000 | Christie et al. |
| 6,081,827 A | 6/2000 | Reber et al. |

(56) References Cited

U.S. PATENT DOCUMENTS

| | | | |
|---|---|---|---|
| 6,081,844 A | 6/2000 | Nowatzyk et al. |
| 6,082,581 A | 7/2000 | Anderson et al. |
| 6,084,867 A | 7/2000 | Meier |
| 6,084,956 A | 7/2000 | Turner et al. |
| 6,088,358 A | 7/2000 | Tomita et al. |
| 6,088,431 A | 7/2000 | LaDue |
| 6,088,727 A | 7/2000 | Hosokawa et al. |
| 6,088,728 A | 7/2000 | Bellemore et al. |
| 6,091,514 A | 7/2000 | Hasegawa et al. |
| 6,092,196 A | 7/2000 | Reiche |
| 6,094,437 A | 7/2000 | Loehndorf, Jr. et al. |
| 6,094,654 A | 7/2000 | Van Huben et al. |
| 6,094,655 A | 7/2000 | Rogers et al. |
| 6,095,633 A | 8/2000 | Harshbarger et al. |
| 6,097,722 A | 8/2000 | Graham et al. |
| 6,097,804 A | 8/2000 | Gilbert et al. |
| 6,098,078 A | 8/2000 | Gehani et al. |
| 6,098,094 A | 8/2000 | Barnhouse et al. |
| 6,101,182 A | 8/2000 | Sistanizadeh et al. |
| 6,104,645 A | 8/2000 | Ong et al. |
| 6,104,704 A | 8/2000 | Buhler et al. |
| 6,104,711 A | 8/2000 | Voit |
| 6,105,067 A | 8/2000 | Batra |
| 6,108,314 A | 8/2000 | Jones et al. |
| 6,108,341 A | 8/2000 | Christie |
| 6,108,704 A | 8/2000 | Hutton et al. |
| 6,108,789 A | 8/2000 | Dancs et al. |
| 6,112,206 A | 8/2000 | Morris et al. |
| 6,115,458 A | 9/2000 | Taskett |
| 6,115,737 A | 9/2000 | Ely et al. |
| 6,116,715 A | 9/2000 | Lefebvre et al. |
| 6,118,936 A | 9/2000 | Lauer et al. |
| 6,119,931 A | 9/2000 | Novogrod |
| 6,121,990 A | 9/2000 | Fujiwara |
| 6,122,255 A | 9/2000 | Bartholomew et al. |
| 6,125,113 A | 9/2000 | Farris et al. |
| 6,125,126 A | 9/2000 | Hallenstål |
| 6,126,268 A | 10/2000 | Askeland et al. |
| 6,128,304 A | 10/2000 | Gardell et al. |
| 6,131,095 A | 10/2000 | Low et al. |
| 6,131,121 A | 10/2000 | Mattaway et al. |
| 6,134,235 A | 10/2000 | Goldman et al. |
| 6,134,433 A | 10/2000 | Joong et al. |
| 6,134,530 A | 10/2000 | Bunting et al. |
| 6,137,777 A | 10/2000 | Vaid et al. |
| 6,137,792 A | 10/2000 | Jonas et al. |
| 6,141,404 A | 10/2000 | Westerlage et al. |
| 6,141,412 A | 10/2000 | Smith et al. |
| 6,141,413 A | 10/2000 | Waldner et al. |
| 6,141,560 A | 10/2000 | Gillig et al. |
| 6,141,686 A | 10/2000 | Jackowski et al. |
| 6,144,644 A | 11/2000 | Bajzath et al. |
| 6,144,647 A | 11/2000 | Lopez-Torres |
| 6,144,661 A | 11/2000 | Katsube et al. |
| 6,144,667 A | 11/2000 | Doshi et al. |
| 6,144,976 A | 11/2000 | Silva et al. |
| 6,148,410 A | 11/2000 | Baskey et al. |
| 6,149,062 A | 11/2000 | Danielson et al. |
| 6,151,319 A | 11/2000 | Dommety et al. |
| 6,154,445 A | 11/2000 | Farris et al. |
| 6,154,777 A | 11/2000 | Ebrahim |
| 6,157,621 A | 12/2000 | Brown et al. |
| 6,157,636 A | 12/2000 | Voit et al. |
| 6,157,648 A | 12/2000 | Voit et al. |
| 6,157,823 A | 12/2000 | Fougnies et al. |
| 6,161,160 A | 12/2000 | Niu et al. |
| 6,166,826 A | 12/2000 | Yokoyama |
| 6,167,445 A | 12/2000 | Gai et al. |
| 6,169,735 B1 | 1/2001 | Allen, Jr. et al. |
| 6,169,748 B1 | 1/2001 | Barbas et al. |
| 6,170,943 B1 | 1/2001 | Wen et al. |
| 6,172,688 B1 | 1/2001 | Iwasaki et al. |
| 6,173,311 B1 | 1/2001 | Hassett et al. |
| 6,175,618 B1 | 1/2001 | Shah et al. |
| 6,175,877 B1 | 1/2001 | Zerber |
| 6,178,170 B1 | 1/2001 | Duree et al. |
| 6,178,183 B1 | 1/2001 | Buskirk, Jr. |
| 6,178,529 B1 | 1/2001 | Short et al. |
| 6,181,690 B1 | 1/2001 | Civanlar |
| 6,181,695 B1 | 1/2001 | Curry et al. |
| 6,181,703 B1 | 1/2001 | Christie et al. |
| 6,185,184 B1 | 2/2001 | Mattaway et al. |
| 6,185,198 B1 | 2/2001 | LaDue |
| 6,185,519 B1 | 2/2001 | Lin et al. |
| 6,188,677 B1 | 2/2001 | Oyama et al. |
| 6,192,041 B1 | 2/2001 | Phillips |
| 6,192,050 B1 | 2/2001 | Stovall |
| 6,192,400 B1 | 2/2001 | Hanson et al. |
| 6,192,401 B1 | 2/2001 | Modiri et al. |
| 6,195,355 B1 | 2/2001 | Demizu |
| 6,195,425 B1 | 2/2001 | Farris |
| 6,195,697 B1 | 2/2001 | Bowman-Amuah |
| 6,198,738 B1 | 3/2001 | Chang et al. |
| 6,201,812 B1 | 3/2001 | Christie |
| 6,204,847 B1 | 3/2001 | Wright |
| 6,205,139 B1 | 3/2001 | Voit |
| 6,205,148 B1 | 3/2001 | Takahashi et al. |
| 6,212,162 B1 | 4/2001 | Horlin |
| 6,212,193 B1 | 4/2001 | Christie |
| 6,212,256 B1 | 4/2001 | Miesbauer et al. |
| 6,212,261 B1 | 4/2001 | Meubus et al. |
| 6,215,790 B1 | 4/2001 | Voit et al. |
| 6,216,017 B1 | 4/2001 | Lee et al. |
| 6,219,227 B1 | 4/2001 | Trane |
| 6,219,229 B1 | 4/2001 | Lee |
| 6,222,919 B1 | 4/2001 | Hollatz et al. |
| 6,226,287 B1 | 5/2001 | Brady |
| 6,226,651 B1 | 5/2001 | Masuda et al. |
| 6,226,678 B1 | 5/2001 | Mattaway et al. |
| 6,230,203 B1 | 5/2001 | Koperda et al. |
| 6,233,234 B1 | 5/2001 | Curry et al. |
| 6,233,318 B1 | 5/2001 | Picard et al. |
| 6,233,604 B1 | 5/2001 | Van Horne et al. |
| 6,234,389 B1 | 5/2001 | Valliani et al. |
| 6,236,851 B1 | 5/2001 | Fougnies et al. |
| 6,240,091 B1 | 5/2001 | Ginzboorg et al. |
| 6,240,414 B1 | 5/2001 | Beizer et al. |
| 6,241,350 B1 | 6/2001 | Otsuka et al. |
| 6,243,373 B1 | 6/2001 | Turock |
| 6,243,374 B1 | 6/2001 | White et al. |
| 6,243,443 B1 | 6/2001 | Low et al. |
| 6,243,718 B1 | 6/2001 | Klein et al. |
| 6,243,751 B1 | 6/2001 | Chatterjee et al. |
| 6,246,758 B1 | 6/2001 | Low et al. |
| 6,249,879 B1 | 6/2001 | Walker et al. |
| 6,252,869 B1 | 6/2001 | Silverman |
| 6,253,230 B1 | 6/2001 | Couland et al. |
| 6,253,249 B1 | 6/2001 | Belzile |
| 6,256,666 B1 | 7/2001 | Singhal |
| 6,256,773 B1 | 7/2001 | Bowman-Amuah |
| 6,260,067 B1 | 7/2001 | Barnhouse et al. |
| 6,260,129 B1 | 7/2001 | Crockett et al. |
| 6,263,212 B1 | 7/2001 | Ross et al. |
| 6,263,372 B1 | 7/2001 | Hogan et al. |
| 6,266,666 B1 | 7/2001 | Ireland et al. |
| 6,266,685 B1 | 7/2001 | Danielson et al. |
| 6,266,699 B1 * | 7/2001 | Sevcik ........................ 709/229 |
| 6,267,520 B1 | 7/2001 | Unno et al. |
| 6,270,271 B1 | 8/2001 | Fujiwara |
| 6,278,693 B1 | 8/2001 | Aldred et al. |
| 6,278,704 B1 | 8/2001 | Creamer et al. |
| 6,279,001 B1 | 8/2001 | DeBettencourt et al. |
| 6,279,038 B1 | 8/2001 | Hogan et al. |
| 6,282,192 B1 | 8/2001 | Murphy et al. |
| 6,282,281 B1 | 8/2001 | Low |
| 6,282,284 B1 | 8/2001 | Dezonno et al. |
| 6,282,574 B1 | 8/2001 | Voit |
| 6,285,745 B1 | 9/2001 | Bartholomew et al. |
| 6,289,010 B1 | 9/2001 | Voit et al. |
| 6,292,478 B1 | 9/2001 | Farris |
| 6,292,479 B1 | 9/2001 | Bartholomew et al. |
| 6,292,481 B1 | 9/2001 | Voit et al. |
| 6,293,469 B1 | 9/2001 | Masson et al. |
| 6,295,292 B1 | 9/2001 | Voit et al. |

(56) References Cited

U.S. PATENT DOCUMENTS

| | | |
|---|---|---|
| 6,298,043 B1 | 10/2001 | Mauger et al. |
| 6,298,057 B1 | 10/2001 | Guy et al. |
| 6,298,062 B1 | 10/2001 | Gardell et al. |
| 6,298,064 B1 | 10/2001 | Christie |
| 6,298,120 B1 | 10/2001 | Civanlar et al. |
| 6,298,127 B1 | 10/2001 | Petrunka |
| 6,298,383 B1 | 10/2001 | Gutman et al. |
| 6,301,609 B1 | 10/2001 | Aravamudan et al. |
| 6,304,567 B1 | 10/2001 | Rosenberg |
| 6,304,967 B1 | 10/2001 | Braddy |
| 6,308,216 B1 | 10/2001 | Goldszmidt et al. |
| 6,310,873 B1 | 10/2001 | Rainis et al. |
| 6,310,883 B1 | 10/2001 | Mann et al. |
| 6,314,103 B1 | 11/2001 | Medhat et al. |
| 6,321,235 B1 | 11/2001 | Bird |
| 6,324,264 B1 | 11/2001 | Wiener et al. |
| 6,324,275 B1 | 11/2001 | Yagel et al. |
| 6,324,279 B1 | 11/2001 | Kalmanek, Jr. et al. |
| 6,324,547 B1 | 11/2001 | Lennert et al. |
| 6,325,488 B1 | 12/2001 | Beerling et al. |
| 6,327,258 B1 | 12/2001 | Deschaine et al. |
| 6,327,622 B1 | 12/2001 | Jindal et al. |
| 6,330,250 B1 | 12/2001 | Curry et al. |
| 6,332,023 B1 | 12/2001 | Porter et al. |
| 6,332,153 B1 | 12/2001 | Cohen |
| 6,335,927 B1 | 1/2002 | Elliott et al. |
| 6,338,064 B1 | 1/2002 | Ault et al. |
| 6,338,088 B1 | 1/2002 | Waters et al. |
| 6,343,115 B1 | 1/2002 | Foladare et al. |
| 6,343,292 B1 | 1/2002 | Roach et al. |
| 6,344,904 B1 | 2/2002 | Mercer |
| 6,347,084 B1 | 2/2002 | Hulyalkar et al. |
| 6,347,085 B2 | 2/2002 | Kelly |
| 6,353,611 B1 | 3/2002 | Norris et al. |
| 6,353,898 B1 | 3/2002 | Wipfel et al. |
| 6,359,880 B1 | 3/2002 | Curry et al. |
| 6,360,271 B1 | 3/2002 | Schuster et al. |
| 6,363,065 B1 | 3/2002 | Thornton et al. |
| 6,366,661 B1 | 4/2002 | Devillier et al. |
| 6,373,929 B1 | 4/2002 | Johnson et al. |
| 6,374,292 B1 | 4/2002 | Srivastava et al. |
| 6,374,302 B1 | 4/2002 | Galasso et al. |
| 6,375,344 B1 | 4/2002 | Hanson et al. |
| 6,377,568 B1 | 4/2002 | Kelly |
| 6,381,321 B1 | 4/2002 | Brown et al. |
| 6,381,651 B1 | 4/2002 | Nishio et al. |
| 6,385,191 B1 | 5/2002 | Coffman et al. |
| 6,385,193 B1 | 5/2002 | Civanlar et al. |
| 6,389,010 B1 | 5/2002 | Kubler et al. |
| 6,389,431 B1 | 5/2002 | Frolund et al. |
| 6,389,541 B1 | 5/2002 | Patterson |
| 6,393,467 B1 | 5/2002 | Potvin |
| 6,400,702 B1 | 6/2002 | Meier |
| 6,405,055 B1 | 6/2002 | Silverbrook et al. |
| 6,407,991 B1 | 6/2002 | Meier |
| 6,418,441 B1 | 7/2002 | Call |
| 6,418,461 B1 | 7/2002 | Barnhouse et al. |
| 6,418,467 B1 | 7/2002 | Schweitzer et al. |
| 6,424,714 B1 | 7/2002 | Wasilewski et al. |
| 6,430,195 B1 | 8/2002 | Christie et al. |
| 6,430,275 B1 | 8/2002 | Voit et al. |
| 6,430,276 B1 | 8/2002 | Bouvier et al. |
| 6,430,282 B1 | 8/2002 | Bannister et al. |
| 6,430,739 B1 | 8/2002 | Ballard |
| 6,431,703 B2 | 8/2002 | Rousseau et al. |
| 6,434,568 B1 | 8/2002 | Bowman-Amuah |
| 6,434,624 B1 | 8/2002 | Gai et al. |
| 6,438,218 B1 | 8/2002 | Farris et al. |
| 6,438,222 B1 | 8/2002 | Burg |
| 6,438,705 B1 | 8/2002 | Chao et al. |
| 6,442,169 B1 | 8/2002 | Lewis |
| 6,442,577 B1 | 8/2002 | Britton et al. |
| 6,445,782 B1 | 9/2002 | Elfe et al. |
| 6,446,200 B1 | 9/2002 | Ball et al. |
| 6,449,650 B1 | 9/2002 | Westfall et al. |
| 6,453,314 B1 | 9/2002 | Chan et al. |
| 6,456,617 B1 | 9/2002 | Oda et al. |
| 6,463,470 B1 | 10/2002 | Mohaban et al. |
| 6,466,570 B1 | 10/2002 | Low et al. |
| 6,466,984 B1 | 10/2002 | Naveh et al. |
| 6,470,081 B1 | 10/2002 | Sbisa et al. |
| 6,477,580 B1 | 11/2002 | Bowman-Amuah |
| 6,484,027 B1 | 11/2002 | Mauney et al. |
| 6,493,733 B1 | 12/2002 | Pollack et al. |
| 6,496,831 B1 | 12/2002 | Baulier et al. |
| 6,498,788 B1 | 12/2002 | Emilsson et al. |
| 6,513,040 B1 | 1/2003 | Becker et al. |
| 6,516,337 B1 | 2/2003 | Tripp et al. |
| 6,519,254 B1 | 2/2003 | Chuah et al. |
| 6,523,027 B1 | 2/2003 | Underwood |
| 6,529,516 B1 | 3/2003 | Parzych |
| 6,556,659 B1 | 4/2003 | Bowman-Amuah |
| 6,556,672 B1 | 4/2003 | Holland et al. |
| 6,557,036 B1 | 4/2003 | Kavacheri et al. |
| 6,564,215 B1 | 5/2003 | Hsiao et al. |
| 6,584,093 B1 | 6/2003 | Salama et al. |
| 6,584,193 B1 | 6/2003 | Petrunka |
| 6,584,548 B1 | 6/2003 | Bourne et al. |
| 6,587,433 B1 | 7/2003 | Borella et al. |
| 6,587,877 B1 | 7/2003 | Douglis et al. |
| 6,587,933 B2 | 7/2003 | Crockett et al. |
| 6,594,254 B1 | 7/2003 | Kelly |
| 6,600,733 B2 | 7/2003 | Deng |
| 6,628,430 B1 | 9/2003 | Silverbrook et al. |
| 6,628,644 B1 | 9/2003 | Nelson et al. |
| 6,636,485 B1 | 10/2003 | Fijolek et al. |
| 6,654,357 B1 | 11/2003 | Wiedeman |
| 6,667,759 B2 | 12/2003 | Gerszberg et al. |
| 6,668,253 B1 | 12/2003 | Thompson et al. |
| 6,671,285 B1 | 12/2003 | Kirkby et al. |
| 6,675,205 B2 | 1/2004 | Meadway et al. |
| 6,678,264 B1 | 1/2004 | Gibson |
| 6,690,782 B2 | 2/2004 | Creamer et al. |
| 6,690,783 B2 | 2/2004 | Creamer et al. |
| 6,690,788 B1 | 2/2004 | Bauer et al. |
| 6,697,174 B2 | 2/2004 | Mercer |
| 6,701,378 B1 | 3/2004 | Gilhuly et al. |
| 6,718,361 B1 | 4/2004 | Basani et al. |
| 6,718,380 B1 | 4/2004 | Mohaban et al. |
| 6,720,915 B2 | 4/2004 | Sheynblat |
| 6,731,732 B2 | 5/2004 | Creamer et al. |
| 6,732,188 B1 | 5/2004 | Flockhart et al. |
| 6,741,871 B1 | 5/2004 | Silverbrook et al. |
| 6,744,877 B1 | 6/2004 | Edwards |
| 6,744,878 B1 | 6/2004 | Komissarchik et al. |
| 6,754,181 B1 | 6/2004 | Elliott et al. |
| 6,754,699 B2 | 6/2004 | Swildens et al. |
| 6,754,714 B1 | 6/2004 | Chebrolu |
| 6,757,740 B1 | 6/2004 | Parekh et al. |
| 6,766,326 B1 | 7/2004 | Cena |
| 6,766,420 B2 | 7/2004 | Rawson, III |
| 6,768,793 B1 | 7/2004 | Sbisa et al. |
| 6,775,519 B1 | 8/2004 | Wiedeman et al. |
| 6,785,769 B1 | 8/2004 | Jacobs et al. |
| 6,788,769 B1 | 9/2004 | Waites |
| 6,789,170 B1 | 9/2004 | Jacobs et al. |
| 6,795,917 B1 | 9/2004 | Ylonen |
| 6,798,767 B1 * | 9/2004 | Alexander et al. ............ 370/352 |
| 6,798,771 B1 | 9/2004 | Low et al. |
| 6,810,033 B2 | 10/2004 | Derks |
| 6,831,915 B1 | 12/2004 | Beyschlag et al. |
| 6,835,135 B1 | 12/2004 | Silverbrook et al. |
| 6,842,612 B2 | 1/2005 | Kalish et al. |
| 6,856,282 B2 | 2/2005 | Mauro et al. |
| 6,859,451 B1 | 2/2005 | Pasternack et al. |
| 6,859,525 B1 | 2/2005 | McElvaney |
| 6,865,608 B2 | 3/2005 | Hunter |
| 6,873,694 B2 | 3/2005 | Lipinski |
| 6,882,643 B1 | 4/2005 | Mauger et al. |
| 6,891,945 B2 | 5/2005 | Porter et al. |
| 6,912,276 B1 | 6/2005 | Olafsson et al. |
| 6,914,686 B2 | 7/2005 | Silverbrook et al. |
| 6,914,969 B2 | 7/2005 | Creamer et al. |
| 6,915,140 B2 | 7/2005 | Silverbrook |

(56) References Cited

U.S. PATENT DOCUMENTS

| | | |
|---|---|---|
| 6,947,982 B1 | 9/2005 | McGann et al. |
| 6,954,525 B2 | 10/2005 | Deo et al. |
| 6,959,420 B1 | 10/2005 | Mitchell et al. |
| 6,961,417 B2 | 11/2005 | Koch |
| 6,963,928 B1 | 11/2005 | Bagley et al. |
| 6,970,914 B1 | 11/2005 | Philyaw et al. |
| 6,973,659 B2 | 12/2005 | Smith et al. |
| 6,983,040 B1 | 1/2006 | Kalmanek, Jr. et al. |
| 6,987,987 B1 | 1/2006 | Vacanti et al. |
| 6,990,465 B1 | 1/2006 | Wandmacher et al. |
| 6,990,495 B1 | 1/2006 | Grason et al. |
| 6,999,206 B2 | 2/2006 | Silverbrook |
| 6,999,444 B1 | 2/2006 | Nitta et al. |
| 7,000,012 B2 | 2/2006 | Moore et al. |
| 7,012,916 B2 | 3/2006 | Low et al. |
| 7,013,001 B1 | 3/2006 | Felger |
| 7,018,294 B2 | 3/2006 | Silverbrook et al. |
| 7,024,450 B1 | 4/2006 | Deo et al. |
| 7,032,022 B1 | 4/2006 | Shanumgam et al. |
| 7,058,726 B1 | 6/2006 | Osaku et al. |
| 7,061,923 B2 | 6/2006 | Dugan et al. |
| 7,065,571 B2 | 6/2006 | Schweitzer et al. |
| 7,065,587 B2 | 6/2006 | Huitema et al. |
| 7,077,748 B2 | 7/2006 | Silverbrook et al. |
| 7,079,292 B2 | 7/2006 | Silverbrook et al. |
| 7,088,705 B2 | 8/2006 | Curry et al. |
| 7,100,195 B1 | 8/2006 | Underwood |
| 7,110,393 B1 | 9/2006 | Tripathi et al. |
| 7,125,337 B2 | 10/2006 | Silverbrook |
| 7,125,338 B2 | 10/2006 | Silverbrook |
| 7,131,001 B1 | 10/2006 | Johnson |
| 7,139,828 B2 | 11/2006 | Alkhatib et al. |
| 7,139,840 B1 | 11/2006 | O'Toole |
| 7,145,898 B1 | 12/2006 | Elliott |
| 7,146,179 B2 | 12/2006 | Parulski et al. |
| 7,155,425 B2 | 12/2006 | Nykanen |
| 7,158,258 B2 | 1/2007 | Silverbrook |
| 7,170,887 B2 | 1/2007 | Rosenberg |
| 7,171,457 B1 | 1/2007 | Wilson et al. |
| 7,185,073 B1 | 2/2007 | Gai et al. |
| 7,206,304 B2 | 4/2007 | Low et al. |
| 7,236,575 B2 | 6/2007 | Kim et al. |
| 7,286,562 B1 | 10/2007 | Vargo et al. |
| 7,336,649 B1 | 2/2008 | Huang |
| 7,451,195 B2 | 11/2008 | Seligmann |
| 7,903,641 B2 | 3/2011 | Low et al. |
| 8,189,565 B2 | 5/2012 | Low et al. |
| 8,204,046 B2 | 6/2012 | Low et al. |
| 8,223,752 B2 | 7/2012 | Low et al. |
| 2001/0014839 A1 | 8/2001 | Belanger et al. |
| 2001/0027098 A1 | 10/2001 | Suzuki |
| 2001/0027406 A1 | 10/2001 | Araki et al. |
| 2001/0027478 A1 | 10/2001 | Meier et al. |
| 2001/0027491 A1 | 10/2001 | Terretta et al. |
| 2001/0030941 A1 | 10/2001 | Musikka et al. |
| 2001/0037302 A1 | 11/2001 | McFadzean et al. |
| 2001/0039576 A1 | 11/2001 | Kanada |
| 2001/0040885 A1 | 11/2001 | Jonas et al. |
| 2001/0044302 A1 | 11/2001 | Okuyama |
| 2001/0052007 A1 | 12/2001 | Shigezumi |
| 2001/0056493 A1 | 12/2001 | Mineo |
| 2002/0006133 A1 | 1/2002 | Kakemizu et al. |
| 2002/0007421 A1 | 1/2002 | Dixon et al. |
| 2002/0013850 A1 | 1/2002 | Mitchell et al. |
| 2002/0016174 A1 | 2/2002 | Gibson et al. |
| 2002/0029207 A1 | 3/2002 | Bakalash et al. |
| 2002/0041590 A1 | 4/2002 | Donovan |
| 2002/0055982 A1 | 5/2002 | Goddard |
| 2002/0064149 A1 | 5/2002 | Elliott et al. |
| 2002/0065041 A1 | 5/2002 | Lunsford et al. |
| 2002/0065932 A1 | 5/2002 | Kobayashi |
| 2002/0073019 A1 | 6/2002 | Deaton |
| 2002/0073139 A1 | 6/2002 | Hawkins et al. |
| 2002/0078102 A1 | 6/2002 | Dutta |
| 2002/0083166 A1 | 6/2002 | Dugan et al. |
| 2002/0085541 A1 | 7/2002 | Migimatsu |
| 2002/0086636 A1 | 7/2002 | Tracy et al. |
| 2002/0097710 A1 | 7/2002 | Burg |
| 2002/0099598 A1 | 7/2002 | Eicher, Jr. et al. |
| 2002/0102974 A1 | 8/2002 | Raith |
| 2002/0114324 A1 | 8/2002 | Low et al. |
| 2002/0116457 A1 | 8/2002 | Eshleman et al. |
| 2002/0129096 A1 | 9/2002 | Mansour et al. |
| 2002/0129157 A1 | 9/2002 | Varsano |
| 2002/0143989 A1 | 10/2002 | Huitema et al. |
| 2002/0147726 A1 | 10/2002 | Yehia et al. |
| 2002/0152245 A1 | 10/2002 | McCaskey et al. |
| 2002/0158765 A1 | 10/2002 | Pape et al. |
| 2002/0161896 A1 | 10/2002 | Wen et al. |
| 2002/0163910 A1 | 11/2002 | Wisner et al. |
| 2002/0165870 A1 | 11/2002 | Chakraborty et al. |
| 2002/0167940 A1 | 11/2002 | Low et al. |
| 2002/0169892 A1 | 11/2002 | Miyaoku et al. |
| 2002/0183038 A1 | 12/2002 | Comstock et al. |
| 2002/0184358 A1 | 12/2002 | Traversat et al. |
| 2002/0194015 A1 | 12/2002 | Gordon et al. |
| 2002/0198985 A1 | 12/2002 | Fraenkel et al. |
| 2003/0005028 A1 | 1/2003 | Dritschler et al. |
| 2003/0005350 A1 | 1/2003 | Koning et al. |
| 2003/0007497 A1 | 1/2003 | March et al. |
| 2003/0009295 A1 | 1/2003 | Markowitz et al. |
| 2003/0014523 A1 | 1/2003 | Teloh et al. |
| 2003/0018726 A1 | 1/2003 | Low et al. |
| 2003/0037146 A1 | 2/2003 | O'Neill |
| 2003/0037232 A1 | 2/2003 | Bailiff |
| 2003/0039210 A1 | 2/2003 | Jin et al. |
| 2003/0039212 A1 | 2/2003 | Lloyd et al. |
| 2003/0040316 A1 | 2/2003 | Stanforth et al. |
| 2003/0046298 A1 | 3/2003 | Weedon |
| 2003/0050918 A1 | 3/2003 | Pilkington et al. |
| 2003/0055908 A1 | 3/2003 | Brown et al. |
| 2003/0055962 A1 | 3/2003 | Freund et al. |
| 2003/0058277 A1 | 3/2003 | Bowman-Amuah |
| 2003/0065779 A1 | 4/2003 | Malik et al. |
| 2003/0065986 A1 | 4/2003 | Fraenkel et al. |
| 2003/0074475 A1 | 4/2003 | Ollikainen |
| 2003/0081758 A1 | 5/2003 | Kumar et al. |
| 2003/0120764 A1 | 6/2003 | Laye et al. |
| 2003/0159083 A1 | 8/2003 | Fukuhara et al. |
| 2003/0167234 A1 | 9/2003 | Bodmer et al. |
| 2003/0177178 A1 | 9/2003 | Jones et al. |
| 2003/0187935 A1 | 10/2003 | Agarwalla et al. |
| 2003/0193933 A1 | 10/2003 | Jonas et al. |
| 2003/0198335 A1 | 10/2003 | Porter et al. |
| 2003/0200272 A1 | 10/2003 | Campise et al. |
| 2003/0200313 A1 | 10/2003 | Peterka et al. |
| 2003/0204815 A1 | 10/2003 | Edwards et al. |
| 2003/0229900 A1 | 12/2003 | Reisman |
| 2003/0233518 A1 | 12/2003 | Yamagami et al. |
| 2004/0005046 A1 | 1/2004 | Deo et al. |
| 2004/0024872 A1 | 2/2004 | Kelley et al. |
| 2004/0025076 A1 | 2/2004 | Cabrera et al. |
| 2004/0031058 A1 | 2/2004 | Reisman |
| 2004/0034808 A1 | 2/2004 | Day et al. |
| 2004/0054854 A1 | 3/2004 | Thiyagaranjan et al. |
| 2004/0059719 A1 | 3/2004 | Gupta et al. |
| 2004/0068579 A1 | 4/2004 | Marmigere et al. |
| 2004/0117404 A1 | 6/2004 | Crivella et al. |
| 2004/0143453 A1 | 7/2004 | Weaver |
| 2004/0158766 A1 | 8/2004 | Liccione et al. |
| 2004/0168184 A1 | 8/2004 | Steenkamp et al. |
| 2004/0179481 A1 | 9/2004 | Graupner |
| 2004/0215787 A1 | 10/2004 | Gibson et al. |
| 2004/0252332 A1 | 12/2004 | McCoog et al. |
| 2004/0268175 A1 | 12/2004 | Koch et al. |
| 2005/0010550 A1 | 1/2005 | Potter et al. |
| 2005/0015466 A1 | 1/2005 | Tripp |
| 2005/0021713 A1 | 1/2005 | Dugan et al. |
| 2005/0044197 A1 | 2/2005 | Lai |
| 2005/0191989 A1 | 9/2005 | Plush et al. |
| 2005/0228937 A1 | 10/2005 | Karr et al. |
| 2005/0246345 A1 | 11/2005 | Lent et al. |
| 2005/0268145 A1 | 12/2005 | Hufferd et al. |
| 2006/0239254 A1 | 10/2006 | Short et al. |

(56) References Cited

U.S. PATENT DOCUMENTS

| | | |
|---|---|---|
| 2007/0050492 A1 | 3/2007 | Jorgensen |
| 2007/0204036 A1 | 8/2007 | Mohaban et al. |
| 2007/0263644 A1 | 11/2007 | Christie et al. |
| 2009/0147937 A1 | 6/2009 | Sullhan et al. |

FOREIGN PATENT DOCUMENTS

| | | |
|---|---|---|
| DE | 4342220 A1 | 6/1994 |
| EP | 0226333 A1 | 6/1987 |
| EP | 235257 A1 | 9/1987 |
| EP | 335562 A2 | 10/1989 |
| EP | 365885 A2 | 5/1990 |
| EP | 381365 A2 | 8/1990 |
| EP | 0456947 A1 | 11/1991 |
| EP | 0484261 A2 | 5/1992 |
| EP | 0549127 A2 | 6/1993 |
| EP | 0559979 | 9/1993 |
| EP | 0633685 A2 | 1/1995 |
| EP | 0654930 | 5/1995 |
| EP | 0669771 A1 | 8/1995 |
| EP | 0701194 A1 | 3/1996 |
| EP | 0708570 A2 | 4/1996 |
| EP | 0709997 A2 | 5/1996 |
| EP | 0710042 A2 | 5/1996 |
| EP | 722237 A1 | 7/1996 |
| EP | 0724368 A2 | 7/1996 |
| EP | 0729281 A2 | 8/1996 |
| EP | 0740445 | 10/1996 |
| EP | 0750256 A2 | 12/1996 |
| EP | 0750440 A2 | 12/1996 |
| EP | 0751656 A2 | 1/1997 |
| EP | 0767568 | 4/1997 |
| EP | 0781016 | 6/1997 |
| EP | 0802690 | 10/1997 |
| EP | 0812088 A2 | 12/1997 |
| EP | 0812089 | 12/1997 |
| EP | 0820028 A2 | 1/1998 |
| EP | 0823809 | 2/1998 |
| EP | 0848540 A2 | 6/1998 |
| EP | 0873637 A1 | 10/1998 |
| EP | 0885530 A1 | 12/1998 |
| EP | 0901296 A2 | 3/1999 |
| EP | 0913968 A1 | 5/1999 |
| EP | 0942363 A2 | 9/1999 |
| EP | 0729281 A3 | 1/2000 |
| EP | 1089580 A2 | 4/2001 |
| EP | 1128632 A2 | 8/2001 |
| EP | 1091528 A2 | 11/2001 |
| EP | 1091528 A3 | 11/2001 |
| EP | 1170662 A2 | 1/2002 |
| EP | 1289235 A2 | 3/2003 |
| GB | 236567 A | 10/1925 |
| GB | 235536 A | 11/1925 |
| GB | 2278000 A | 11/1994 |
| GB | 2300789 A | 11/1996 |
| GB | 2322771 A | 9/1998 |
| GB | 2338372 A | 12/1999 |
| JP | S60204361 A | 10/1985 |
| JP | H0230543 U | 2/1990 |
| JP | H041051 U | 1/1992 |
| JP | H04105113 U | 9/1992 |
| JP | H04286444 A | 10/1992 |
| JP | H0516377 U | 3/1993 |
| JP | H0564045 U | 8/1993 |
| JP | H05201081 A | 8/1993 |
| JP | H05330150 A | 12/1993 |
| JP | H0637944 U | 5/1994 |
| JP | H06149051 A | 5/1994 |
| JP | H06183117 A | 7/1994 |
| JP | H07108688 B2 | 11/1995 |
| JP | H0879417 A | 3/1996 |
| JP | H0890879 A | 4/1996 |
| JP | H08118653 A | 5/1996 |
| JP | H08224730 A | 9/1996 |
| JP | H08256367 A | 10/1996 |
| JP | H0936941 A | 2/1997 |
| JP | H09113990 A | 5/1997 |
| JP | H09116843 A | 5/1997 |
| JP | H09123474 A | 5/1997 |
| JP | H09135316 A | 5/1997 |
| JP | 09168051 | 6/1997 |
| JP | 09168063 | 6/1997 |
| JP | 09168064 | 6/1997 |
| JP | 09168065 | 6/1997 |
| JP | 09172459 | 6/1997 |
| JP | 09172462 | 6/1997 |
| JP | H09187960 A | 7/1997 |
| JP | H09267487 A | 10/1997 |
| JP | H09314918 A | 12/1997 |
| JP | H10116843 A | 5/1998 |
| JP | H10126728 A | 5/1998 |
| JP | H1168851 A | 3/1999 |
| JP | H1168861 A | 3/1999 |
| JP | 2001-169341 A | 6/2001 |
| JP | 2001297027 | 10/2001 |
| JP | 2002132810 A | 5/2002 |
| JP | 2002229836 A | 8/2002 |
| JP | 2002278903 A | 9/2002 |
| JP | 2003218941 A | 7/2003 |
| JP | 2004363685 A | 12/2004 |
| JP | 2006053581 A | 2/2006 |
| RU | 2157596 C2 | 10/2000 |
| RU | 2170454 C2 | 7/2001 |
| WO | 9012466 A1 | 10/1990 |
| WO | 9107839 | 5/1991 |
| WO | 9108629 A1 | 6/1991 |
| WO | 9325035 | 12/1993 |
| WO | 9325035 A1 | 12/1993 |
| WO | 94/08289 A1 | 4/1994 |
| WO | 9411813 | 5/1994 |
| WO | 9423523 | 10/1994 |
| WO | 9423523 A1 | 10/1994 |
| WO | 9501691 A1 | 1/1995 |
| WO | 9522221 | 8/1995 |
| WO | 9522221 A1 | 8/1995 |
| WO | 9525407 A1 | 9/1995 |
| WO | 9529564 | 11/1995 |
| WO | 9531057 A1 | 11/1995 |
| WO | 9531060 A1 | 11/1995 |
| WO | 95/35633 A2 | 12/1995 |
| WO | 9609714 | 3/1996 |
| WO | 9609714 A1 | 3/1996 |
| WO | 9620448 | 7/1996 |
| WO | 9620553 | 7/1996 |
| WO | 9620553 A2 | 7/1996 |
| WO | 9632800 | 10/1996 |
| WO | 9634341 | 10/1996 |
| WO | 9638018 | 11/1996 |
| WO | 9638018 A1 | 11/1996 |
| WO | 96/38962 A1 | 12/1996 |
| WO | 96/42045 A1 | 12/1996 |
| WO | 9714238 | 4/1997 |
| WO | 9715983 A1 | 5/1997 |
| WO | 9716007 | 5/1997 |
| WO | 9716007 A1 | 5/1997 |
| WO | 9716014 A1 | 5/1997 |
| WO | 9719548 A1 | 5/1997 |
| WO | 9720423 A1 | 6/1997 |
| WO | 9720424 | 6/1997 |
| WO | 9722211 | 6/1997 |
| WO | 9723078 | 6/1997 |
| WO | 9723078 A1 | 6/1997 |
| WO | 9726749 | 7/1997 |
| WO | 9728628 | 8/1997 |
| WO | 9732427 | 9/1997 |
| WO | 9733412 | 9/1997 |
| WO | 98/12860 A1 | 3/1998 |
| WO | 9823080 | 5/1998 |
| WO | 9826543 A1 | 6/1998 |
| WO | 9834391 A2 | 8/1998 |
| WO | 9834391 A3 | 8/1998 |
| WO | 9842102 A1 | 9/1998 |
| WO | 9843150 A2 | 10/1998 |

(56) References Cited

FOREIGN PATENT DOCUMENTS

| | | |
|---|---|---|
| WO | 00/14989 A1 | 3/2000 |
| WO | 00/19326 A1 | 4/2000 |
| WO | 0045265 A1 | 8/2000 |
| WO | 0161920 A1 | 8/2001 |
| WO | 0186470 A1 | 11/2001 |
| WO | 0207037 A1 | 1/2002 |
| WO | 0221865 A1 | 3/2002 |
| WO | 02059763 A1 | 8/2002 |
| WO | 02067144 A1 | 8/2002 |
| WO | 03014928 A2 | 2/2003 |
| WO | 03021900 A1 | 3/2003 |
| WO | 03023735 A2 | 3/2003 |
| WO | 2005055561 A2 | 6/2005 |

OTHER PUBLICATIONS

IETF#27, Proceedings of the Twenty-Seventh Internet Engineering Task Force: SURFnet and RARE, Jul. 16, 1993, 6 pages.
IETF#28, Proceedings of the Twenty-Eighth Internet Engineering Task Force (proceedings held Nov. 1993), pp. 258-266 (published no later than Mar. 1994).
Schwartz, Netfind Support for URL-Based Search Customization, Computer Science Department, University of Colorado, Boulder, Netfind Version 4.3, Jun. 28, 1994, 5 pages, retrieved at <http://alumnus.caltec.edu/-whitegt/data_files/Netfind.WP.URLs>.
Raatikainan, Database Access in Intelligent Networks, Proceedings of IFIP TC6 Workshop in Intelligent Networks (proceedings held Aug. 1994): Database Access in Intelligent Networks, University of Helsinki, Department of Computer Science, pp. 163-183 (book published May 1995).
Sprint's Preliminary Invalidity Contentions, *Comcast IP Holdings I, LLC v. Spring Communications Company L.P.*, civil action No. 1:12-cv-00205-RGA, including Exhibits A-P (dated Dec. 3, 2012).
VoIP Watch, "All About Voice Over IP and Internet Based Telephony", Apr. 19, 2007, 2 pages.
Kahane, et al., "Call Management Agent System Specification", VoIP-0017, Aug. 15, 1996, 36 pages.
Sebestyen, "What is the Position of Q.2, Q.3/15 on Internet Telephony for the IMTC VoIP Forum Meeting in Seattle", ITU Telecommunication Standardization Sector, Study Group 15, Q.2&3/15 Rapporteur Meeting, Dec. 17-20, 1996, 5 pages.
Petrack, "Backup and Alternate Gatekeepers in H.323 for High Availability, Reliability and Scalability", ITU Telecommunication Standardization Sector, Study Group 16, Ex. Q.2&3/15 Rapporteur Meeting, Feb. 1-21, 1997, 7 pages.
Chapter 5: The CMA System, VoIP Forum, Oct. 11, 1996, 38 pages.
Kahane, "Introduction to VocalTec's CMA System, Intelligent Switching for a New Era of Telecom", Nov. 7, 1996, 18 pages.
CMA IPR Additions, Nov. 17, 2008, 3 pages.
Patel, et al., "The Multimedia Fax—MIME Gateway", Multimedia, IEEE 1994, vol. 1, Issue 4, pp. 64-70.
Rosenberg, et al., "Internet Telephony Gateway Location", in Proc. of IEEE Infocom, Mar. 1998, 9 pages.
IMTC Voice Over IP Forum Service Interoperability Implementation Agreement, Draft 0.91, VOIP97-008, Jan. 13, 1997, 70 pages.
IMTC VoIP Forum Contribution, Proposal for Use of LDAP for Internet Telephony Directory Services, Mar. 11, 1997, 8 pages.
Dynamic Address Mappings for Basic Call Management within the VoIP IA 1.0, Jun. 16, 1997, 5 pages.
"Prior Art on Verizon's VoIP Patents," <http://www.techdirt.com/articles/200704171005814.shtml>, Apr. 17, 2007, 9 pages.
Another Day, Another Set of Prior Art Discovered Against Verizon's VoIP Patents, <http://www.techdirt.com/articles/20070423/094554.shtml>, Apr. 23, 2007, 5 pages.
Verizon Gets Smacked Down for Its VoIP Patent Suing Spree, <http://www.techdirt.com/articles/20081006/2246322473.shtml>, Oct. 6, 2008, 3 pages.
Shockey, "ENUM: Phone Numbers Meet the Net", <http://www.callcentermagazine.com/article/CTM20010618S0010>, Jun. 18, 2001, 4 pages.
Infrastructure ENUM, <http://www.circleid.com/posts/infrastructure_enum/>, Apr. 5, 2007, 7 pages.
TPC.INT: msg#00161, <http://osdir.com/ml/ietf.fax/1996-12/msg00161.html>, Dec. 19, 1996, 2 pages.
Decker, "New Internet/Telecom Product/Technology Wanted", <http://groups.google.com/group/comp.dcom.telecom/browse_thread/thread/1227ba19866a342612...>, Sep. 22, 1995, 3 pages.
Michalski, "The Internet as Communications Lab", Release 1.0, 2-94, Feb. 18, 1994, 28 pages.
Free World Dialup and Verizon's patent on "name translation", The Jeff Pulver Blog, <http://pulverblog.pulver.com/archives/006846.html>, Apr. 23, 2007, 4 pages.
Rose, et al., "An Experiment in Remote Printing", RFC1486, <http://tools.ietf.org/html/rfc1486>, Jul. 1993, 14 pages.
Alvestrand, et al., "Mapping between X.400 and RFC-822 Message Bodies", RFC1495, <http://tools.iettorg/html/rfc1495>, Aug. 1993, 12 pages.
Rose, "Principles of Operation for the TPC.INT Subdomain: Radio Paging—Technical Procedures", RFC1569, <http://tool.ietf.org/html/rfc1569>, Jan. 1994, 7 pages.
Klensin, et al., "SMTP Service Extensions", RFC1651, <http://tools.ietf.org/html/rfc1651>, Jul. 1994, 12 pages.
Klensin, et al., "SMTP Service Extension for 8bit-MIMEtransport", RFC1652, <http://tool.ietf.org/html/rfc1652>, Jul. 1994, 7 pages.
Rose, "Principles of Operation for the TPC.INT Subdomain: Radio Paging—Technical Procedures", RFC1703, <http://tools.ietf.org/html/rfd1703>, Oct. 1994, 10 pages.
Telecom Digest, Sep. 21, 1995, vol. 15, Issue 400, <http://massis.lcs.mit.edu/archives/back.issues/1995. volume.15/vol15.iss351-400>, Sep. 21, 1995, 5 pages.
Validity of Verizon's VoIP Patents Challenged—PC World, <http://www.pcworld.com/article/130864/validity_of_verizons_voip_patents_challenged.html>, Apr. 18, 2007, 4 pages.
Malamud, et al., "Principles of Operation for the TPC.INT Subdomain: General Principles and Policy", RFC 1530, 6 pages, Oct. 1993.
Berners-Lee, "Universal Resource Identifiers in WWW", RFC 1630, 23 pages, Jun. 1994.
Manning, et al., "DNS NSAP Resource Records", RFC 1706, 9 pages, Oct. 1994.
Swale, "Virtual Networks of the Future—Converging Public and Private IN", BT Technology Journal, pp. 6/1-6/5, 1993.
Swale, et al., "Convergence of the Public and Private IN", BT Technology Journal, pp. 216-221, 1992.
"Web-On-Call Voice Browser Redefines Access to the Web", The Netphonic Press Release, Mar. 1996.
Atkins, et al., "Integrated Web and Telephone Service Creation", Bell Labs Technical Journal, pp. 19-35, 1997.
Tao, et al., "Internet Access via Baseband and Broadband ISDN Gateways", IEEE International Conference on Computers and Communications, pp. 485-490 (Apr. 1994).
"Workstation Communications System", IBM Technical Disclosure Bulletin, vol. 37, No. 39, Sep. 1994.
Bonetti, et al., "Distribution of RFC 1327 Mapping Rules via the Internet DNS: the INFNet Distributed Gateway System", Computer Networks and ISDN Systems, vol. 27, No. 3, pp. 461-469, Dec. 1994.
Sevick, et al., "Customers in Driver's Seat: Private Intelligent Network Control Point", ISS '95 World Telecommunications Congress, vol. 2, pp. 41-44, 1995.
Yang, et al., "The Design and Implementation of a Service Logic Execution Environment Platform", Globecom '93, vol. 3, Nov. 1993.
Esaki, et al., "Abstraction and Control of Transport Network Resources for Intelligent Networks", Electronics & Communications in Japan: Part 1—Communications, vol. 76, No. 1, Jan. 1993.
Chang, et al., "Rapid Deployment of CPE-based Telecommunications Services", IEEE Globecom, vol. 2, pp. 876-880, Nov. 1994.
Swale, et al., "Distributed Intelligence and Data in Public and Private Networks", BT Technology Journal, vol. 13, No. 2, pp. 95-104, Apr. 1995.
Comer, et al., "Uniform Access to Internet Directory Services", Computer Communication Review, vol. 20, No. 4, pp. 50-59, Sep. 1990.
Comer, Internetworking with TCP/IP vol. 1: Principles, Protocols and Architecture, Prentice-Hall, Inc., pp. 329-330, 1991.

(56) References Cited

OTHER PUBLICATIONS

Mach2DNS (Domain Name Services) Module Au-A-11045/97, Jun. 13, 1995.
Mullett, "Proper Care and Feeding of Firewalls", Sun Microsystems, pp. 1-12, Nov. 14, 1994.
Crocker, "RFC 822-Standard for the Format of ARPA Internet Text Messages", RFC 822, Internet: <http://www.faqs.org/rfcs/rfc822.html>, pp. 1-42, Aug. 13, 1982.
Girod, et al., "Requirements for URN Resolution Systems", Internet: <http://www.potaroo.net/ietf/idref/draft-girod-urn-res-require/>, pp. 1-31, Jun. 13, 1996.
Hamilton, "Uniform Resource Identifiers & The Simple Discovery Protocol", Department of Computer Studies, Loughborough University of Technology, Internet: <http://martinh.net/uris/uris.html>, 32 pages, Jun. 20, 1995.
Hardcastle-Kille, "RFC 1279-X.500 and Domains", RFC 1279, Internet: <http://www.faqs.org/rics/rfc1279.html>, pp. 1-12, Nov. 1991.
Mealling, et al., "Uniform Resource Names, ISO OIDs and DNS", Internet, <http://www.gbiv.com/protocols/uri/draffs/draft-mealling-oid-dns-00.txt>, pp. 1-14, Nov. 22, 1995.
Mitra, et al., "Uniform Resource Names", Internet: <http://www.mitra.biz/uri/draft-ictf-uri-resource-names-03.txt>, pp. 1-9, Nov. 1994.
Mockapetris, "RFC 1101-DNS Encoding of Network Names and Other Types", Internet: <http://www.faqs.org/rfcs/rfc1101.html>, pp. 1-12, Apr. 1989.
Shafer, et al., "URN Services", Internet: <http://staff.oclc.org/oclc/research/publications/shafer/urn/draft-shafer-uri-um-resolution-00.html>, pp. 1-10, Jun. 1995.
Shafer, et al., "URN Services", Internet: <http://staff.oclc.org/oclc/research/publications/shafer/urn/draft-ietf-uri-um-resolution-01.html>, pp. 1-14, Jul. 1995.
Sollins, et al., "RFC 1737—Functional Requirements for Uniform Resource Names", RFC 1737, Internet: <http://www.faqs.org/rfcs/rfc1737.html>, pp. 1-6, Dec. 1994.
The URN Implementors, "Uniform Resource Names", D-Lib Magazine, Internet: <http://www.dlib.org/dlib/February96/02arms.html>, pp. 1-6, Feb. 1996.
Biala, "Mobile Radio and Intelligent Networks", Principles and Realization of Mobile Communication, 2nd, Revised Edition, pp. 42-44, 49-51, 53, 82-83 and 341, 1995.
Everhart, et al., "RFC 1183—New DNS RR Definitions", Internet: <http://www.faqs.org/rfcs/rfc1183.html>, pp. 1-9, Oct. 1990.
Hvasshovd, et al., "The ClustRa Telecom Database: High Availability, High Throughput, and Real-Time Response", Proceedings of the 21st VLDB Conference, pp. 469-477, 1995).
Corner, "Internetworking with TCP/IP vol. I: Principles, Protocols and Architecture", Third Ed., Prentice Hall, 1995, pp. 127-578.
Duan, et al., "Efficient Utilization of Multiple Channels Between Two Switches in ATM IN atm Networks", IEEE Conference on Communications, Jun. 1995, pp. 1906-1911.
Ejiri, "For Whom the Advancing Service/Network Management", IEEE Network Operations and Management Symposium, Feb. 14-17, 1994, pp. 422-433.
Elia, et al., "Skyplex: Distribution Up-Link for Digital Television via Satellite", Apr. 1996, pp. 305-313.
Ely, "The Service Control Point as a Cross Network Integrator", Apr. 1996, pp. 1-8.
Feinmann, "VIC Computer Telephony", Computer Telephony, Mar. 1996, 3 pages.
Ganor, "Talk, Talk", Tele.com, Jun. 1996, pp. 68-72.
Grami, et al., "The Role of Satellites in the Information Superhighway", Jun. 1995, pp. 1577-1581.
Gupta, et al., "Technical Assessment of (T) INA-TMN-OSI Technology for Service Management Applications", Feb. 1994, pp. 877-887.
Inamori, et al., "Applying TMN to a Distributed Communications Node System with Common Platform Software", IEEE Feb. 1995, pp. 83-87.

Jain, "Evolving Existing Narrowband Networks Broadband Networks with IN Capabilities", IEEE Apr. 1996, 6 pages.
Kim, "Talk is Cheap", America's Network, Jul. 15, 1996, pp. 34-39.
Kishimoto, "Agent Communication System for Multimedia Communication Service", IEEE Infocom, Mar. 1996, Proceedings vol. 1, pp. 10-17.
Fridisch, et al., "Terminals for Accessing the Internet—The Internet Telephne", Alcatel Telecommunications Review—4th Quarter, Dec. 1996, pp. 304-309.
Diehl, "Data's New Voice", Byte, Sep. 1996, pp. 129-135.
Braun, et al., "A Framework for Flow-Based Accounting on the Internet", Sep. 1993, 5 pages.
Margulies, "CT's Cyberdate with the 'Net", Aug. 1996, Computer Telephony Periscope, pp. 28-29.
Black, "OSI: A Model for Computer Communications Standards", Prentice-Hall, Inc., 1991, pp. 157-201.
Arango, et al., Guaranteed Internet Bandwidth, IEEE Nov. 1996, pp. 862-866.
Perret, et al., "MAP: Mobile Assistant Programming for Large Scale Communications Networks", Apr. 1996, pp. 1128-1132.
Platt, "Why IsoEthernet Will Change the Voice and Video Worlds", IEEE Communications Magazine, Apr. 1996, pp. 55-59.
Retkwa, "Telephone Politics", Internet World, Jun. 1996, pp. 54-60.
Schreyer, et al., "Least Cost Call Routing", IEEE Jun. 1996, 7 pages.
Serrano, "Evolution of Hybrid Fibre Coaxial Network for Multimedia Interactive Services", British Telecommunications Engineering, Oct. 1996, pp. 249-253.
Sunaga, et al., "A Reliable Communication Switching Platform for Quick Provisioning", IEEE Feb. 1995, pp. 77-82.
Telephony on the Internet, (Workshop Information) presented by International Quality & Productivity Center, IMTC and Voice Technology & Services News, Sep. 1996, 6 pages.
Tsuchida, et al., "Intelligent Dynamic Service Provisioning Architecture in the Multimedia Era", Communications—Gateway to Globalization, IEEE Apr. 1996, pp. 1117-1122.
Estrin, et al., "Design Considerations for Usage Accounting and Feedback in Internetworks", Oct. 1990, 12 pages.
Lee, et al., "Integrated Packet Networks with Quality of Service Constraints", Global Telecommunication Conference, IEEE Dec. 1991, pp. 223-227.
Bohn, et al., "Mitigating the Coming Internet Crunch: Multiple Service Levels via Precedence", Journal of High Speed Network, vol. 3, No. 4, 1994, pp. 335-349.
Eriksson, "MBONE: The Multicase Backbone", Communications of the ACM, vol. 57, No. 8, Aug. 1994, pp. 54-60, 13 pages.
Gralla, "How the Internet Works", Communication on the Internet, Chapter 12, Jun. 1996, pp. 64-67.
Kahn, "Videoconferencing Debuts on the Internet", Feb. 28, 1995, 2 pages.
Sullivan, "Videoconferencing Arrives on the Internet", PC Week, Aug. 1996, 1 page.
Macedonia, et al., "Mbone Provides Audio and Video Across the Internet", Apr. 1994, 13 pages.
Schulzrinne, "RFC 1890-RTP: Profile for Audio and Video Conferences with Minimal Control", Jan. 1996, 18 pages.
Schulzrinne, "RFC 1889-RTP: A Transport Protocol for Real-Time Applications", Jan. 1996, 151 pages.
Sclavos, et al., "Information model: From Abstraction to Application", Feb. 1994, 13 pages.
Sriram, et al., "Voice Packerization and Compression in Broadband ATM Networks", Apr. 1991, IEEE Journal on Selected Areas in Communications, vol. 9, No. 3, pp. 294-304.
CT and the 'Net, "Audio and Video Over the Internet", Mar. 1996, 22 pages.
CT and the 'Net, "Supercharging the Web with Computer Telephony", Mar. 1996, 18 pages.
El-Gendy, H., et al., "Computer-Supported Routing for Intelligent Networks and Personalized Wired Communications", IEEE, Nov. 1994, pp. 1027-1033.
Grigonis, "Computer Telephony Over the Internet", CT and the Net, Mar. 1996, 6 pages.
McConnell, "How to Build an Internet PBX", <http://www.phonezone.com/ip-phone.htm>, Oct. 1996, pp. 1-9.

(56) References Cited

OTHER PUBLICATIONS

Sears, "Innovations in Internet Telephony: The Internet as the Competitor to the Pots Network", Innovations in Internet Telephony: The Internet as the Successor to the Pots Network, Feb. 28, 1996, pp. 1-6.
Stylus Innovation, "Computer Telephony and the Internet", <http://www.stylus.com/hvml.htm>, Oct. 1996, 9 pages.
Welcome to the Phone Zone, Pacific Telephony Design, <http://www.phonezone.com/index2.htm>, obtained from Internet Oct. 28, 1996, pp. 1-9.
Yang, "INETPhone: Telephone Services and Servers on Internet", RFC 1789, Apr. 1995, Oct. 1996, pp. 1-6.
Ng, et al., "Distributed Architectures and Databases for Intelligent Personal Communication Networks", 1992 IEEE, ICWC '92, Jun. 1992, pp. 300-304.
Malyan, et al., "Network Architecture and Signaling for Wireless Personal Communications", IEEE Journal on Selected Areas in Communications, vol. 11, No. 6, Aug. 1993, 12 pages.
Malyan, et al., "A Microcellular Interconnection Architecture for Personal Communications Networks", 1992 IEEE, May 1992, pp. 502-505.
Cheriton, "Dissemination-Oriented Communication Systems: Final Report", Nov. 26, 1996, 18 pages.
Imilienski, et al., "Mobile Wireless Computing", Communications of the ACM, Oct. 1994, vol. 37, No. 10, pp. 18-28.
Bakre, et al., "M-RPC: A Remote Procedure Call Service for Mobile Clients", 1995 ACM 0-89791-814-S/95/10, Nov. 1995, pp. 97-110.
O'Malley, et al., "A Dynamic Network Architecture", ACM Transactions on Computer Systems, vol. 10, No. 2, May 1992, pp. 110-143.
Cheshire, et al., "Internet Mobility 4x4", ACM 1996, <www.acm.org.>, Aug. 1996, pp. 1-12.
Chang, et al., "A Service Acquisition mechanism for the Client/Service Model in Cygnus", IBM Canada Laboratory Technical Report TR 74.059, 1991, May 1991, pp. 323-345.
Low, et al., "Webin—An Architecture for Fast Development of In-Based Personal Services" Workshop Record Intelligent Network. Freedom and Flexibility: Realizing the Promise of Intelligent Network Services, IEEE, Apr. 21, 1996, 6 pages.
Johnson, "Scalable Support for Transparent Mobile Host Internetworking", Wireless Networks 1 (1995), Sep. 1995, pp. 311-321.
Cobbold, et al., "Enhancements for Integrated Wireless Personal Communications Over Metropolitan Area Networks", IEEE, Apr. 1996, pp. 1370-1376.
Jennings, "End-user Requirements for High-Integrity Directory", 1996, ICC '96, Conference Record, Converging Technologies for Tomorrow's Applications, 1996 IEEE International Conference on vol. 3, Jun. 23-27, 1996, pp. 1793-1796, vol. 3; Digital Object Identifier 10.1109/ICC.1996.535599.
Anand, et al., "Accounting Architecture for Cellular Networks", 1996 IEEE, Feb. 1996, pp. 184-189.
Civanlar, et al., "FusionNet: Joining the Internet & Phone Networks for Multimedia Applications", Nov. 1996, pp. 431-432.
Karttunen, et al., "Cost Structure Analysis and Reference Model for Scaleable Network Services", The Institution of Electrical Engineers, Nov. 1996, pp. 3/1-3/9.
Crowcroft, et al., "Pricing Internet Services", 1996, 17 pages.
Chen, et al., "ATM and Satellite Distribution of Multimedia Educational Courseware", IEEE, Jun. 1996, pp. 1133-1137.
Aidarous, et al., "The Role of the Element Management Layer in Network Management", IEEE Network Operations and Management Symposium, Feb. 14-17, 1994, pp. 59-70.
Pontailler, "TMN and New Network Architectures", IEEE Communications Magazine, Apr. 1993, 6 pages.
Li, et al., "Time-Driven Priority Flow Control for Real-Time Heterogeneous Internetworking", Proceedings in Computer Communications, Fifteenth Annual Joint Conference of the IEEE Computer Communication Generation, San Francisco, Mar. 24-28, 1996, vol. 1 Conf., Mar. 24, 1996 IEEE, pp. 189-197.
Newton, "Telephony Messaging on the Internet", Computer Telephony, Jul. 1996, pp. 10-16.
Gareiss, "Voice Over the Internet", Data Communications, vol. 25, No. 12, Sep. 1996, pp. 93, 94, 96, 98 and 100.
Mills, "Phone Service Via the Internet May Slash Rates", The Washington Post, Aug. 11, 1996, p. A4.
Venditto, "Internet Phones, The Future is Calling", Internet World, Jun. 1996, pp. 40-52.
Carrel, "The TACACS+ Protocol, Version 1.75", Network Working Group, Lol Grant, Internet-Draft Systems, Oct. 1996, draft-grant-tacacs-00.txt, 64 pages.
Low, "The Internet Telephony Red Herring", IEEE 1996, May 15, 1996, pp. 72-80.
Chapman, et al., "Overall Concepts and Principles of TINA Version 1.0", Telecommunications Information Networking Architecture Consortium, TINA-C Deliverable. Date of Issue: Feb. 17, 1995, 65 pages.
Parness, "IDT to Unveil Net2Phone At Comdex; Revolutionary System Uses Internet to Make Overseas PC-to-Telephone Calls for 10 cents a Minute", Nov. 6, 1995, <www.highbeam.com>, 2 pages.
Fuente, et al., "Application of the TINA-C Management Architecture", Apr. 1995, 12 pages.
Finseth, "An Access Control Protocol, Sometimes Called TACACS", University of Minnesota, Jul. 1993 Network Working Group, Request for Comments: 1492, 22 pages.
"VocalTec's Telephony Gateway—The Ultimate Internet Telephony Solution?", Computer Telephony, Sep. 1996, p. 30, 3 pages.
Fang, "Building an Accounting Infrastructure for the Internet", IEEE Nov. 1996, pp. 105-109.
Lipoff, "Operations Support System Framework for Data Over Cable Services", Data Over Cable Technical Reports, TR-DOCS-OS-SIW08-961016, Oct. 16, 1996, pp. 1-20.
Edell, et al., abstract, "Billing Users and Pricing for TCP", Journal on Selected Areas in Communications, vol. 13, Issue 7, Sep. 1995, 2 pages.
Berners-Lee, et al., "Hypertext Transfer Protocol—HTTP/1.0", HTTP Working Group Internet Draft (Oct. 1995).
Eckardt, et al., "On the Personal Communications Impacts on Multimedia Teleservices", Technical University of Berlin, pp. 435-449, 1994.
Mockapetris, "Domain Names—Concepts and Facilities", RFC 1034, Nov. 1987.
Mockapetris, "Domain Names—Implementation and Specification", RFC 1035, 45 pages, Nov. 1987.
Malamud, et al., "Principles of Operation for the TPC/INT Subdomain: Remote Printing—Technical Procedures", RFC 1528, 10 pages, Oct. 1993.
Malamud, et al., "Principles of Operation for the TPC.INT Subdomain: Remote Printing—Administrative Policies", RFC 1529, 5 pages, Oct. 1993.
SG15 Plenary, May 28, 1996, regarding H.323, 82 pages.
RFC 1034, Nov. 1987, 41 pages.
RFC 1035, Nov. 1987, 49 pages.
SS7 Signaling Protocol, Message Transfer Part (MTP), Mar. 1996, 427 pages.
SS7 Signaling Protocol, Signalling Connection Control Part (SCCP), Oct. 1992, 220 pages.
Martersteck, et al., "The 5ESS Switching System: Introduction,"AT&T Technical Journal, Jul. 1985, 10 pages.
Office Action, U.S. Appl. No. 11/066,880 (pending), mailed Sep. 24, 2008.
Karn, "Geek of the Week, Mobile IP Networking", Internet Talk Radio, Nov. 1993, 17 pages.
Yamada, et al., "A Study on in Basic Call State Model for Packet Switched Network", IEEE, Apr. 1996, 18 pages.
ANSI, Signalling System No. 7 (SS7), General Information, ANSI, Jun. 1992, 78 pages.
Cohen, Specifications for the Network Voice Protocol (NVP), Jan. 29, 1976, 33 pages.
Everhart, et al., "New DNS RR Definitions", RFC 1183, Oct. 1990, 11 pages.
Schulzrinne, "Simple Conference Invitation Protocol", Internet Draft, Feb. 22, 1996, 19 pages.

(56) References Cited

OTHER PUBLICATIONS

Vocaltec's Telephony Gateway Software Captures 1996 Product of the Year Honors from Computer Telephony Magazine, Dec. 18, 1996, 2 pages.
Verjinski, "PHASE, A Portable Host Access System Environment", IEEE, Oct. 1989, 4 pages.
Schulzrinne, "Personal Mobility for Multimedia Services in the Internet", IDMS 1996, Mar. 1996, 18 pages.
Garrahan, et al., "Intelligent Network Overview", IEEE Communications Magazine, Mar. 1993, 7 pages.
Ash, et al., "Design & Optimization of Networks with Dynamic Routing", The Bell System Technical Journal, vol. 60, No. 8, Oct. 1981, pp. 1787-1820.
Graff, et al., "The 5ESS Switching System: Physical Design/Hardware,"AT&T Technical Journal, Jul. 1985, 46 pages.
Bellcore Document GR-1428-CORE, CCS Network Interface Specification (CCSNIS), Supporting Toll-Free Service, A Module of CCSNIS, FR-905, May 1995, 93 pages.
Gasman, "Broadband Networking", 1994, 209 pages.
Email from Dr. Schulzrinne regarding publication of SCIP, Oct. 10, 1995, 1 page.
GR-1280-CORE, Advanced Intelligent Network (AIN) Service Control Point (SCP) Generic Requirements, Telcordia Technologies Generic Requirements, Issue 1, Aug. 1993, 637 pages.
GR-2863-CORE, CCS Network Interface Specification (CCSNIS) Supporting Advanced Intelligent Network (AIN), Bellcore, Generic Requirements, Issue 2, Dec. 1995, 148 pages.
Internet Phone Release, Getting Started Guide, 1996, 18 pages.
Gibson, "Web Foes Belong in 'Animal House'," PC Week, Aug. 19, 1996, 1 page.
VocalTech Homepage—2 pages, no earlier than Dec. 1996.
Supplementary European Search Report for EP00976942 dated Jul. 7, 2003.
International Search Report for PCT/US00/30448 dated Jan. 16, 2001, 3 pages.
Haugk, et al., "The 5ESS Switching System: Maintenance Capabilities,"AT&T Technical Journal, Jul. 1985, 32 pages.
Basinger, et al., "The 5ESS Switching System: System Development Environment," AT&T Technical Journal, Jul. 1985, 18 pages.
Bauer, et al., "The 5ESS Switching System: System Test, First-Office Application, and Early Field Experience," AT&T Technical Journal, Jul. 1985, 20 pages.
Borum, et al., "The 5ESS Switching System: Hardware Design," AT&T Technical Journal, Jul. 1985, 21 pages.
Byrne, et al., "The 5ESS Switching System: Applications Planning," AT&T Technical Journal, Jul. 1985, 23 pages.
Carney, et al., "The 5ESS Switching System: Architectural Overview,"AT&T Technical Journal, Jul. 1985, 18 pages.
Delatore, et al., "The 5ESS Switching System: Factory System Testing,"AT&T Technical Journal, Jul. 1985, 22 pages.
Delatore, et al., "The 5ESS Switching System: Operational Software,"AT&T Technical Journal, Jul. 1985, 28 pages.
Fuhrer, et al., "The 5ESS Switching System: Operations, Administration, and Maintenance Capabilities,"AT&T Technical Journal, Jul. 1985, 14 pages.
"H.323: The Leading Standard in Voice Over IP,", Dec. 1996, 4 pages.
Miller, "Managing the Internet", Troubleshooting TCP/IP, Chapter 7, 1992, pp. 365-375.
Oppen, et al., "The Clearinghouse: A Decentralized Agent for Locating Named Objects in a Distributed Environment", ACM Transactions on Office Information Systems, vol. 1, No. 3, Jul. 1983, pp. 230-235.
Sharp, et al., "Advanced Intelligent Networks—Now a Reality", Electronics & Communication Engineering Journal, Jun. 1994, pp. 153-162.
Freiedes, et al., "ISDN opportunities for Large Business—800 Service Customers", IEEE International Conference on Communications, Jun. 1986, vol. 1, 7 pages.
Mark Handley, "Session Invitation Protocol," Feb. 22, 1996, 17 pages.

Yeager, et al., "Web Server Technology, the Advanced Guide for World Wide Web Information Providers", Chapter 6: Searching for Information on the Web, 6.8.2. Using Database as Indexes to a Document Collection, Apr. 1996, 3 pages.
Matta, et al., "Type-of-Service Routing in Dynamic Datagram Networks", Jun. 1994, Proceedings of the Conference on Computer Communications, IEEE, pp. 992-999.
Peeren, "The Intelligent Web", IEEE Apr. 1996, vol. 1, 13 pages.
Clark, et al., "Supporting Real-Time Applications in an Integrated Services Packet Network: Architecture and Mechanism", Oct. 1992 ACM 0-89791-526-7/92/0008/0014, pp. 14-26.
Low, "The Internet Telephony Red Herring", Intelligent Networked Platforms Dept., Intelligent Networked Computing Laboratory, Hewlett-Packard Laboratories, Bristol, May 15, 1996, pp. 1-15.
Waksberg, "Axe 10 and the Intelligent Network", Commutation and Transmission, No. 4, Dec. 1993, pp. 67-76.
Harmer, et al., "On the Move Project", Dec. 1996, pp. 1-44.
Sisalem, et al., "The Network Video Terminal", IEEE, Aug. 1996 Proceedings, pp. 3-10.
Kolarov, et al., "End-to-End Adaptive Rate Based Congestion Control Scheme for ABR Service in Wide Area ATM Networks", Feb. 1995, pp. 138-143.
Niitsu, et al., "Computer-Aided Stepwise Service Creation Environment for Intelligent Network", Supercomm/International Conference on Communications, Jun. 14, 1992, pp. 454-458.
Sairamesh, et al., "An Approach to Pricing, Optical Allocation and Quality of Service Provisioning in High Speed Packet Networks", Fourteenth Annual Joint conference of the IEEE Computer and Communication Societies, vol. 2, Apr. 1995, 21 pages.
Sibal, et al., "Controlling Alternate Routing in General Mesh Packet Flow Networks", Association of Computing Machinery, Aug. 1994, pp. 168-179.
Morgan, et al., "Service Creation Technologies for the Intelligent Network", AT&T Technical Journal, Jan. 1991, pp. 58-71.
Fujioka, et al., "Universal Service Creation and Provision Environment for Intelligent Network", International Switching Symposium, May 1990, pp. 149-156.
Moy, "RFC 1247—IETF Network Working Group: OSPF Version 2", Jul. 1991, <http://tools.ietf.org/html/rfc1247>, 183 pages.
Ahmadi, et al., NBBS Traffic Management Overview, IBM Systems Journal, vol. 34, No. 4, Dec. 1995, pp. 640-648.
Braden, et al., "Integrated Services in the Internet Architecture: An Overview", RFC 1633, Jul. 1994, 28 pages.
Bellamy, "Digital Telephony", John Wiley & Sons, Inc., 1982, pp. vii-ix, 9-14 and 238-240. (See Accompanying Statement Regarding Month of Publication).
Huitema, "Routing in the Internet", Prentice-Hall PTR, Mar. 1995, 168 pages.
Ziegler, "A Distributed Information System Study", IBM System Journal, vol. 18, No. 3, Dec. 1979, pp. 374-401.
Elixman, et al., "OpenSwitching-Extending Control Architectures to Facilitate Applications", International Switching Symposium, vol. 2, Apr. 23, 1995, pp. 239-243.
Kabay, et al., "The Service Node—An Advanced in Services Element", Technology Journal, vol. 13, No. 2, Apr. 1995, pp. 64-72.
Maruyama, "A Concurrent Object-Oriented Switching Program in Hill", IEEE Communications Magazine, vol. 29, No. 1, Jan. 1991, pp. 60-68.
Mayer, et al., "Service Net—2000: An Intelligent Network Evolution", AT&T Technical Journal, vol. 70, No. 3/4, Jan. 1991, pp. 99-110.
Shabana, et al., "Intelligent Switch Architecture", Proceedings of the National Communications Forum, vol. 22, No. 2, Sep. 30, 1988, pp. 1312-1320.
Xiao, et al., abstract, "Sharing Model of Netware Node Resources and Real-Time Scheduling", Journal: Mini-Micro Systems, vol. 16, No. 12, Dec. 1995, 1 page.
Gupta, et al., "Resource Sharing for Multi-Party Real-Time Communication", Conference Title: Proceedings IEEE Infocom '95, The Conference on Computer Communications, Fourteenth Annual Joint Conference of the IEEE Computer and Communications Societies, Bringing Information to people. Part vol. 3, Apr. 1995, pp. 1230-1237.

(56) References Cited

OTHER PUBLICATIONS

Klein, et al., "Minimax Resource Allocation with Tree Structred Substitutable Resources", Journal: Operations Research, vol. 39, No. 2, Mar. 1991, pp. 285-295.
Weinrib, et al., abstract, "Decentralized Resource Allocation for Distributed Systems", Conference Title: IEEE Infocom '87. The Conference on Computer Communications. Proceedings. Sixth Annual Conference—Global Networks: Concept to Realization, Mar. 1987, 1 page.
G.S. Lauer, IN Architectures for Implementing Universal Personal Telecommunications, IEEE Networks Mar./Apr. (1994) 6-16.
Going beyond the sandbox: An overview of the new security architecture in the Java Development Kit 1.2—Gong, Mueller, et al.—1997.
Grami et al., "The Role of Satellites in the Information Superhighway," Jun. 1995: pp. 1577-1581.
Gupta et al., "Technical Assessment of (T) INA-TMN-OSI Technology for Service Management Applications," Feb. 1994: pp. 877-887.
I. Faynberg, M. Krishnaswamy and H. Lu A proposal for Internet and Public Switched Telephone Networks (PSTN) Interworking, 1997.
Inamori et al., "Applying TMN to a Distributed Communications Node System with Common Platform Software," Feb. 1995: pp. 83-87.
Introduction to the Intelligent Network Capability Set 1, Rec. Q.1211—ITU-T—1993.
J. Audestad, B. Jacobsen, Universal personal telecommunication and intelligent network architecture, Proc. of the International Conference on Intelligence in Networks (ICIN), vol. 1, 1995, pp. 89-94.
Gough, John, and Glenn Smith. "Efficient recognition of events in a distributed system." Australian computer science communications 17 (1995): 173-179.
J.S.M. Ho, I.F. Akyildiz, Local anchor scheme for reducing signaling costs in personal communications network, IEEE Transaction on Networking 4 (5) (1996) 709-723.
Jeffrey S. Chase et al., "Dynamic Virtual Clusters in a Grid Site Manager," Proceedings of the 12th IEEE International Symposium on High Performance Distributed Computing (HPDC'03), 2003, IEEE, pp. 90-100.
K. O. Sandor and A. Schmer. Supporting social awareness @ work, design and experience. In Proceedings of the 1996 ACMConference on Computer Supported Cooperative Work, Boston, 1996.
K. Sullivan and D. Notkin. Reconciling environment integration and component independence. ACM Transactions on Software Engineering and Methodology, 1(3), Jul. 1992.
Kolarov et al., "End-to-End Adaptive Rate Based Congestion Control Scheme for ABR Service in Wide Area ATM Networks," Feb. 1995: pp. 138-143.
L. Gong "Going Beyond the Sandbox: An Overview of the New Security Architecture in the Java Development Kit 1.2", Proc. USENIX Symp. Internet Technologies and Sys., 1997.
L. Lovstrand. Being selectively aware with the khronika system. In Proceedings of the 6th European Conference on Computer Supported Cooperative Work—ECSCW'91, Sep. 1991.
M. Fujioka, S. Sakai, and H. Yagi, "Hierarchical and distributed information handling for UPT," IEEE Network Mag., pp. 50-60, Nov. 1990.
Macedonia et al., "Mbone Provides Audio and Video Across the Internet," Apr. 1994, pp. 30-36.
Maeno, et al. "Distributed Desktop Conferencing System (Mermaid) Based on Group Communication Architecture" Communications—Rising to the Heights, Denver, Jun. 23-26, 1991, vol. 1, Jun. 23, 1991, pp. 520-525.
Manu Malek "Integrated Voice and Data Communications Overview" IEEE Communications Magazine, pp. 5-15, vol. 26, No. 6, Jun. 1988.
Mark J. Karol and Michael G. Hluchyj "Using a Packet Switch for Circuit-Switched Traffic: A Queueing System with Periodic Input Traffic" IEEE Transactions on Communications, pp. 623-625, vol. 37, No. 6, Jun. 1989.

Matsuo, et al.: "Personal Telephone Services Using IC-Cards" IEEE Communications Magazine, vol. 27, No. 7, Jul. 1989, pp. 41-48.
McDavid, D. "A standard for business architecture description" IBM Systems Journal(1999) 19 pages.
Meira, W. et al., "E-representative: a scalability scheme for e-commerce" In Proceedings of the Second International Workshop on Advanced Issues of E-Commercce and Web-based Information Systems(2000) 8 pages.
Mosberger, D. et al, "httperf—A Tool for Measuring Web Server Performance" In First Workshop on Internet Service Performance (1998) 9 pages.
Nahum, E. et al., "Performance Issues in WWW Servers" IEEE (2002) 11 pages.
Nixon, T. 'Design Considerations for Computer-Telephony Application Programming Interfaces and Related Components', IEEE Communications Magazine, pp. 43-47, Apr. 1996.
O. Coudert and J.C. Madre. A unified framework for the formal verification of sequential circuits. In IEEE International Conference on Computer-Aided Design (ICCAD'90), pp. 126-129, 1990.
P. Cronin "An Introduction to TSAPI and Network Telephony", IEEE Comm. Mag., vol. 34, No. 4, pp. 48-54 1996.
Pierre, G. et al., "Differentiated Strategies for Replicating Web Documents" in Proceedings of the 5th International Web Caching and Content Delivery Workshop (2000) 16 pages.
R. E. Bryant. Graph-based algorithms for Boolean function manipulation. IEEE Transaction on Computers, 35(8):677-691, 1986.
R. E. Bryant. On the complexity of VLSI implementations and graph representations of Boolean functions with application to integer multiplication. IEEE Transaction on Computers, 40:205-213, 1991.
R. Srinivasan XDR: External Data RepresentationStandard, IETF RFC-1832, Aug. 1995.
Ravi Kokku et al., "Half-pipe Anchoring: An Efficient Technique for Multiple Connection Handoff," Proceedings 10th International Conference on Network Protocols, Nov. 12, 2002, XP010632563, 10 pages.
Realizing a Foundation for Programmability of ATM Networks with the Binding Architecture—Lazar, Lim, et al.—1996.
Recommendation F.851, Universal Personal Telecommunication (UPT)—service description (service set 1), Jan. 1994.
Robbert van Renesse, Kenneth P. Birman and Silvano Maffeis, Horus, a flexible Group Communication System, Communications of the ACM, Apr. 1996.
S.P. Reiss. Connecting tools using message passing in the FIELD program development environment. IEEE Software, Jul. 1990.
Sontag, E. et al., "A Notion of Input to Output Stability" (1997) 6 pages.
Stuart J. Yuill and Raymond L. Pickholtz "Performance Modeling for Packet Networks with Satellite Overflow" IEEE Transactions on Communications, pp. 808-815, vol. com-29, No. 6, Jun. 1981.
Sun Microsystems, Inc, RPC: Remote Procedure Call Protocol Specification, Version 2,IETF RFC-1057, Jun. 1988.
T. A. Anschutz, "A historical perspective of CSTA", IEEE Comm. Mag., vol. 34, pp. 30-35 1996.
Teodoro, G. et al., "Load Balancing on Stateful Clustered Web Servers" IEEE (2003) 9 pages.
Tohru Kohashi, et al., "Integrated-Circuit and Packet-Switching Applications to a Loop System for Local Area Networks" IEEE Journal on Selected Areas in Communications, pp. 574-583, vol. sac-3, No. 4, Jul. 1985.
Waldo, Wollrath, Wyant and Kendall, Events in an RPC Based Distributed System, SunLabs Technical Report SMLI TR-95-47, Nov. 1995.
Want, Schilit, Adams, Gold, Petersen, Goldberg, Ellis and Weiser, The ParcTab Ubiquitous Computing Experiment, Xerox PARC Computer Science Laboratory Tech Report CSL-95-1, Mar. 1995.
Wrigley, C. "Design Criteria for Electronic Market Servers" Electronic Markets (1997) pp. 12-16.
Ying-Dar Lin et al., "Direct Web Switch Routing with State Migration, TCP Masquerade, and Cookie Name Rewriting," Globecom 2003, IEEE Global Telecommunications Conference, Dec. 2003, IEEE, CP010677300, pp. 3663-3667.
V. Rajendra, D. Jagannathan and L. S. Baum, editors. Blackboard Architectures and Applications. Academic Press, Boston, 1989.

(56) References Cited

OTHER PUBLICATIONS

W. D. Ambrosch, A. Maher, and B. Sasscer, Eds., The Intelligent Network, Springer Verlag 1989.
Yakoob, Nisar. "Service Independent Operations Systems." Intelligent Network Workshop, 1996. IN'96., IEEE. IEEE, 1996.
Weider, Chris, and Joyce Reynolds. "Executive Introduction to Directory Services Using the X. 500 Protocol." ISI (1992).
Young, John. "Evolution of Intelligent Networks: Object oriented relationships for holistic communication services." Intelligent Network Workshop, 1996. IN'96., IEEE. IEEE, 1996.
M.A. Sheldon, A. Duda, R. Weiss, J.W. O'Toole, Jr. and D. K. Glifford. Content Routing for Distributed Information Servers. Proc. 4th Int. Conf. on Extending Database Technology, Cambridge, England, Mar. 1994.
McBryan. GENVL and WWWW: Tools for Taming the Web. Proc. 1st Int. World Wide Web Conf, CERN, Geneva, Switzerland, May 1994.
Microsoft Corp., "Microsoft's Intranet Strategy Whitepaper," Jun. 1996.
*Comcast IP Holdings I, LLC v. Sprint Communications Company LP., et al.* Sprint's Motion to Stay Litigation Pending Reexamination, filed May 16, 2013.
N. Carriero and D. Gelernter, "Linda in Context," Commun. ACM, vol. 32, Apr. 1989.
*Comcast IP Holdings I, LLC v. Sprint Communications Company LP., et al.* Sprint's Brief in Support of its Motion to Stay Litigation Pending Reexamination, May 16, 2013.
*Comcast IP Holdings I, LLC v. Sprint Communications Company LP., et al.* Request for International Judicial Assistance, Pursuant to the Hague Convention on the Taking of Evidence Abroad in Civil or Commerical Matters, to Obtain Evidence from Colin Low and Andrew Seaborne, filed Jul. 16, 2013.
R.E. Droms. Access to Heterogeneous Directory Services. Proc. 9th Joint Conf. of IEEE Computer and Communications Societies (InfoCom), Jun. 1990.
*Comcast IP Holdings I, LLC v. Sprint Communications Company L.P., et al.* Sprint's Reply Brief in Support of its Motion to Stay Litigation Pending Reexamination, filed Jun. 11, 2013.
S. Bellovin. Using the Domain Name System for System Break-ins. USENIX, 1995.
S.S. Coleman, D.C. M. Wood and M.F. Schwartz. Fremont: A System for Discovering Network Characteristics and Problems. To appear, Proceedings of the USENIX Winter Conference, San Diego, California, Jan. 1993.
Scenarios for Computer Supported Telecommunications Applications (CSTA) Phase 2, ECMA TR/68, 1st ed., Dec. 1994.
*Comcast IP Holdings I, LLC v. Sprint Communications Company L.P., et al.* Scheduling Order Regarding Plaintiff's Patents, filed Jul. 24, 2012.
*Comcast IP Holdings I, LLC v. Sprint Communications Company L.P., et al.* Comcast's Second Amended Complaint, filed Oct. 3, 2012.
Shimazaki, Hitoshi. The IN Service Operations System based on the Call Processing History, IEEE Intelligent Network Workshop '96, Melbourne 1996.
Sollins, K. R. "Plan for Internet directory services." (1989).
*Comcast IP Holdings I, LLC v. Sprint Communications Company L.P., et al.* Sprint's Preliminary Identification of Claim Term(s), Jan. 25, 2013.
T. Berners-Lee. Uniform Resource Locators. CERN, Jul. 1993. Internet Draft, IETF URL Working Group.
V. Cerf. Networks. Scientific American, 265(3), pp. 72-81, Sep. 1991. Special Issue on Communications, Computers, and Networks.
Weiss, K., and J. Gargano. "Whois and Network Information Lookup Service, Whois++." (1995).
Yakoob, Nisar. "End customer control in the intelligent network." Intelligent Network Workshop, 1996. IN'96., IEEE. IEEE, 1996.
Yamada, Michio. "Study on IN Basic Call State Model for Packet Switched Network." Intelligent Network Workshop, 1996. IN'96., IEEE. IEEE, 1996.
National Research Council (US). NRENAISSANCE Committee. Realizing the information future: The internet and beyond. National Academies Press, 1994.
Eric Burger—Declaration in support of Plaintiff's opening claim construction brief—*Comcast IP Holdings I* vs. *Sprint communications*; C.A. No. 1:12-cv-00205-RGA; Mar. 29, 2013.
*Comcast IP Holdings I* Vs. *Sprint Communications*; C.A. No. 1:12-cv-00205-RGA; Plaintiff's reply claim construction brief; May 10, 2013.
EP02000568.2—Summons to attend oral proceedings—Mailing date: Mar. 1, 2006.
EP02000568.2—Response to Oppostion filed—Mailing date: Dec. 15, 2005.
Learn, Larry L. "Internet Telephony: The Next Killer Application?(Or, How I Cut My Long-Distance Phone Bill to Nothing!)." Library Hi Tech News 123 (1995): 12-19.
Request for Ex Parte reexamination of US patent No. 7,012,916; Apr. 24, 2013.
Grant for Ex Parte reexamination request of US patent No. 7,012,916; USPTO; May 30, 2013.
Smith D G: "An Introduction to GSM Enhancements for Operator Specific Services (Camel)", IEEE Colloquium on Mobile Communications Towards the Next Millenium and Beyond, May 17, 1996, pp. 6/1-6/09, XP000605991.
Grant for Ex Parte reexamination request of US patent No. 6,873,694; USPTO; Jun. 4, 2013.
Request for Ex Parte reexamination of US patent No. 8,204,046; Apr. 24, 2013.
Request for Ex Parte reexamination of US patent No. 6,873,694; May 10, 2013.
Grant for Ex Parte reexamination request of US patent No. 8,204,046; USPTO; May 21, 2013.
Request for Ex Parte reexamination of US patent No. 8,170,008; May 10, 2013.
Request for Ex Parte reexamination of US patent No. 7,206,304; Apr. 29, 2013.
Grant for Ex Parte reexamination request of US patent No. 8,170,008; USPTO; Jun. 6, 2013.
Grant for Ex Parte reexamination request of US patent No. 8,189,565; USPTO; Jun. 21, 2013.
Grant for Ex Parte reexamination request of US patent No. 7,206,304; USPTO; Jun. 6, 2013.
Request for Ex Parte reexamination of US patent No. 8,189,565; May 6, 2013.
Request for Ex Parte reexamination of US patent No. 7,903,641; May 2, 2013.
Request for Ex Parte reexamination of US patent No. 8,223,752; Apr. 29, 2013.
Grant for Ex Parte reexamination request of US patent No. 7,903,641; USPTO; Jun. 12, 2013.
Grant for Ex Parte reexamination request of US patent No. 8,223,752; USPTO; May 21, 2013.
GB application No. 9525190.6, filed Dec. 11, 1995, by applicant Hewlett-Packard Company, priority application for at least PCT/GB96/03055, which was published Jun. 19, 1997 as WO 1997/022212.
EP application No. 95410148.1, filed Dec. 22, 1995, by applicant Hewlett-Packard Company, priority application for at least PCT/GB96/03055, which was published Jun. 19, 1997 as WO 1997/022212.
Rajan, R., et al., "A policy framework for integrated and differentiated services inthe Internet," Network, IEEE, vol. 13, Issue 5, pp. 36-41, Sep./Oct. 1999.
Rajkumar, R., et al., "A resource allocation model for QoS management," Proceedings. The 18th IEEE Real-Time Systems Symposium (Cat.No. 97CB36172) p. 298-307, Dec. 2-5, 1997.
Ronstrom,M, "On-line schema update for a telecom database", data engineering proceedings, 18th international conference, Mar. 2000, pp. 329-338.
Rosenblum, M and Ousterhout, J.K, 1992. The design and implementation of a log-structured file system. ACM Trans. Comput. Syst. 10,1 (Feb. 1992), 26-52 DOI=http://doi.acm.org/10.1145/146941. 146943.

(56) References Cited

OTHER PUBLICATIONS

Sakai, H. et al. "A Service Logic Program Generation Method for Advanced Intelligent Network," NTT Network Service Systems Laboratories, 1996, pp. 47-51.
Schulzrinne, Henning, et al., "Signaling for internet telephony," Columbia University, Dept. of Computer Science Technical Report CUCS-005-98, Feb. 2, 1998.
Schutzrinne, Henning, "A comprehensive multimedia control architecture for the Internet," IEEE, pp. 65-76, Sep. 1997.
Shah et al. "Application of a New Network Concept for Faster Service Deployment" International Conference on COMM. 88 Jun. 12-15, 1988, IEEE Comm. Soc. Conference. Record, vol. 3, pp. 1327-1331.
Shouhuai Xu et al. "Authenticated Multicast Immune to Denial-of-Service Attack". Feb. 2003. ACM.
Spurzem B: "Advantages of Mimosa NearPoint for Email Archival" Internet, [Online] Jan. 2005, pp. 1-14, XP002519383 Retrieved from the Internet: URL:http://www.Flexnet.com/Exchange-Email-Archiving-and-Compliance/NearPoint%20E-mail%20Archive%20for%20Exchange.pdf> [retrieved on Mar. 11, 2009] * p. 3, line 1-17 * * p. 9, line 1-p. 11, line 8 * * figure 1 * .
Spurzem B: "Mimosa NearPoint for Microsoft Exchange Server" Internet [Online] Jan. 2005, pp. 1-18, XP002519249 Retrieved from the Internet: Url:http://www.Flexnetcom/Exchange-Email-Archiving-and-Compliance/NearPoint% 20Architecture%20for/020Exchange.pdf> [retrieved on Mar. 11, 2009] * p. 5, line 18-line 20 * * p. 6, line 2-line 5 * * p. 6, line 16-line 26 * * page 7, line 22-line 33 * * p. 8, line 4-line 15 * * p. 8, line 25-line 28 * * figure 2 *.
Stefan Saroiu et al. "A Measurement Study of Peer-to-Peer File Sharing Systems." 2002. University of Washington.
Steven M Bellovin et al. "Augmented Encrypted Key Exchange: A Password-Based Protocol Secure Against Dictionary Attacks and Password File Compromise". 1st Conference Computer & Comm. Security. 1993 ACM. AT&T Bell Laboratories.
Steven M. Bellovin et al. "Encrypted Key Exchange: Password-Based Protocols Secure Against Dictionary Attacks". 1992. IEEE.
Stoica, Ion, et al., "LIRA: An Approach for Service Differentiation in the internet," sponsored by DARPA under contract Nos. N66OO1-96-C-8528 and N00174-96-K-0002, and by a NSF Career Award under grant No. NCR-9624979. Additional support was provi. 1998.
Stojsic, Goran, et al., "Formal Definition of SIP Proxy Behavior," IEEE, pp. 289-292, Feb. 2001.
Sui Man Lui et al. "Interoperability of Peer-to-Peer File Sharing Protocols". Aug. 2002. ACM SIGecom Exchange.
Swinehart et al., "Adding Voice to an Office Computer Network," Proceedings of the IEEE Globecom '83, Feb. 1984.
Varma et al., "Architecture for Interworking Data over PCS," IEEE Communications Magazine, Sep. 1996, 124-130.
Vin et al., "Multimedia Conferencing in the Etherphone Environment," IEEE Computer, vol. 24, No. 10, Oct. 1991.
Waitzman et al., "Distance Vector Multicast Routing Protocol", Nov. 1988, http://www.internic.net/rfc/rfc1075.txt, pp. 1-22.
Wedlund, Elin, et al., "Mobility support using SIP," WoWMoM, Jan. 1999.
Weinstein, "The Experimental Integrated Switched Networks—A System Level Network Text Facility", Proceedings of 1983 IEE Military Communications Conference, Washington, DC, Oct. 31, 1983-Nov. 2, 1983.
Weisser et al. "The Intelligence Network and Forward-Looking Technology" IEEE COMM magazine, Dec. 1988, pp. 64-69.
White, Paul P., "RSVP and Integrated Services in the Internet: A Tutorial," IEEE Communications Magazine, pp. 100-106, May 1997.
Willebeek-LeMair, Marc H., "Videoconferencing over Packet-Based Networks," IEEE Journal on Selected Areas in Communications, vol. 15. No. 6, pp. 1101-1114, Aug. 1997.
Wright, S., et al., "IP "Telephony" vs. ATM: What is There to Discuss'?," IEEE, pp. 400-409, Feb. 1998.
Wroclawski, J., "The Use of RSVP with IEFT Integrated Services," ftp://ftp.isi.edu/in-notes/rfc2210.txt, Sep. 22, 1999.
Xuhua Ding and Gene Tsudik, Simple Identity-Based Cryptography with Mediated RSA, The Cryptographers' Track at the RSA Conference 2003, San Francisco, CA, Apr. 13-17, 2003, pp. 193-210.
Zorn, G. and Aboba, B. "RADIUS Authentication Server MIB," RFC 2619, Jun. 1999, pp. 1-16.
"Cryptography and the Internet", www.echonyc.com/~ysue/crypt.html, 1995.
"Interactive Media: An Internet Reality" IEEE Spectrum, vol. 33, No. 4, Apr. 1, 1996, pp. 29-32.
Amza, C. et al., "Bottleneck Characterization of Dynamic Web Site Benchmarks" in Third IBM CAS Conference (2002) 15 pages.
Aversa, L. et al., "Load Balancing a Cluster of Web Servers" Technical Report (1999) 13 pages.
B. Bollig and I. Wegener. Improving the variable ordering of OBDDs is NP-complete. IEEE Transactions on Computers, 45(9):993-1002, 1996.
Bill Croft and John Gilmore, Bootstrap Protocol (BOOTP), IETF RFC-951, Sep. 1985.
Bolot, et al.: "Scalable Feedback Control for Multicast Video Distribution in the Internet" Computer Communications Review, vol. 24, No. 4, Oct. 1, 1994, pp. 58-67.
Bornhoft, M., et al., Computer-Switch Telephony Applications, IEE, Third IEE Conf. on Telecommunications, 1991, pp. 62-66, 1991.
Brian Oki, Manfred Pfluegl, Alex Siegel and Dale Skeen, The Information Bus: an architecture for extensible distributed systems, ACM SIGOPS Operating Systems Review, v27 n5, Dec. 1993, pp. 58-68.
Brij Bhushan and Holger Opderbeck "The Evolution of Data Switching for PBX's" IEEE Journal on Selected Areas in Communications, pp. 569-573, vol. sac-3, No. 4 Jul. 1985.
C. R. Strathmeyer IEEE Commun. Mag., vol. 34, No. 4, 1996.
C. Yang and J. Yu, "UPT demo on integrated wireline and wireless testbed," Proc. ICUPC, pp. 558-562, 1995.
Chen and Baras "Optimal Routing in Mixed Media Networks with Integrated Voice and Data Traffic" Globecom '92, IEEE Global Telecommunications Conference pp. 335-339, vol. 1 of 3 vol. Dec. 1992.
Christina J. Jenny and Karl Kummerle "Distributed Processing Within an Integrated Circuit/Packet-Switching Node" IEEE Transactions on Communications, pp. 1088-1101, vol. com-24, No. 10 Oct. 1976.
David C. Luckham and James Vera, An eventbased architecture definition language, IEEE Transactions on Software Engineering, 21(9):717-734, Sep. 1995.
Duan et al., "Efficient Utilization of Multiple Channels Between Two Switches in ATM Networks," Feb. 1995: pp. 1906-1911.
Ejiri, Masayoshi, "For Whom the Advancing Service/Network Management," Feb. 1994: pp. 442-433.
Esaki, Shuji, Tomoki Omiya, and Naoki Shigematsus. "Abstraction and control of transport network resources for intelligent networks." Electronics and Communications in Japan (Part I: Communications) 76.1 (1993): 34-44.
Factor and Gelernter, Software Backplanes, Realtime Data Fusion and the Process Trellis, Technical Report YALEU/ DCS/TR-852, Yale University Department of Computer Science, Mar. 1991.
G. A. Thom, H.323 : The Multimedia Communications Standard for Local Area Networks, IEEE Comm. Mag., 34(12), Dec. 1996, pp. 52-56.
Neil Wilkinson, "Next generation network services" chapter 12, Internet-based Services, copyright 2002, pp. 155-166.
Neilson, Rob, et al., "A Discussion of Bandwidth Broker Requirements for Internet2 Qbone Deployment," Internet2 Qbone BB Advisory Council, Version 0.7, pp. 1-30, Aug. 1999.
Pan, Ping, et al., "Diameter: Policy and Accounting Extension for SIP," Internet Engineering Task Force, Internet Draft, pp. 1-17, Jul. 31, 1998.
Phone+International, "Telenor Global Services to Route International Calls Through ITXX," http://www.phoneplusinternational.com/hotnews119h5843.html (Sep. 2001).
Pulver, Jeff, "The internet telephone tookit," Wiley Computer Publishing, New York, NY, 1996.
Q Xie et al. "Endpoint Name Resolution Protocol (ENRP)". May 2, 2002. Network Working Group. www.ietf.org/proceedings.

(56) References Cited

OTHER PUBLICATIONS

Rendleman, John, et al., "ATM Goes Into Orbit . . . While IP Gets Speedy in Space," Communications Week, Mar. 17, 1997, www.commweek.com.
S. Deering, "Host Extensions for IP Multicasting", Aug. 1989, http://www.internic.net/rfc/rfc1112.txt, pp. 1-16.
Sinnreich, H., et al., "Interdomain IP communications with QoS, authorization and usage reporting," http:www.cs.columbia.edu/-hgs/sip/drafts/draft-sinnreich-sip-qos-osp, Feb. 2000.
St. Johns, Mike. "Authentication Server," RFC 931, Aug. 1985, pp. 1-5.
Swinehart, D.C., et al., "Adding Voice to an Office Computer Network," IEEE Global Telecommunications Conference, San Diego, CA, Nov. 28-Dec. 1, 1983.
T. Imielinski J. Navas: "RFC 2009: GPS-Based Addressing and Routing" GPS-Based Addressing and Routing, XX, XX, Nov. 30, 1996, pp. 1-27, XP002131778.
The Wall Street Journal article on: "MCI's New Service for Corporate Use Sets 1 Line for Net, Phone," pp. B16, Jan. 30, 1997.
"Carriers Improve Net Management Services", Communication Week, May 2, 1994, p. 74.
"New software platform enhances network management capabilities . . . ", Business Wire, Sep. 28, 1995 p. 1-2.
"Rec. H.323", Visual Telephone Systems and Equipment for Local Area Networks which provide a Non-guaranteed Quality of Service, 1996.
"Rec. 0.1211", Introduction to the Intelligent Network Capability Set I, 1993.
"Support of Packet Mode Terminal Equipment by an ISDN," ITU-T Recommendation X.31, 67 pages, Nov. 1995, International Telecommunication Union, Geneva Switzerland.
"Vocaltec Introduces the Internet Phone Telephony Gateway Linking Traditional and Internet Telephone Networks" VocalTec, Mar. 8, 1996.
A. R. Modaressi and R. A. Skoog, Signaling System No. 7 : A Tutorial, IEEE Comm. Mag., Jul. 1990, pp. 19-35.
Bestavros, A. et al., "Distributed Packet Rewriting" In Proceedings of the International Conference on Network Protocols (1997) 13 pages.
Burch, B., "AT&T, MCI to release new management tools", Network World, Jan. 17, 1994, p. 19.
C. Gerety. HP Softbench: A new generation of software development tools. Technical Report SESD-89-25, Hewlett-Packard Software Engineering Systems Division, Fort Collins, Colorado, Nov. 1989.
Dean Java Security: Browsers and Beyond, 1997 [online] Available: http://ftp.cs.princeton.edu/sip/pub/internetbeseiged.html.
D. Garlan, G.E. Kaiser, and D. Notkin. Using tool abstraction to compose systems. IEEE Computer, 25(6), Jun. 1992.
DellaFera, Eichin, French, Jedlinsky, Kohl and Sommerfeld, The Zephyr Notification Service, Proceedings USENIX Winter 1988, Dallas Texas, pp. 213-219.
European Computer Manufacturers Association (ECMA), Computer-Supported Telecommunications Applications, ECMA Technical Report TR/52, Jun. 1990.
Francois Fluckiger: "Multimedia Over the Internet" Proceedings of the European Conference on Multimedia Applications, Services and Techniques, 2001.
Frivold, T.J. et al., "Extending WWW for Synchronous Collaboration," Computer Networks and ISDN Systems, vol. 28, No. 28, Dec. 1995, pp. 69-75.
Gadde, S. et al., "Web Caching and Content Distribution: A View From the Interior" Computer Communications (2001) 12 pages.
Gelernter, David, and Arthur J. Bernstein. "Distributed communication via global buffer." Proceedings of the first ACM SIGACT-SIGOPS symposium on Principles of distributed computing. ACM, 1982.
H. D'Hooge "The Communicating PC", IEEE Comm. Mag., vol. 34, No. 4, pp. 36-42 1996.

Hisayoshi Inamori "Performance Evaluation of Mutual Overflow Routing for Hierarchical Packet-Switching Networks" Electronics and Communications in Japan, pp. 111-122, Part 1, vol. 71, No. 6 1988.
Hunt, G. et al., "Network Dispatcher: a connection router for scalable Internet services" Computer Networks and ISDN Systems (1998) 11 pages.
ITU-T Draft Recommendation 1.373, Network capabilities to support universal personal telecommunication (UPT), Jul. 1992.
ITU-T Recommendation F.850, Principles of universal personal telecommunication (UPT), Mar. 1993.
ITU-T Recommendation Q.766, "Performance objectives in the integrated services digital network application," Mar. 1993.
ITU-T, Introduction to the Intelligent Network Capability Set 1, Rec. 0.1211, Mar. 1993.
K. McCrary. Jtella homepage,http://www.kenmccraiy.com/jtella/, 2002.
Mills, M. (Mar. 8, 1996). Freebie Heebie-Jeebies: New Long-Distance Calling Via the Internet Scares Small Phone Firms. The Washington Post, sec. F. pp. 1-2.
Weiser, The Computer for the Twenty-First Century, Scientific American, Sep. 1991.
Non Final Office Action—U.S. Appl. No. 90/012,863—Mailing Date: Aug. 27, 2013.
"Using ICC for portable network independent JAIN SLEE Services," available online at <http://jainslee.org/application/sleeandjcc.html>. Apr. 10, 2004.
Comcast IP Holdings!, LLC v. *Sprint Communications Company L.P. et al.* Claim Construction Order. Filed Aug. 30, 2013.
*Comcast IP Holdings I, LLC* v. *Sprint Communications Company L.P. et al.* Andrew Seaborne Deposition Transcript, dated Aug. 22, 2013.
*Comcast IP Holdings I, LLC* v. *Sprint Communications Company L.P. et al.* Gregory J. Lipinski Deposition Transcript, dated Aug. 9, 2013.
Non Final Office Action—U.S. Appl. No. 90/012,849—Mailing Date: Sep. 4, 2013.
Miller, Mark A., "Troubleshooting TCP/IP: Analyzing the Protocols of the Internet," M.and.T Books, pp. 365-389, 1992.
Mills, M. (Mar. 8, 1996) "Freebie Heebie-Jeebies: New Long-Distance Calling Via the Internet Scares Small Phone Firms", The Washington Post, sec. F, pp. 1-2.
Sattler, Michael, "Nautilus Voice Encryption," May 10, 1995.
B. Renard et al., An SDL/MSC Environment for Service Interaction Analysis, International Conference on Intelligence in Networks, p. 200-205. Nov. 1, 1996.
Potted History of the WEBIN Cases in the context of ENUM, dated Jun. 2008.
Pete N. Martin, Service Creation for Intelligent Networks: Delivering the Promise, International Conference on Intelligence in Networks, p. 206-209. Nov. 1, 1996.
Bernard Vilain, Service Creation: tools expectation and service life cycle, International Conference on Intelligence in Networks, p. 210-215. Nov. 1, 1996.
Arne Folkestad et al., On Load Control for Service Data Points; International Conference on Intelligence in Networks, p. 217-222. Nov. 1, 1996.
Terje Jensen et al., Planning Intelligent Networks, International Conference on Intelligence in Networks, p. 223-228. Nov. 1, 1996.
Kwang-Jae Jeong et al., Effective Overload Prevention and Control for Traffic Management in Intelligent Network, International Conference on Intelligence in Networks, p. 229-234. Nov. 1, 1996.
Haitao Tang et al., The Adaptive Resource Assignment and Optimal Utilization of Multi-Service SCP, International Conference on Intelligence in Networks, p. 235-240. Nov. 1, 1996.
Hing Fai (Louis) Chong et al., A Hybrid Approach to Call Party Handling, International Conference on Intelligence in Networks, p. 241-246. Nov. 1, 1996.
Wataru Inoue et al., Proposal of Computer Telephony System using Advanced Call-connection Method, International Conference on Intelligence in Networks, p. 248-253. Nov. 1, 1996.
L. Demounem et al., TINA Reference Points, International Conference on Intelligence in Networks, p. 254-259. Nov. 1, 1996.

(56) References Cited

OTHER PUBLICATIONS

Han Zuidweg et al., A Distributed CORBA-Based IN Architecture, International Conference on Intelligence in Networks, p. 260-265. Nov. 1, 1996.
Jean Claude Samou et al., Experiences with a Constraint Based Approach for Network Partitioning, International Conference on Intelligence in Networks, p. 266-271. Nov. 1, 1996.
T. Eckhardt et al., Personal Communications Impacts on TINA, International Conference on Intelligence in Networks, p. 272-276. Nov. 1, 1996.
John Hindle, The Future Growth of PCS: Providing Effective Intelligent Network Solutions, International Conference on Intelligence in Networks, p. 278-283. Nov. 1, 1996.
D.F. Bjornland et al., IN Architectural Options for Handling Calls to CTM Users, International Conference on Intelligence in Networks, p. 284-288. Nov. 1, 1996.
Kimmo Raatikainen et al., Mobility in the Intelligent Network Architecture, International Conference on Intelligence in Networks, p. 289-294. Nov. 1, 1996.
Cristina Ciancetta et al., UMTS in the ACTS Programme: the EXODUS Project, International Conference on Intelligence in Networks, p. 295-300. Nov. 1, 1996.
Christian Chabernaud et al., The Intelligent Network: an essential enhancement of GSM, International Conference on Intelligence in Networks, p. 301-306. Nov. 1, 1996.
David Ludlam, Reflections Intelligent Networks Yesterdym Today and Tomorrow, International Conference on Intelligence in Networks, p. 308-311. Nov. 1, 1996.
Masatoshi Kawarasaki et al., NTT's Open Network Architecture for Intelligent Network, International Conference on Intelligence in Networks, p. 312-317. Nov. 1, 1996.
Jan Ragnarsson, Using Business Cases to Justifyy in Service Provision, International Conference on Intelligence in Networks, p. 318-321. Nov. 1, 1996.
Frank Kraft-Kugler et al., Integrating Operator Assistance into the IN Architecture, International Conference on Intelligence in Networks, p. 322-326. Nov. 1, 1996.
B.B. Sud et al., Justification for Intelligence in Network for a Facilities Based International Wholesale Carrier, International Conference on Intelligence in Networks, p. 327-332. Nov. 1, 1996.
F. Bosco et al., Services Node: what we learnt from a field trial, International Conference on Intelligence in Networks, p. 333-337. Nov. 1, 1996.
Hideki Sakurai et al., Inter-module Connections in Distributed-processing Service Control Points in the Advanced Intelligent Network and Testing of Associated Hardware, International Conference on Intelligence in Networks, p. 339-340. Nov. 1, 1996.
Paolo Coppo et al., New IN products: how to find your way around the new technologies, International Conference on Intelligence in Networks, p. 341-342. Nov. 1, 1996.
Kenji Takeda et al., PersonalWare: A Middleware for Intelligent Personal Network Services, International Conference on Intelligence in Networks, p. 343-344. Nov. 1, 1996.
Evelina Pentcheva, Intelligent Network Services Descirbred as Database Interactions, International Conference on Intelligence in Networks, p. 345-346. Nov. 1, 1996.
Noriyuki Abe et al., Autonomous Multi-media Load Control of Network by Distributed and Cooperative Multi-server System, International Conference on Intelligence in Networks, p. 347-348. Nov. 1, 1996.
Yves Bretecher, A multi function switch centered on the IN, International Conference on Intelligence in Networks, p. 349-350. Nov. 1, 1996.
A. Campos-Flores et al., Prototyping TINA based services—the ALCIN project, International Conference on Intelligence in Networks, p. 351-352. Nov. 1, 1996.
T. Magedanz and R. Popescu-Zeletin, Intelligent Networks: Basic Technology, Standards and Evolution, (Intl. Thomson Computer Press Ed., 1996).

IBM Technical Disclosure Bulletin, "Workstation Communications System", vol. 37, No. 9, Sep. 1994, pp. 101-104.
S. Harris, et al., "Intelligent Network Realization and Evolution: CCITT Capability Set 1 and Beyond," International Switching Symposium, Yokohama, Japan, Diversification and Integration of Networks and Switching Technologies Towards the 21st Century, Oct. 25-30, 1992, Proceedings vol. 2, p. 127-131.
Tagg E.: "Automating Operating-Assisted Calls Using Voice Recognition" Speech Technology, Man-Machine Voice Communications, vol. 4, No. 2, Mar. 1988, pp. 22-25.
Turletti T: "The Inria Videoconferencing System (IVS)" Connexions, Oct. 1, 1994, pp. 20-24.
Jeff Baart Declaration dated Nov. 1, 2013, in support of Declaration executed Oct. 8, 2013.
Sebestyn, I., ITU Telecommunication Standardization Sector, Study Group 15, Q;2&3/15 Rapporteur Meeting, Document AVC-1086, v1, Dec. 5, 1996.
Steven Grover, Sun Microsystems, Inc. Java in communications, JAIN SLEE, 2005, pp. 1-27.
Stevens, "TCPIP Illustrated", vol. 1, 1994, Addison-Wesley.
Venezia C et al. "communication web services composition and integration", ICWS '06 Internati;nal conference on Web services, 2006, pp. 523-530.
Yavatkar, Raj, et al., "A Framework for Policy-based Admission Control," Internet Engineering Task Force, pp. 1-20, Apr. 1999.
"Network management; new software platform enhances network management capabilities; MCI ServiceView offers greater cost savings, increased flexibility.", Product Announcement, Edge, Oct. 2, 1995, on & about AT&T, v. 10, n. 375, p. 11(1).
EIA/TIA, Cellular Radio-Telecommunications Intersystem Operations, Technical Report IS-41 Revision B, EIA/TIA, 1991.
Jacobs, et al.: "Filling HTML Forms Simultaneously: Coweb-Architecture and Functionality" Computer Networks and ISDN Systems, vol. 28, 1996, pp. 1385-1395.
Kuehn, Richard A. (Jul. 1994). The Voice of Technology. [Online text only] Credit World, vol. 82, No. 6.
M. Koji, Abstract, "Conversation/Data Alternate Communication Equipment", Oki Electric Ind. Co., Ltd., Application No. 05004142, filed Jan. 13, 1993.
OMG, The Common Object Request Broker: Architecture and Specification, Rev. 2.0, Jul. 1995.
Oracle® Database "Concepts" Part No. B10743-01 (2003) 732 pages.
GB application No. 9603582.9, filed Feb. 20, 1996, by applicant Hewlett-Packard Company, priority application for at least PCT/GB96/03055, which was published Jun. 19, 1997 as WO 1997/022212.
GB application No. 9603590.2, filed Feb. 20, 1996, by applicant Hewlett-Packard Company, priority application for at least PCT/GB96/03054, which was published Aug. 28, 1997 as WO 1997/031490.
GB application No. 9603591.0, filed Feb. 20, 1996, by applicant Hewlett-Packard Company, priority application for at least PCT/GB96/03048, which was published Jun. 19, 1997 as WO 1997/022209.
GB application No. 9603589.4, filed Feb. 20, 1996, by applicant Hewlett-Packard Company, priority application for at least PCT/GB96/03051, which was published Jun. 19, 1997 as WO 1997/022211.
"A Framework for a Gateway Location Protocol", which is a working document of the Internet Engineering Task Force (IETF), Oct. 28, 1998.
"Camelot Announces Internet Voice Communication Technology Breakthrough", HighBeamTM Encyclopedia, From: PR Newswire, http://www.encyclopedia.com/doc/1G1-16452259.html?Q=Caml, Feb. 13, 1995, 2 pages.
"IDT's Net2Phone Launches Phone-to-Phone Technology Via the Internet," Press release, http://web.net2phone.com/about/press/releases/p2p.asp, Sep. 8, 1997.
"Inside APPN—The Essential Guide to the Next-Generation SNA," IBM, International Technical Support Organization Raleigh Center, Raleigh, NC, Jun. 1997.

(56) References Cited

OTHER PUBLICATIONS

"Integrated Services Digital Network (ISDN) 1.312," CCITT The International Telegraph and Telephone Consultative Committee, ITU International Telecommunication Union, Recommendation, 1.312/Q.1201, Oct. 1992.
"Interface Recommendation for Intelligent Network CS-1," International Telecommunication Union, ITU-T Telecommunication Standardization Sector of ITU, ITU-T Recommendation Q.1218, Oct. 1995.
"Internet Protocol Performance Metrics—Evolution Through Understanding", http://www.advanced.org/ippm.html (Aug. 1997).
"NetSpeak Corporation to Exhibit First Release of Voice Over IP, IP-to-PSTN Networking Products", Business Wire, Jun. 2, 1997.
"Series Q: Switching and Signalling," Intelligent Network, International Telecommunication Union, ITU-T, Telecommunication Standardization Sector of ITU, Recommendation Q.1218-Addendum 1, Sep. 1997.
"Specifications of Signalling System No. 7," International Telecommunication Union, ITU-T Telecommunication Standardization Sector of ITU, Recommendation, Q.700, Mar. 1993.
"Using JCC for Portable, Network Independent JAIN SLEE Services," available online at http://jainslee.org/application/sleeandjcc.html.
1979 Annual Technical Report, "A Research Program in Computer Technology", Oct. 1978-Sep. 1979, Prepared for the Defense Advanced Research Projects Agency, University of Southern California, ISI-SR-80-17.
1982 Annual Technical Report, "A Research Program in Computer Technology", Jul. 1981-Jun. 1982, University of Southern California, ISI/SR-83-23.
Aiken, B., et al., "Network Policy and Services: A report of a Workshop on Middleware," Network Working Group, pp. 1-26, Feb. 2000.
Almes et al., "A One-Way Delay Metric for IPPM," Advanced Network & Services, Network Working Group, http://www.ietf.org/internet-drafts/draft-ietf-ippm-delay-05.txt (Nov. 1998).
Arao, Shinya, et al., "Component-based policy deployment for service level differentiation in converging communication networks," IEEE, pp. 1388-1392, 1999.
Aygun,S et al. "Conceptual data modeling of multimedia database applications", 1998 proceedings i multi-media database mangement systems workshop, Aug. 1998, pp. 182-189.
Balmer, R., et al., "A Concept for RSVP Over DiffServ," Institute of Computer Science and Applied Mathematics, University of Berne, Switzerland, http://www.iam.unibe.ch/rvs, pp. 412-417, IEEE, May 2000.
Barzilai, Tsipora, et al., "Design and Implementation of an RSVP-based Quality of Service Architecture for Integrated Services Internet," IEEE, May 1997.
Baumgartner, F., et al., "Differentiated services: a new approach for quality of service in the Internet," Proceedings of Eighth International Conference on High Performance Networking, pp. 255-273, Sep. 21-25, 1998.
Beck, Christopher J., et al., "Scheduling alternative activities," http://www.aaai.org/home.html, 1999.
Berners-Lee, T. et al. "Uniform Resource Identifiers (URI): Ge3neric Syntax," RFC 2396, Aug. 1998, pp. 1-40.
Bernet, Y., et al., "A Framework for Differentiated Services," The Internet Society, pp. 1-35, Sep. 22, 1999.
Blackwell et al. "Secure Short-Cut Routing for Mobile IP," USENIX Summary 1994 Technical Conferences, Jun. 6-10, 1994.
Blake, S., et al., "An Architecture for Differentiated Services," Network Working Group, pp. 1-36, Dec. 1998.
Borden et al., "Integration of Real-Time Services in an IP-ATM Network", Internet RFC/STD/FYI/BCP ARchives, Aug. 1995.
Botvich, D., et al., "On Charging for Internet Services provided over an A.TIVI network," IEEE, pp. 669-679, 1997.
Boyle, Jim, et al., "The COPS (Common Open Policy Service) Protocol," http://www.ietf.orgiinternet-drafts/draft-ietf-rap-cops-07.txt, pp. 1-35, Aug. 16, 1999.
Braden, R., et al., "Resource ReSerVation Protocol (RSVP)—Version 1 Functional Specification," Network Working Group, pp. 1-224, Univ. of Michigan, Sep. 1997.
Braun, Torsten, "Implementation of an Internet Video Conferencing Application over ATM," IBM European Networking Center, Heidelberg, Germany, IEEE, pp. 287-294, 1997.
Braun, Torsten, "Internet Protocols for Multimedia Communications," Part II: Resource Reservation, Transport, and Application Protocols, IEEE MultiMedia, pp. 74-82, Oct.-Dec. 1997.
Buchanan, Ken, et al., "IMT-2000: Service Provider's Perspective," IEEE Personal Communications, pp. 8-13, Aug. 1997.
Cerf et al., "A Protocol for Packet Network Intercommunication", IEEE Transactions on Communications, No. 8, May 1974.
Cesner et al., "Wideband Communications", 1984 Annual Technical Report, University of Southern California, ISI/SR-85-150, Jul. 1983-Jun. 1984.
Chandra, P., et al., "Network support for application-oriented QoS," (IWQoS 98) 1998 Sixth International Workshop on Quality of Service, pp. 187-195, May 18-20, 1998.
Chen et al., "Integrated Voice/Data Switching", IEEE Communication Magazine, Jun. 1988, vol. 26, No. 6.
Chopra, Manvinder, Exploring Intelligent Peripheral Configuration, Universal Personal Communications, 1994. Record., 1994 Third Annual International Conference on, Sep. 27-Oct. 1, 1994, pp. 635-639.
Cisco Systems, "Cisco ATA 186 Analog Telephone Adaptor", document states "Copyright (C) 1992-2002".
Corley, "Bellsouth Trial of Wideband Packet Technology", Bellsouth Services, 1990 IEEE, CH2829-0/90/0000-1000.
Daniele, M., et al., "Textual Conventions for Internet Network Addresses," Nework Working Group, pp. 1-16, Jun. 2000.
Detreville et al., "A Distributed Experimental Communications System", Advances in Local Area Networks, IEEE Press, 1987.
du Bousquet,L et al. "telecommunication software validation using a synchronous approach", ASSET-98, proceedings, IEEE workshop on application-specific software engineering technology, 1998, pp. 98-101.
Ekstein, Ronnie, et al., "AAA Protocols: Comparison between Radius, Diameter and Cops," Internet Engineering Task Force (IETF), pp. 1-17, Aug. 1999.
F. Shen et al. Profile-Based Subscriber Service Provisioning, IEEE, Apr. 15, 2002; pp. 561-574.
Finseth C. "An access control protocol, sometimes called TACACS," Network Working Group, University of Minnesota, pp. 1-21, Jul. 1993.
Flykt, P., et al., "SIP Services and Interworking IPv6," 3G Mobile Communication Technologies, Mar. 26-28, 2001, Conference Publication No. 477.
Gait, J, 1991. Stability, Availability, and Response in Network File Service. IEEE Trans. Softw. Eng. 17, Feb. 2, 1991,133-140 DOI= http://dx.doi.org/10.1109/32.67594.
George Coulouris et al. "Secure Communication in Non-uniform Trust Environments". Jul. 1998. ECOOP Workshop on Distributed Object Security.
Gleeson, B., et al., "A Framework for IP Based Virtual Private Networks," The Internet Society, pp. 1-62, Feb. 2000.
Glitho R.H et al. "creating value added services in internet telephony: an overview and a case study on a high-level service creation environment", IEEE transacitons on systems, man and cybermetics, PartC : applications and reviews, issue: 4, vol. 33, 2003, pp. 446-457.
Goyal, Pawan, et al., "Integration of call signaling and resource management for IP telephony," IEEE Network, pp. 24-32, May/Jun. 1999.
Guerin, et al., "QoS Routing Mechanisms and OSPF Extensions", Internet Engineering Task Force (Dec. 1998).
Handley, M., et al., "SIP: Session Initiation Protocol," Network Working Group, The Internet Society, Mar. 1999.
Hansson et al. "Phone Doubler—A Step Towards Integrated Internet and Telephone Communities" 1997 Ericsson Review, No. 4 pp. 142-151.

(56) References Cited

OTHER PUBLICATIONS

Hartanto, Felix, et al., "Policy-Based Billing Architecture for Internet Differentiated Services," Proceedings of IFIP Fifth International Conference on Broadband Communications (BC '99), Hong Kong, Nov. 10-12, 1999.
Hedrick, C., "Routing Information Protocol", Jun. 1988, http://www.internic.net/rfc/rfc1058.txt, pp. 1-30.
Herzog, S., et al., "COPS Usage for RSVP," Network Working Group, pp. 1-15, Jan. 2000.
Hinden et al., "The DARPA Internet Gateway", Sep. 1982, http://www.internic.net/rfc/rfc823.txt, pp. 1-41.
Hirokazu Takatama et al. "Intelligent SIP system for Mobile Internet", NEC Intelligent network workshop 2001.
Hubaux, Jean-Pierre, et al., "The impact of the Internet on telecommunication architectures," Computer Networks 31 (1999).
Inamori, Hisayoshi, et al., "Common Software Platform for Realizing a Strategy for Introducing the TMN," Network Operations and Management Symposium, vol. 2, pp. 579-589, Feb. 1998.
Inoue et al., "Evolution Scenario of Broadband Services Based on Granulated Broadband Network Concept", IEEE Region 10 Conference, Tencon 92, Nov. 11-13, 1992.
Inoue et al., "Granulated Broadband Network Applicable to B-ISDN and PSTN Services", IEEE Journal on Selected Areas in Communiations, vol. 10, No. 9, Dec. 1992.
Iraklis Varlamis et al. "Bridging XML-schema and relational databases: a system for generating and manipulating relational databass using valid XML documents", proceedings of the 2001 ACM Symposium on document engineering, pp. 105-114.
Jaewook Shin et al. "A new efficient method of generating processor load data and meta data base in CMS-MX System", Personal wireless communications, Dec. 1997, IEEE International conference, pp. 349-352.
Johnson, David B., "Scalable Support for Transparent Mobile Host Internetworking," Proceedings of the Ninth Annual IEEE Worshop on Computer Communications, pp. 1-10, Oct. 1994.
Kausar, Nadia, et al., "A Charging Model for Sessions on the Internet," IEEE, pp. 32-38, Apr. 1999.
Kazuhiko Ohkubo "Schema transalation into a unified model for service operation", IEEE 1992, pp. 1010-1015.
Kent, Stephen, Evaluating Certification Authority Security, 1998 IEEE Aerospace Conference Proceedings, vol. 4, pp. 319-327.
Kreller, Birgit, et al., "UMTS: A Middleware Architecture and Mobile API Approach," IEEE Personal Communications, pp. 32-38, Apr. 1998.
Kumar, Vijay P., et al., "Beyond Best Effort: Router Architectures for the Differentiated Services of Tomorrow's Internet," IEEE Communications Magazine, pp. 152-164, May 1998.
Kupsys, A.; Ekwall R., "Architectural Issues of JMS Compliant Group Communication," Network Computing and Applications, Fourth IEEE International Symposium on Volume, Issue, Jul. 27-29, 2005 pp. 139-148.
Lane, C,H.R. et al. "An entity-based service script editor for IN", eight international conference on software engineering for telecommunication systems and services, 1992, pp. 57-61.
Laubach, "Classical IP and ARP over ATM" Hewlett-Packard Laboratories, Jan. 1994, http://www.faqs.org/rfc/rfc1577.txt.
Lee et al., Concatenated Wireless Roaming Security Association and Authentication Protocol using ID-Based Cryptography, Conference Proceedings of the IEEE Vehicular Technology Conference, vol. 2, New York, NY c. 1978-1979, pp. 1507-1511.
Mahadevan, I., et al., "Quality of service achitectures for wireless networks: IntServ andDiffServ models," http://ieeexplore.ieee.org/xpllabsprintf.jsp?arnumber==778974.and.p . . . , Aug. 6, 2002.
Mamais, G., et al., "Efficient buffer management and scheduling in a combined IntServand DiffServ architecture: a performance study," ATM, 1999. ICATM '99. 1999 2nd International Conference on, pp. 236-242, Jun. 21-23, 1999.
Mascoli, Cicchetti & Listanti, "Alternative Scenarios for Data Applications Via Internet-Mobile and DECT-ATM Interworkin," 4th IEEE International Conference on Universal Personal Communications, pp. 788-792, Nov. 6-10, 1995 published. Apr. 1995.
Mealling, M. "DDDS Part Four: The URI Resolution Application," RFC 3404, Oct. 2002, pp. 1-18.
Mealling, M. and Denenberg, R. "URI, URL, and URN: Clarificiations and Recommendations," RFC 3305, Aug. 2002, pp. 1-11.
Merritt, "Providing Telephone Line Access to a Packet Voice Network", University of Southern California, Feb. 1983, ISI/RR-83-107.
Mevel and Simon, Distributed Communication Services in the Masix System, Conference Proceedings of the 1996 IEEE Fifteenth Annual International Phoenix Conference on Computers and Communications, Mar. 27-29, 1996, pp. 172-178.
Mills, D.L., "An Experimental Multiple-Path Routing Algorithm", Mar. 1986, http://www.internic.net/rfc/rfc981.txt, pp. 1-20.
Mills-Tetty Ayorkor et al. "Security Issues in the ABELS System for Linking Distributed Simulations". 2003. IEEE Proceedings of the 36th Annual Simulation Symposium.
Moh M. et al.: "Mobile IP telephony: mobility support of SIP" Proceedings of the International Conference on Computer Communications and Networks, XX, XX, Oct. 11, 1999, pp. 554-559. XP002143545.
Nagarajan, Ramesh, et al., "Local Allocation of End-to-End Quality-of-Service in High-Speed Networks," National Research Foundation under grant NCR-9116183 and the Defense Advanced Projects Research Agency under contract NAG2-578, pp. 1-28, downloaded, A., 1993.
Narasimhan P. et al. "Eternal—A component-based framework for transparent fault-tolerant CORBA". In Software—Practice and Experience. vol. 32, No. 8, pp. 771-788. Jul. 10, 2002.
Ninghui Li, Local Names in SPKI/SDSI, Proceedings of the 13th IEEE Computer Security Foundations Workshop, 2000, pp. 2-15.
Noerpel et al., "PACS: Personal Access Communications System—A Tutorial," IEEE Personal Communications, Jun. 1996.
Okada, et al., "Applying CC/PP to User's Environmental Information for Web Service Customization", http://www10.org/cdrom/posters/1066.pdf#search=%22customize%20web%20page%20%20based-%20in%20user%20preferences%22, 2001.
O'Malley, Sean W., "A Dynamic Network Architecture," Department of Computer Science, University of Arizona, ACM Transactions on computer systems, vol. 10, No. 2, pp. 110-143, May 1992.
Palme, J. et al. "MIME Encapsulation of Aggregate Documents, such as HTML (MHTML)." RFC 2557, Mar. 1999, pp. 1-28.
Palo Alto Research Center, "Etherphone: Collected Papers 1987-1988," May 1989.
Park, Myung Ah, et al., "Dial-up internet access service system with automatic billing mechanism," ICICS 1997, Electronics .and. Telecommunications Research Institute, pp. 148-151, Singapore, Sep. 9-12, 1997.
Perez et al., "ATM Signaling Support for IP Over ATM", Network Working Group, RFC 1765, Feb. 1995, http:/www.ietf.org/rfc/rfc1765.txt.
Pezzutti, David A., "Operations Issues for Advanced Intelligent Networks," IEEE Communications Magazine, pp. 58-63, Feb. 1992.
Eckhardt, Tim. "Mobile Service Agents and their Impacts on IN-Based Service Architectures." Intelligent Network Workshop, 1996. IN'96., IEEE. IEEE, 1996.
Ely, Tom. "The Service Control Point as a Cross Network Integrator." Intelligent Network Workshop, 1996. IN'96., IEEE. IEEE, 1996.
Eyers, Tony, and Henning Schulzrinne. "Predicting Internet telephony call setup delay." Proc. 1st IP-Telephony Wksp. 2000.
F.F. Ingrand, M.P. Georgeff, A.S. Rao, "An Architecture for Real-Time Reasoning and System Control," IEEE Expert, Dec. 1992.
Faouzi, Daoud. "Intelligent services: towards more autonomy." Intelligent Network Workshop, 1996. IN'96., IEEE. IEEE, 1996.
*Comcast IP Holdings I, LLC* v. *Sprint Communications Company L.P., et al.* Comcast's First Amended Complaint, filed May 29, 2012.
Furht, Borko. "Where are information superhighways headed?." ACM Computing Surveys (CSUR) 27.4 (1995): 554-556.
Gallersdorfer, Rainer. "Performance of Relational Database Management Systems in Intelligent Networks of Mobility Environments." Intelligent Network Workshop, 1996. IN'96., IEEE. IEEE, 1996.

(56) References Cited

OTHER PUBLICATIONS

Golda, Oliver. "Interactive Broadband Applications, The Role of IN" Intelligent Network Workshop, 1996. IN'96., IEEE. IEEE, 1996.
Goralski, Walter, and Matthew C. Kolon. IP telephony. New York: McGraw-Hill, 2000.
Gutierrez, Raul. "Interworking Scenarios between TINA and IN" Intelligent Network Workshop, 1996. IN'96., IEEE. IEEE, 1996.
Hardman, Vicky, et al. "Reliable audio for use over the Internet." Proceedings of INET. vol. 95. 1995.
Hariu, Takeo. "Study on Call Model of Advanced Intelligent Network for Controlling B-ISDN." Intelligent Network Workshop, 1996. IN'96., IEEE. IEEE, 1996.
Hellemans, Patrick. The TINA Service Session Graph: A generic call model for multi-media services. Intelligent Network Workshop, 1996. IN'96., IEEE. IEEE, 1996.
Herrigel, Alexander. "Security Architecture for the Core Part of CS-2." Intelligent Network Workshop, 1996. IN'96., IEEE. IEEE, 1996.
Herzog, Uwe, et al. "Migrating IN towards TINA." Intelligent Network Workshop, 1996. IN'96., IEEE. IEEE, 1996.
Hollenbach, Steven. "Utilising Intelligent Network Technology in Customer Care Applications." Intelligent Network Workshop, 1996. IN'96., IEEE. IEEE, 1996.
Howes, Timothy A. "The Lightweight Directory Access Protocol: X. 500 Lite." Ann Arbor 1001 (1995): 48103-4943.
Intelligent Network Requirements for Personal Communications Services, Jonathan Homa & Steve Harris, IEEE Communications Magazine, Feb. 1992.
International Standards for Intelligent Networks, Jose M. Duran & John Visser, IEEE Communications Magazine, Feb. 1992.
Ishibashi, Hirozumi. A Study on Service Date Transfer Procedure using SCP & SDF, IEEE Intelligent Network Workshop '96, Melbourne 1996.
J. Postel and C. Anderson. White Pages Meeting Report. Req. For Com. 1588, USC Information Sci. Institute, Feb 1994.
J. Postel and J. Reynolds. File Transfer Protocol (FTP). Req. For Com. 959, USC Information Sci. Institute, Oct. 1985.
J.B. Postel. Simple Mail Transfer Protocol. Req. For Com. 821, USC Information Sci. Institute, Aug. 1982.
Jain, Surinder K. "Evolving existing narrowband networks towards broadband networks with IN capabilities." Intelligent Network Workshop, 1996. IN'96., IEEE. IEEE, 1996.
Johnson, May. "Number Portability (NP) Using the Intelligent Network." Intelligent Network Workshop, 1996. IN'96., IEEE. IEEE, 1996.
*Comcast IP Holdings I, LLC v. Sprint Communications Company L.P., et al.* Joint Appendix Accompanying the Parties' Joint Claim Construction Brief, filed Jun. 4, 2013.
*Comcast IP Holdings I, LLC v. Sprint Communications Company L.P., et al.* Parties' Joint Claim Construction Brief, filed May 31, 2013.
*Comcast IP Holdings I, LLC v. Sprint Communications Company L.P., et al.* Joint Claim Construction Chart, filed Mar. 1, 2013.
Jordan, Rob. "Why is the intelligent peripheral so stupid?." Intelligent Network Workshop, 1996. IN'96., IEEE. IEEE, 1996.
K. Harrenstien, M. Stahl and E. Feinler. NICName/Whois. Req. For Com 954, SRI International, Oct. 1985.
Kang, Myeongho. "Design of service feature interaction manager in AIN." Intelligent Network Workshop, 1996. IN'96., IEEE. IEEE, 1996.
Kawahara, R., and T. Asaka. "Overload control for intelligent networks based on an estimation of maximum Number of calls in a node." Intelligent Network Workshop, 1996. IN'96., IEEE. IEEE, 1996.
Kawanami, Yukio. "IN platform for DAVIC video on demand service." Intelligent Network Workshop, 1996. IN'96., IEEE. IEEE, 1996.
Kiwata, Kazuhiro. "A navigation service in TINA." Intelligent Network Workshop, 1996. IN'96., IEEE. IEEE, 1996.
Klabunde, Karin. "Multimedia session management." Intelligent Network Workshop, 1996. IN'96., IEEE. IEEE, 1996.
Kong, Qinzheng, G. R. A. H. A. M. Chen, and N. O. R. M. Lawler. "Distributed architecture for IN service management." IEEE Intelligent Network Workshop IN'96. 1996.
Kriete, Viola. "A journey through the life of an IN service in a commercial IN system." Intelligent Network Workshop, 1996. IN'96., IEEE. IEEE, 1996.
Kwast, Erik. "An exercise in test generation for telecommunications services." Intelligent Network Workshop, 1996. IN'96., IEEE. IEEE, 1996.
Lias Jr, J. L. "Advanced services management via intelligent access peripherals." Intelligent Network Workshop, 1996. IN'96., IEEE. IEEE, 1996.
London, J. W., et al. "Cost effective Internet access and video conferencing for a community cancer network." Proceedings of the Annual Symposium on Computer Application in Medical Care. American Medical Informatics Association, 1995.
M. Lottor. Internet Growth (1981-1991) Req. For Com. 1296, Network Information Systems Center, SRI Int., Jan. 1992.
M. McCahill. The Internet Gopher: A Distributed Server Information System. ConneXions—The Interoperability Report, 6(7), pp. 10-14, Interop, Inc, Jul. 1992.
M.D. Schroeder, A.D. Birrell and R.M. Needham. Experience with Grapevine: The Growth of a Distributed System. ACM Trans. Comput. Syst., 2(1), pp. 3-23, Feb. 1984.
M.F. Schwartz and D.C.M. Wood. Discovering Shared Interests Among People Using Graph Analysis of Global Electronic Mail Traffic. Department of Computer Science, University of Colorado, Boulder, Colorado, Feb. 1992. To appera, Communcations of the ACM.
M.F. Schwartz and J.S. Quarterman. The Changing Global Internet Service Infrastructure. Internet Research: Electronic Networking Applications and Policy, 3 (3), pp. 8-25, Fall 1993.
M.F. Schwartz, A Emtage, B. Kahle and B.C. Neuman. A Comparison of Internet Resource Discovery Approaches. Computing Systems, 5(4), pp. 461-493, Fall 1992.
M.F. Schwartz, D.R. Hardy, W.K. Heinzman and G. Hirschowitz. Supporting Resource Discovery Among Public Internet Archives Using a Spectrum of Information Quality. Proceedings of the Eleventh IEEE International Conference on Distributed Computing Systems, pp. 82-89, Arlington, Texas, May 1991.
M.F. Schwartz. A Measurement Study of Changes in Service-Level Reachability in the Global TCP/IP Internet: Goals, Experimental Design, Implementation, and Policy Considerations. Request for Comments 1273, Department of Computer Science, University of Colorado, Boulder, Colorado, Nov. 1991.
M.F. Schwartz. A Scalable, Non-Hierarchical Resource Discovery Mechanism Based on Probabilistic Protocols, Technical Report CU-CS-474-90, Department of Computer Science, University of Colorado, Boulder, Colorado, Jun. 1990.
*Comcast IP Holdings I, LLV v. Sprint Communications Company L.P. et al.* Sprint's Amended Reply Brief in Support of its Motion to Stay Litigation Pending Reexamination. Filed Jun. 13, 2013.
An Overview of Signalling System No. 7, Modarressi, A.R. & Skoog R.A., Proceedings of the IEEE, vol. 80, No. 4 Apr. 1992.
*Comcast IP Holdings I, LLC v. Sprint Communications Company L.P. et al.* Sprint's Answer and Counterclaims. Filed May 14, 2012.
*Comcast IP Holdings I, LLC v. Sprint Communications Company L.P. et al.* Sprint's Answer to Comcast's First Amended Complaint. Filed Jun. 29, 2012.
*Comcast IP Holdings I, LLC v. Sprint Communications Company L.P. et al.* Sprint's Answer and Counterclaims to Comcast's Second Amended Complaint. Filed Oct. 22, 2012.
*Comcast IP Holdings I, LLC v. Sprint Communications Company L.P. et al.* Comcast's Brief in Opposition to Sprint's Motion to Stay Litigation Pending Reexamination. Filed Jun. 3, 2013.
B. Kahle and A. Medlar. An Information System for Corporate Users: Wide Area Information Servers. ConneXions—The Interoperability Report, 5(11), pp. 2-9, Interop, Inc., Nov. 1991. Nov. 1991.
B. Walker, G. Popek, R. English, C. Kline and G. Thiel. The LOCUS Distributed Operating System. Proc. 9th ACM Symp. Operating Syst. Prin., pp. 49-70, Oct. 1983.

(56) References Cited

OTHER PUBLICATIONS

B.C. Neuman. Prospero: A Tool for Organizing Internet Resources. Electronic Networking: Research, Applications, and Policy, 2(1), pp. 30-37, Meckler Publications, Westport, Connecticut, Spring 1992.
Bailey, Joseph, "Internet Economics: What Happens When Constituencies Collide?" (1995).
Bailey, Joseph, et al. "Internet economics workshop notes." Journal of Electronic Publishing 1.1&2 (1995).
Barker, Paul, and Steve Kille. "The COSINE and Internet X. 500 schema." (1991).
Batni, Ram. "A 'Hybrid Intelligent Network (IN)' Solution for Local No. Portability (LNP) (or How you can take it with you!)." Intelligent Network Workshop, 1996. IN'96., IEEE. IEEE, 1996.
Crocker, Ronald. "Applying IN to mobile communications services beyond telephony." Intelligent Network Workshop, 1996. IN'96., IEEE. IEEE, 1996.
Betts, Richard. "Broadband intelligent networking: evolution of service control." Intelligent Network Workshop, 1996. IN'96., IEEE. IEEE, 1996.
Bilgi, Murat. Mobility Management Application Protocol (MMAP) for North American PCS Networks, IEEE Intelligent Network Workshop '96, Melbourne 1996.
Blankers, Patrick, and Yun-Chao Hu. "Broadband capabilities within intelligent networks." Intelligent Network Workshop, 1996. IN'96., IEEE. IEEE, 1996.
Bloemer, "Re: DYNAMIC Netfind from WWW," Apr. 1993.
Borenstein, Nathaniel S., and Ned Freed. "Multipurpose internet mail extensions (MIME) part five: Conformance criteria and examples." (1996).
C. Dharap, R. Balay and M. Bowman. Type Structured File Systems. Proc. Int. Workshop on Object-Orientation in Operating Systems, IEEE Computer Society Press, Dec. 1993.
C. M. Bowman, P. B. Danzig, D. R. Hardy, U. Manber and M. F. Schwartz. Harvest: A Scalable, Customizable Discovery and Access System. Tech. Rep., Dept. Comput. Sci., Univ. Colorado, Boulder, Jul. 1994. In preparation.
C. M. Bowman, P. B. Danzig, U. Manber and M. F. Schwartz. Scalable Internet Resource Discovery: Research Problems and Approaches. To appear, Commun. ACM, 1994.
C. Weider, J. Fullton and S. Spero. Architecture of the Whois++ Index Service. Internet Draft, WNILS Working Group, Nov. 1992. Available from ftp://nri.reston.va.us/internet-drafts/draft-ieft-wnils-whois-00.txt.
Campbell, Brian. "UPT and PCS: Early implementation experience." Intelligent Network Workshop, 1996. IN'96., IEEE. IEEE, 1996.
Capellmann, Carla, and Kristofer Kimbler. "Towards efficient feature interaction handling." Intelligent Network Workshop, 1996. IN'96., IEEE. IEEE, 1996.
Carew, Jim. "Competition for the IN service provider." Intelligent Network Workshop, 1996. IN'96., IEEE. IEEE, 1996.
Carmagnola, Valerio. "An Integrated IN/B-ISBN Reference Architecture for the Support of Multimedia Services." Intelligent Network Workshop, 1996. IN'96., IEEE. IEEE, 1996.
CCITT/ISO. The Directory, Part 1: Overview of Concepts, Models and Services. CCITT/ISO, Gloucester, England, Dec. 1988. CCITT Draft Recommendation X.500/ISO DIS 9594-1.
CCITT/ITU-T Rec. 1201, "Principles of Intelligent Network Architecture," 1992; see also Q.1202, Q.1203, 0.1204, etc.
Cho, Sehyeong. "SCE as a CASE: an extendible service creation architecture." Intelligent Network Workshop, 1996. IN'96., IEEE. IEEE, 1996.
Clark, David D. "Policy routing in internet protocols." Policy (1989).
Cohen, Danny. "On Names, Addresses and Routings." Internet experiment note (IEN) 23 (1978).
*Comcast IP Holdings I, LLC v. Sprint Communications Company LP, et al.*, CA No. 12-00205-RGA, Jun. 20, 2013 Minuscript.
*Comcast IP Holdings I, LLC v. Sprint Communications Company LP, et al.*, CA No. 12-00205-RGA, Jun. 20, 2013 Transcript.
*Comcast IP Holdings I, LLC v. Sprint Communications Company L.P.* Joint Claim Construction Chart, dated Mar. 1, 2013.
*Comcast IP Holdings I, LLC v. Sprint Communications Company L.P.* Plaintiff's Initial Claim Constructions, dated Jan. 25, 2013.
*Comcast IP Holdings I, LLC v. Sprint Communications Company L.P., et al.* Complaint for Patent Infringement, dated Feb. 21, 2012.
Crabill, Ed. "The Emerging ANSI IN Standard for North America based upon ITU-T Recommendations." Intelligent Network Workshop, 1996. IN'96., IEEE. IEEE, 1996.
Craignou, Beatriz, and J-Y. David. "Integrating intelligent networks in general network planning." Intelligent Network Workshop, 1996. IN'96., IEEE. IEEE, 1996.
D. Hardy and M.F. Schwartz. Essence: A Resource Discovery System Based on Semantic File Indexing. To appear, Proceedings of the USENIX Winter Conference, San Diego, California, Jan. 1993.
D. K. Gifford, P. Jouvelot, M. A. Sheldon and J. W. O'Toole, Jr. Semantic File Systems. Proc. 13th ACM Symp. Operating Syst. Prin., pp. 16-25, Oct. 1991.
D. R. Hardy and M. F. Schwartz. Customized Information Extraction as a Basis for Resource Discovery. Tech. Rep. CU-CS-707-94, Dept. Comput. Sci., Univ. Colorado, Boulder, Mar. 1994. Submitted for publication.
D. Zimmerman. The Finger User Information Protocol. Req. For Com. 1288, Center for Discrete Mathematics and Theoretical Computer Science, Nov. 1990.
D.J. Ewing, R. S. Hall and M.F. Schwartz. A Measurement Study of Internet File Transfer Traffic. Technical Report CU-CS-571-92, Department of Computer Science, University of Colorado, Boulder, Colorado, Jan. 1992.
D.L. Mills. Network Time Protocol (NTP). Req. For Com. 958, M/ACOM Linkabit, Sep. 1985.
Dasgupta, Partha. "Resource location in very large networks." Distributed and Networked Environments, 1994. Proceedings., First International Workshop on Services in. IEEE, 1994.
*Comcast IP Holdings I, LLC v. Sprint Communications Company L.P., et al.* Declaration of David J. Lisson in Support of Comcast's Brief in Opposition to Sprint's Motion to Stay Litigation Pending Reexamination, filed Jun. 4, 2013.
*Comcast IP Holdings I, LLC v. Sprint Communications Company L.P., et al.* Declaration of Robert Reckers in Support of Sprint's Motion to Stay Litigation Pending Reexamination, filed May 16, 2013.
*Comcast IP Holdings I, LLC v. Sprint Communications Company L.P., et al.* Plaintiff's Corporate Disclosure Statement, filed Feb. 21, 2012.
Eckardt, T., and T. Magedanz. "Personal Communications support based on TMN and TINA Concepts." Intelligent Network Workshop, 1996. IN'96., IEEE. IEEE, 1996.
International Search Report—PCT/GB1996/03054—Mailing date: Sep. 25, 1997.
International Search Report—PCT/GB1996/03055—Date of completion: Mar. 27, 1997.
International Search Report—PCT/GB1997/00469—Mailing date: Sep. 25, 1997.
ITU-Approved Global TLD ".tel" to be used for "E.164 Number Mapping", Internet Management Systems, Inc., Study group 2—Delayed contribution 185 Corr.1, COM2-D185 Corr.1-E, Geneva, May 18-28, 7 pages 2004.
ITU-T, X.691 Corrigendum 1, Series X: Data networks, open System communications and Security, May 2005.
Jabbari: "Common channel signaling system No. 7 for ISDN and intelligent networks", Proceedings of the IEEE., vol. 79, No. 2, Feb. 1991, pp. 155-169, XP000226399, New York, US.
Lee et al., Design and Implementation of Important Applications in a Java-Based Multimedia Digital Classroom, Aug. 1997, IEEE Transactions on Consumer Electronics, vol. 43, No. 3, pp. 264-270.
Notice of opposition—EP 02000568.2—Mailing date: Feb. 14, 2005.
Office action—EP 02000567.4—Mailing date: Sep. 11, 2003.
Office action—EP 02000568.2—Mailing date: Sep. 11, 2003.
Office action—EP 02011638.0—Mailing date: Dec. 1, 2011.
Office action—EP 02011638.0—Mailing date: Dec. 18, 2007.
Office action—EP 02079913.6—Mailing date: Apr. 25, 2012.
Office action—EP 96941763.3—Mailing date: Sep. 4, 2003.
Office action—EP 96941765.8—Mailing date: Feb. 8, 2000.

(56) References Cited

OTHER PUBLICATIONS

Office action—EP 96941769.0—Mailing date: Mar. 10, 2003.
Office action—EP 96941769.0—Mailing date: Mar. 24, 2004.
Office action—EP 96941769.0—Mailing date: Sep. 4, 2001.
Office action—EP 97300799.0—Mailing date: Nov. 21, 2003.
Office action—EP 97300819.6—Mailing date: Nov. 21, 2003.
Office action—EP 97903514.4—Mailing date: Dec. 30, 1999.
Office action—EP 98123599.7—Mailing date: Nov. 27, 2006.
Office action—EP 98306279.5—Mailing date: Sep. 14, 2001.
Office action—EP 98916876.0—Mailing date: Feb. 15, 2002.
Office action—EP 98916877.8—Mailing date: May 24, 2005.
Oral proceedings and decision oral proceedings EP opposition—EP 02000568.2, Mailing date: Jul. 25, 2006.
Partial European Search Report—EP 02079913.6—Mailing date: Feb. 3, 2011.
Response to Appeal—Appeal against decision oral proceedings EP opposition—EP 02000568.2, Mailing date: May 7, 2007.
Richardson et al., Virtual Network Computing, Feb. 1998, IEEE Internet Computing, pp. 33-38.
US Office action—U.S. Appl. No. 13/525,454—Mailing date: May 31, 2013.
US Office action—US 6,038,689—Mailing date: Feb. 2, 1999.
US Office action—US 6,038,689—Mailing date: May 19, 1999.
US Office action—US 6,055,643—Mailing date: Jan. 25, 1999.
US Office action—US 6,282,281—Mailing date: Oct. 3, 2000.
US Office action—US 6,567,852—Mailing date: Oct. 1, 2002.
US Office action—US 6,798,771—Mailing date: Aug. 8, 2002.
US Office action—US 6,798,771—Mailing date: Feb. 14, 2001.
US Office action—US 6,798,771—Mailing date: Jan. 8, 2003.
US Office action—US 6,798,771—Mailing date: May 5, 2003.
US Office action—US 8,170,008—Mailing date: Jan. 3, 2011.
US Office action—US 8,189,565—Mailing date: Jan. 3, 2011.
US Office action—US 8,204,046—Mailing date: Jan. 9, 2012.
US Office action—US 8,223,752—Mailing date: May 7, 2012.
Wilson et al.: A network control architecture for bandwidth management, supercomm / icc 1992, vol. 3, Jun. 14, 1992, pp. 1385-1391, XP000337937, Chicago, US.
European Search Report—EP 02000567.4—Mailing date: Aug. 6, 2002.
"Specification of the KQML Agent Communicatoin Language," The DARPA Knowledge Sharing Initiative External Interfaces Working Group, draft, Feb. 1994.
A. Emtage and P. Deutsch. Archie—An Electronic Directory Service for the Internet. Proceedings of the USENIX Winter Conference, pp. 93-110, San Francisco, California, Jan. 1992.
Airiyan, Helen. "Experiences in Designing a Capacity Planning Tool for Intelligent Networks." Intelligent Network Workshop, 1996. IN'96., IEEE. IEEE, 1996.
Alanko, Timo, et al. "Measured performance of data transmission over cellular telephone networks." ACM SIGCOMM Computer Communication Review 24.5 (1994): 24-44.
Albitz, Paul. DNS and Bind. O'reilly, 2001.
*Comcast IP Holdings I* vs. *Sprint Communications*; C.A. No. 1:12-cv-00205-RGA; Expert report of Dr. Ray Mercer regarding the invalidity of Comcast's patents, Sep. 20, 2013.
*Comcast IP Holdings I* vs. *Sprint Communications*; C.A. No. 1:12-cv-00205-RGA; Rebutal expert report of Dr. Ray Mercer regarding the invalidity of Comcast's patents, Nov. 8, 2013.
*Comcast IP Holdings I, LLC* v. *Sprint Communications Company L.P.*; C.A. No. 1:12-cv-00205-RGA; Rebuttal expert report of Jeffrey S. Dwoskin—Redacted—Oct. 25, 2013.
*Comcast IP Holdings I* vs. *Sprint Communications*; C.A. No. 1:12-cv-00205-RGA; Memorandum order, Aug. 22, 2014.
Mockapetris, P., RFC#1035 (Domain Names—Implementation and Specification), Nov. 1987, 56 pages.
Everhart, C., et al., RFC#1183 (New DNS RR Definitions), Oct. 1990, 12 pages.
Albitz, Paul, et al., "DNS and Bind" (excerpted), Oct. 1992, Revised Mar. 1993 and Jul. 1994, 53 pages.
Rose, M., RFC#1703 (Principles of Operation for the TPC.INT Subdomain: Radio Paging—Technical Procedures), Oct. 1994, 10 pages.
Schwartz, Michael, Netfind Support for URL-Based Search Customization, Jun. 28, 1994, 5 pages.
Schwartz, Michael, et al., Applying an Information Gathering Architecture to Netfind: A White Pages Tool for a Changing and Growing Internet, Dec. 1993, Revised Jul. 1994, 23 pages.
Hewlett Packard's Response to European Opposition filed by Siemens AG to European Patent EP1207704 dated Dec. 15, 2005, 17 pages.
RFC #1486 (an Experiment in Remote Printing), Jul. 1993.
Plaintiffs Opening Claim Construction Brief filed Mar. 29, 2013 in *Comcast IP Holdings I, LLC* v. *Sprint Communications Company L.P., et al*, District of Delaware, Case No. 12-205-RGA, 25 pages.
Office Action, U.S. Appl. No. 11/066,880, mailed Dec. 11, 2007.
Office Action, U.S. Appl. No. 11/590,489, mailed Dec. 1, 2009.
Office Action, U.S. Appl. No. 11/590,489, mailed Mar. 18, 2009.
Office Action, U.S. Appl. No. 12/389,837, mailed Jun. 25, 2010.
Office Action, U.S. Appl. No. 12/389,843, mailed Jul. 2, 2010.
Office Action, U.S. Appl. No. 12/389,851, mailed Jul. 23, 2010.
Office Action, U.S. Appl. No. 10/052,305 (U.S. Patent No. 7,206,304), mailed Jun. 19, 2006.
Office Action, U.S. Appl. No. 11/066,880, mailed Apr. 14, 2009.
Office Action, U.S. Appl. No. 11/066,880, mailed Nov. 23, 2009.
Rose, M., et al., "RFC 1486—An Experiment in Remote Printing" RFC 1486 Internet <http:/ /www.faqs.org/rfcs/rfc1486.html> pp. 1-12 (Jul. 1993).
US Office Action—U.S. Appl. No. 09/999,407—Mailing date: Jun. 17, 2004.
3th part letter in Appeal procedure—EP 02000568.2, Mailing date: Dec. 18, 2006.
82371AB PCI-TO-ISA/IDE Xcelerator (PIIX4) Manual, Intel Corporation, Apr. 1997, pp. 1-284.
Appeal against decision oral proceedings EP opposition—EP 02000568.2, Mailing date: Dec. 4, 2006.
Appeal decision against decision oral proceedings EP opposition—EP 02000568.2, Mailing date: Jul. 23, 2007.
AT&T / Spanlink Press release, "AT&T, Spanlink to provide secure internet Links", Dec. 4, 1995.
Bersano-Begey T F et al: "A Java collaborative interface for genetic programming applications: image analysis for scientific inquiry" Apr. 13, 1997, Evolutionary Computation, 1997., IEEE International Conference on Indianapolis, IN, USA Apr. 13-16, 1997, New York, NY, USA, IEEE, US, pp. 477-482, XP01 0225484.
Common Patent Policy for ITU-T/ITU-R/ISO/IEC, Apr. 19, 2007.
Das Internet in Deutschland—Ein alter Hut?, May 4, 2007.
European Search Report—EP 00117677.5—Mailing date: Nov. 8, 2000.
European Search Report—EP 020005682—Mailing date: Aug. 6, 2002.
European Search Report—EP 02011638.0—Mailing date: Nov. 23, 2005.
European Search Report—EP 04106083.1—Mailing date: Oct. 11, 2005.
European Search Report—EP 97300799.0—Mailing date: Sep. 29, 1998.
European Search Report—EP 97300819.6—Mailing date: Sep. 29, 1998.
European Search Report—EP 98123599.7—Mailing date: Oct. 12, 1999.
European Search Report—EP 98306279.5—Mailing date: Jan. 4, 1999.
European Search Report—EP 98307559.9—Mailing date: Feb. 26, 1999.
Fraud suppression techniques using SS/protocol analyzers, Research Disclosure, No. 365, Sep. 1994, p. 491, XP000471281, Emsworth GB.
Hou et al.: Error monitoring issues for common channel signaling, IEEE journal on selected areas in communications, vol. 12, No. 3, Apr. 1994, pp. 456,467, xp000458691.
International Preliminary Examination Report—PCT/EP1998/01119—date of completion: May 25, 1999.

(56) References Cited

OTHER PUBLICATIONS

International Preliminary Examination Report—PCT/GB1996/03048—date of completion: Mar. 30, 1998.
International Preliminary Examination Report—PCT/GB1996/03049—date of completion: Jan. 22, 1998.
International Preliminary Examination Report—PCT/GB1996/03051—date of completion: Mar. 4, 1998.
International Preliminary Examination Report—PCT/GB1996/03055—date of completion: Mar. 5, 1998.
International Preliminary Examination Report—PCT/GB1997/00469—date of completion: May 12, 1998.
International Search Report—PCT/EP1998/01119—Date of completion: Aug. 20, 1998.
International Search Report—PCT/EP1998/01120—Date of mailing: Sep. 15, 1998.
International Search Report—PCT/GB1996/03048—Mailing date: Mar. 27, 1997.
International Search Report—PCT/GB1996/03049—Mailing date: Jun. 2, 1997.
International Search Report—PCT/GB1996/03051—Date of completion: Mar. 10, 1997.
S. Boag, D. Chamberlin, M. Fernadez, D. Florescu, J. Robie, J. Simeon, and M. Stefanescu. XQuery 1.0: An XML Query Language (XQL). Technical report, World Wide Web Consortium, Apr. 2002. Available from http://www.w3.org/TR/xquery.
Final Office Action—U.S. Appl. No. 90/012,863—Mailing Date: Nov. 20, 2013.
Response to Non-Final Office Action—U.S. Appl. No. 90/012,859—Filed Nov. 25, 2013, including all declarations and exhibits.
Response to Non-Final Office Action—U.S. Appl. No. 90/012,864—Filed Oct. 16, 2013, including all declarations and exhibits.
Response to Non-Final Office Action—U.S. Appl. No. 90/012,863—Filed Oct. 23, 2013, including all declarations and exhibits.
Response to Non-Final Office Action—U.S. Appl. No. 90/012,845—Filed Nov. 22, 2013, including all declarations and exhibits.
Response to Non-Final Office Action—U.S. Appl. No. 90/012,846—Filed Oct. 9 2013, including all declarations and exhibits.
Response to Non-Final Office Action—U.S. Appl. No. 90/012,849—Filed Nov. 4, 2013, including all declarations and exhibits.
Response to Non-Final Office Action—U.S. Appl. No. 90/012,850—Filed Oct. 16, 2013, including all declarations and exhibits.
"Cisco Expands ISDN Router Solutions with Introduction of Low-Cost ISDN Router Series for Enterprise Telecommuters" Cisco Systems, Nov. 1995.
A. A. Lazar, K.S. Lim and F. Marconcini "Realizing a Foundation for Programmability of ATM Networks with the Binding Architecture", IEEE Journal on Selected Areas in Communications, vol. 14, No. 7, pp. 1214-1227 1996.
M.Y. Chung, D.K. Sung, Performance analysis of a profile management scheme for incall registration/deregistration in wireline UPT networks, IEICE Trans. Commun. E82-B (5) (1999).
M.Y. Chung, S.H. Kang, D.K. Sung, Performance analysis of two schemes for managing information related to incall registration in wireline UPT networks, Computer Communications 22 (1999) 1592-1606.
Marco Listanti and Francesco Villani,"An X.25-compatible protocol for packet voice communications," Computer Communications, pp. 23-31, vol. 6, No. 1, Feb. 1983, Butterworth & Co., Ltd.
S.C. Ahn, G.C. Choi, and K.S. Lee, "Implementation of IN in Korea Telecom," Proc. International Council for Computer Communication in Conference, pp. 224-235, 1992.
The Common Object Request Broker: Architecture and specification. OMG Document No. 91.12.1, Dec. 1991. Revision 1.1 (Draft 10).
Y. Nakamura, et al., On a Hybrid Network System of Circuit Switching and Packet Switching, The Transactions of the IECE of Japan, vol. E 65, No. 6, Jun. 1982, pp. 37-45.
Briere, Daniel D., et al., "Internet Telephony for Dummies," 2nd Edition, Idg Books Worlwide, Inc., pp. 249-268, 1997.
Chapman, D. Brent et al., "Building Internet Firewalls", Nov. 1995, O'Reilly & Associates, p. 58.
Margulies, Edwin (Aug. 1996) Understanding the Voice-Enabled Internet, Flatiron Publishing, Inc., pp. 4-42 and 12-1 to 12-3.
Gralla, Preston, "How the Internet Works," Ziff-Davis Press, pp. 118-119, 1996.
Non Final Office Action—U.S. Appl. No. 90/012,859—Mailing Date: Sep. 25, 2013.
Non Final Office Action—U.S. Appl. No. 90/012,845—Mailing Date: Sep. 25, 2013.
*Comcast IP Holdings I, LLC* v. *Sprint Communications Company L.P. et al.*; Expert report of Dr. Ray Mercer regarding the invalidly of Comcast patents, Sep. 20, 2013.
Cady et al., "Mastering the Internet", Sybex Inc., Alameda, CA 1996.
Leconte, A., and M. Sevcik. "Reshaping the IN for Multimedia: Is there a life after Internet." International Conference on Intelligence in Networks, p. 2-6. Nov. 1, 1996.
M. Andreasson et al., A server integrating Computer Telephony amd Intelligent Network, International Conference on Intelligence in Networks, p. 7-12. Nov. 1, 1996.
Yoshihiro Niitsu et al., Customization Methodology of Advanced IN Services for a large Number of Subscribers, International Conference on Intelligence in Networks, p. 13-18. Nov. 1, 1996.
Wolfgang Lautenschlager et al., Routing Service for the Implementation of Number Portability, International Conference on Intelligence in Networks, p. 19-24. Nov. 1, 1996.
Soren Wallinder, Universal Personal Telecommunication, UPT, implementation and base for new services, International Conference on Intelligence in Networks, p. 25-28. Nov. 1, 1996.
T. Magendanz et al., Towards "Intelligence on Demand"—On the Impacts of Intelligent Agents in IN, International Conference on Intelligence in Networks, p. 30-34, Nov. 1, 1996.
Carlo A. Licciardi et al, Would you use TINA in your IN based Network? Some feasible scenarios, International Conference on Intelligence in Networks, p. 35-40. Nov. 1, 1996.
G. von der Straten et al., Realization of B-IN Services in a Multinational ATM network, International Conference on Intelligence in Networks, p. 41-46. Nov. 1, 1996.
M. Burke et al., Aggressively Pushing the in Envelope in TIA, International Conference on Intelligence in Networks, p. 47-51. Nov. 1, 1996.
Yukio Kawanami et al., An Evolvable Approach on in Capabilities for Emerging Video on Demand Service, International Conference on Intelligence in Networks, p. 52-57. Nov. 1, 1996.
K. Ravindran, Local Number Portability—The IN Way, International Conference on Intelligence in Networks, p. 59-64. Nov. 1, 1996.
Ronald T. Crocker, Modifying the IN Architecure to Further Support Mobile Communication Services, International Conference on Intelligence in Networks, p. 65-70. Nov. 1, 1996.
William Gray et al., Handover Control Scenarios within an IN architecture, International Conference on Intelligence in Networks, p. 71-76. Nov. 1, 1996.
Minoru Aramoto et al., Intelligent Network Evolution for Global Services—Handling of Service Data—, International Conference on Intelligence in Networks, p. 77-82. Nov. 1, 1996.
Armin Eberlein et al., Tools for Requirements Capture, Formal Specification and Validation of IN Services, International Conference on Intelligence in Networks, p. 84-89. Nov. 1, 1996.
Marie-Pierre Gervais et al., Formalization of Service Creation in Intelligent Network, International Conference on Intelligence in Networks, p. 90-95. Nov. 1, 1996.
Bernhard Steffen et al., Service Creation; Formal Verification and Abstract Views, International Conference on Intelligence in Networks, p. 96-101. Nov. 1, 1996.
M. Pucko et al., Integration of Formal and Informal Approach to IN Services Specification and Design, International Conference on Intelligence in Networks, p. 102-106. Nov. 1, 1996.
M. Yoshimi et al., Data transfer between SDFs without interrupting service execution, International Conference on Intelligence in Networks, p. 108-113. Nov. 1, 1996.
O. Makhrovskiy et al., Complex of Software Tools for Intelligent Network Optomizations, Dimensioning and Planning, International Conference on Intelligence in Networks, p. 114-119. Nov. 1, 1996.

(56) References Cited

OTHER PUBLICATIONS

Fumio Nitta et al., Semi-Automated Test Data Generation and Test Result Examination for Testing of IN Service Software, International Conference on Intelligence in Networks, p. 120-125. Nov. 1, 1996.
Marc Vincent, IN Service implementation in practice: a system integration point of view, International Conference on Intelligence in Networks, p. 126-129. Nov. 1, 1996.
Manfred Reitenspeis, Providing Highly Available Computer Systems for Telecommunication Applications, International Conference on Intelligence in Networks, p. 130-135. Nov. 1, 1996.
Bertrad Nicolas et al., Judicael: an extensible ODBMS for IN Management, International Conference on Intelligence in Networks, p. 156-161. Nov. 1, 1996.
Jose Eduardo Martins et al., The Brazilian Intelligent Network Platform Challenges and Results, International Conference on Intelligence in Networks, p. 136-141. Nov. 1, 1996.
Raul Oliviera et al., From Intelligent Agents towards Management by Request, International Conference on Intelligence in Networks, p. 162-167. Nov. 1, 1996.
Malcolm Hayes, Managing the Future Intelligent Network, International Conference on Intelligence in Networks, p. 143-145. Nov. 1, 1996.
D. Hamuro et al., A Study on a Software Structure of Service Operations Systems and its Performance Evaluation, International Conference on Intelligence in Networks, p. 146-151. Nov. 1, 1996.
Michel Picard, Service Creation for Service Management and Customer Control, International Conference on Intelligence in Networks, p. 152-155. Nov. 1, 1996.
Junya Akiba et al., Intelligent Network Call Model for Controlling B-ISDN, International Conference on Intelligence in Networks, p. 169-174. Nov. 1, 1996.
Hee Jin Lim et al., A Design of Centralized Call Model for Intelligent Network and B-ISDN Integration, International Conference on Intelligence in Networks, p. 175-180. Nov. 1, 1996.
Lucia Vezzoli et al., Intelligent Mobile Video on Demand, International Conference on Intelligence in Networks, p. 181-186. Nov. 1, 1996.
Kazuhiko Takagi et al., Service Creation and Test Environment for Intelligent Network, International Conference on Intelligence in Networks, p. 188-193. Nov. 1, 1996.
W.D. Bartter et al., Service Creation and Service Management in a Multivendor Intelligent Network, International Conference on Intelligence in Networks, p. 194-199. Nov. 1, 1996.
M.F. Schwartz. Resource Discovery and Privacy. Internet Society News, 2(1), pp. 16-18, Spr. 1993.
Madureira, M. "The challenge of Brazilian IN national platform." Intelligent Network Workshop, 1996. IN'96., IEEE. IEEE, 1996.
Malis, Andy, David Robinson, and R. Ullmann. Multiprotocol Interconnect on X. 25 and ISDN in the Packet Mode. RFC 1356. BBN Communications, Computervision System Integration, Process Software Corporation, 1992.
McGovern, Michael, and R. Ullmann. "CATNIP: Common Architecture for the Internet." (1994).
Mercando, Anthony D. "Maneuvering on the Internet." Pacing and Clinical Electrophysiology 17.5 (1994): 976-979.
Mercouroff, Nicolas. "Migration of IN Towards TINA: A DPE based IN." Intelligent Network Workshop, 1996. IN'96., IEEE. IEEE, 1996.
Mohan, Seshadri, and Ravi Jain. "Two user location strategies for personal communications services." Personal Communications, IEEE 1.1 (1994): 42-50.
Murch, Alan, and Robin Wrigley. "Open networking in New Zealand." Intelligent Network Workshop, 1996. IN'96., IEEE. IEEE, 1996.
N.P. Singh and M.A. Gisi, "Coordinating Distributed Objects with Declarative Interfaces," Proc. 1st Int'l. Conf. Coordination, Models, Languages and Apps., Cesena, Italy, 1996.
North American Directory Forum. User Bill of Rights for Entries and Listings in the Public Directory. Req. For Com. 1295, North American Directory Forum, Jan. 1992.

Okamoto, M., and Y. Niitsu. "Service specification description using extended message sequence charts between network and users." Intelligent Network Workshop, 1996. IN'96., IEEE. IEEE, 1996.
Obraczka, Katia, Peter B. Danzig, and S-H. Li. "Internet resource discovery services." Computer 26.9 (1993): 8-22.
Ostrowski, Martin. "Interdomain Security Issues for in Based Services." Intelligent Network Workshop, 1996. IN'96., IEEE. IEEE, 1996.
P. Vixie. DNS and BIND security issues. USENIX, 1995.
Peeren, Rene. "IN in the hybrid broadband network: the intelligent web." Intelligent Network Workshop, 1996. IN'96., IEEE. IEEE, 1996.
Patel, Sanjiv P., Grant Henderson, and Nicolas D. Georganas. "Multimedia fax-Mime interworking." Multimedia Computing and Systems, 1994., Proceedings of the International Conference on. IEEE, 1994.
Removing Type A Restrictions, John Visser, IEEE Intelligent Network Workshop '96, Melbourne 1996.
Reber, Ulrich. "IN as an integrator for private and public networks." Intelligent Network Workshop, 1996. IN'96., IEEE. IEEE, 1996.
Resource Reservation Protocol (RSVP) Version I Functional Specification, R. Braden, L. Zang, S. Herzog, S. Jamin, IETF, Aug. 1996.
Rieken, Ralf. Serivce Creation, INAP and Basic Network Interworking: What is their relationship concerning competitive services? IEEE Intelligent Network Workshop '96, Melbourne 1996.
Romao, A. "Tools for DNS debugging." (1994).
Roscam, Rombaut. Service Personalization in Future Intelligent Networks. Intelligent Network Workshop, 1996. IN'96., IEEE. IEEE, 1996.
Russo, Pete. "A practical approach to a usable in feature interaction tool." Intelligent Network Workshop, 1996. IN'96., IEEE. IEEE, 1996.
Salter, Avril. "Architecting in from a User Behaviour Perspective: A Wireless View." Intelligent Network Workshop, 1996. IN'96., IEEE. IEEE, 1996.
Sasse, Martina Angela, and Roy Bennett. "Multimedia conferencing over the internet—the mice project." (1995).
*Comcast IP Holdings I, LLC* v. *Sprint Communications Company L.P., et al.* Scheduling Order Regarding Counterclaim—Plaintiff's Patents, filed Jul. 24, 2012.
Schlenoff, Craig I. World Wide Web and Mosaic: User's Guide. Craig I. Schlenoff., 1994.
Schmandt, Chris, and Michael A. McKenna. "An audio and telephone server for multi-media workstations." Computer Workstations, 1988., Proceedings of the 2nd IEEE Conference on. IEEE, 1988.
Schopp, Michael. "Performance Evaluation of in Based Mobility Management." Intelligent Network Workshop, 1996. IN'96., IEEE. IEEE, 1996.
Schreyer, Oliver, Holger Gappisch, and Henning Maass. "Least cost call routing—a brilliant application for private IN." Intelligent Network Workshop, 1996. IN'96., IEEE. IEEE, 1996.
Schulzrinne, Henning. "Internet services: from electronic mail to real-time multimedia." Kommunikation in Verteilten Systemen. Springer Berlin Heidelberg, 1995.
Schulzrinne, Henning. Voice communication across the Internet: A network voice terminal. University of Massachusetts at Amherst, Department of Computer and Information Science, 1992.
Schwartz, "Internet Resource Discovery at the University of Colorado," Oct. 1992.
Schwartz, "Netfind Internet 'White Pages' Tool Available by FTP," Mar. 1992.
Schwartz, "Which White Pages Service is Appropriate for my Site?", Winter 1993.
Schwartz, Michael F., and Calton Pu. "Applying an information gathering architecture to Netfind: a white pages tool for a changing and growing Internet." IEEE/ACM Transactions on Networking (TON) 2.5 (1994): 426-439.
Schwartz, Michael F., and Panagiotis G. Tsirigotis. "Experience with a semantically cognizant internet white pages directory tool." Internetworking: Research and Experience 2.1 (1991): 23-50.
Scott, Peter. "Using HYTELNET to Access Internet Resources." Public Access-Computer Systems Review 3.4 (1992).

(56) References Cited

OTHER PUBLICATIONS

Signalling System No. 7, IS-41 and Cellular Telephone Networking, David Wilson, Proceedings of the IEEE Personal Communications, 1st. Quarter 1994.
Serino, Mike. "SCP Reliability: How are we doing?." Intelligent Network Workshop, 1996. IN'96., IEEE. IEEE, 1996.
*Sprint Communications Company L.P.* v. *Comcast Cable Communications, LLC.* Sprint's Preliminary Infringement Contentions, dated Nov. 2, 2012.
Stevenson, Sylvia, Yana Kane-Esrig, and Kevin Dooley. "Risk analysis of advanced intelligent network architectures." Intelligent Network Workshop, 1996. IN'96., IEEE. IEEE, 1996.
Sturrus, Richard. "IN Test and Simulation Tool." Intelligent Network Workshop, 1996. IN'96., IEEE. IEEE, 1996.
Sturrus, Richard. "Service creation in a multi-vendor IN." Intelligent Network Workshop, 1996. IN'96., IEEE. IEEE, 1996.
T Berners-Lee, R. Cailliau, J. Groff and B. Pollermann. World-Wide Web: The Information Universe. Electronic Networking: Research, Applications and Policy, 2(1), pp. 52-58, Meckler Publications, Westport Connecticut, Spring 1992.
Van der Meer, Jan. "Service management, provision and design." Intelligent Network Workshop, 1996. IN'96., IEEE. IEEE, 1996.
Takami, K., et al. "An application of advanced intelligent network technology to personal communication services." Intelligent Network Workshop, 1996. IN'96., IEEE. IEEE, 1996.
WebIN—An Architecture for Fast Deployment of IN-based Personal Services. Colin Low, David Skov & Nicolas Ragideau, IEEE Intelligent Network Workshop '96, Melbourne 1996.
Vixie, Paul, et al. "Name Server Operations Guide for BIND." Vixie Enterprises, Jul. 1994.
Wang, Helen J., et al. "ICEBERG: An Internet core network architecture for integrated communications." Personal Communications, IEEE 7.4 (2000): 10-19.
Deep Throat Shoots Verizon Patent Out of the Water, <http://blog/tmcnel.com/blog/tom-keating/vonage/deep-throat-shoots-verizon-patent-out-of-the-water... >, 8 pages, Apr. 19, 2007.
NetNumber, <http://www.netnumber.com/intellectualproperty.html>, 1 page, 1999.
The History of TPC.INT, <http://www.lpc.inl/faq/history.html>, 2 pages, 1999.
The Internet Multicasting Service: Ted Turner, watch out!, <http://www.findarticles.comlp/articles/mi_mOREUis_n2_v94/ai_15048995/print?tag=artBody;c... >, 5 pages, 1994.
*Comcast IP Holdings I, LLC* v. *Sprint Communications Company L.P. et al.* Colin Low Deposition Transcript and Exhibits 1-13, dated Aug. 23, 2013. Confidential / Subject to Protective Order and Petition to Expunge.
*Comcast IP Holdings I, LLC* v. *Sprint Communications Company L.P. et al.* David Marcus Deposition Transcript and Exhibits 43-A and 61-71, dated Aug. 28, 2013. Confidential / Subject to Protective Order and Petition to Expunge.
IPv6—The New Internet Protocol, Christian Huitema, Prentice Hall 1996.
J. S. Quarterman. The Matrix: Computer Networks and Conferencing Systems Worldwide. Digital Press, Bedford, MA, 1990.
S. Carl-Mitchell and J. S. Quarterman. The Internet Connection: System Connectivity and Configuration. Addison Wesley, Reading, MA, 1994. ISBN 0-201-54237-4.
Curran, S. "Why your Telco Can't Ignore the Internet." Rural Telecommunications 14 (1995): 30-41.
M. Kwiatkowski, Performance modeling of UPT networks, Proc. of the IEEE International Conference on Universal Personal Communications, vol. 1, 1995, pp. 543-547.
Lee et al., "Supporting Multi-User, Multi-Applet Workspaces in CBE", Computer Supported Cooperative Work 1996, Cambridge, MA.
J.D. Smith, "An Overview to Computer-Telecommunications Integration (CTI)", Telecommunications, Conference Publication No. 404, IEE, pp. 44-48, Mar. 1995.
Eric Skow, et al., "A Security Architecture for Application Session Handoof," 2002, IEEE International Conference Proceedings, Apr. 28-May 2, 2002, vol. 1 of 5, pp. 2058-2063, XP010589848.
Chase, Jeffrey S., "Dynamic Virtual Clusters in a Grid Site Manager," Proceedings of the IEEE International Symposium on HPDC-2003, XP010463715, pp. 90-100.
Zellweger et al., "An Overview of the Etherphone System and Its Applications," Proceedings of the 2nd IEEE Conference on Computer Workstations, Mar. 1988.
Banerjea, et al., "Designing QoSMIC: A Quality of service Sensitive Multicast Internet Protocol", Internet-Draft, Inter-Domain Multicast Routing (Apr. 1998).
"A Call to Phones," Wired Magazine, Issue 4.03, http://www.wired.com/wired/archive/4.03/updata.html (Mar. 1996).
Non Final Office Action—U.S. Appl. No. 90/012,846—Mailing Date: Aug. 9, 2013.
Non Final Office Action—U.S. Appl. No. 90/012,864—Mailing Date: Aug. 16, 2013.
Non Final Office Action—U.S. Appl. No. 90/012,850—Mailing Date: Aug. 16, 2013.
Lottor, Mark. RFC 1033, "Domain administrators operations guide." (1987).
*Comcast IP Holdings I, LLC* v. *Sprint Communications Company L.P., et al.* Claim Construction, dated Aug. 16, 2013.
Rosenberg, J., et al., "SIP: Session Initiation Protocol," Network Working Group, The Internet Society, Jun. 2002.
"Internet Access: Internet Phone-to-Phone Technology Now a Reality. . . ", Edge Publishing, Aug. 12, 1996.
"Internet Phone Calls are Cheap but Limited", New Media Markets, Feb. 23, 1995, Financial Times Business Information, Ltd., ISSN:0265-4717.
"Internet Telephony Seems to be Evolving East, But is There Anyone on the Line?", Computergram International, Aug. 19, 1996, No. 2980, ISSN: 0268-716X.
"Internet's International Phone Calls are Cheap But Limited", Telecom Markets, Financial Times Business Information ID, Mar. 2, 1995, ISSN: 0267-1484.
"Netspeak Corporation Introduces Webphone, Industry's First Internet-Based Telephony Solution for Business Users," PC Forum, Apr. 9, 1996.
"objectivity/DB in telecommunications applications", an objectivity , Inc. White Paper, copyright 2001, 8 pages.
"Overview", NetSpeak Corporation, Apr. 8, 1997, printed from Edgar Online.
Annual Report to the Defense Communications Agency, "Defense Switched Network Technology and Experiments Program", Massachusetts Institute of Technology Lincoln Laboratory, Oct. 1, 1982-Sep. 30, 1983, issued Sep. 30, 1985.
Aspnes, James, et al., "On-Line Routing of Virtual Circuits willi Applications to Load Balancing and Machine Scheduling," pp. 486-504, Journal of the ACM, vol. 44, No. 3, May 1997.
Bethoney, Herb, "HAHTSite Gives Pros Everything They Need," PC Week, p. 36, Mar. 10, 1997.
Bonett, Monica, "Personalization of Web Services: Opportunities and Challenges", Date: Jun. 22, 2001, http://www.anadne.ac.uk/issue28/personalization/.
Chun-Li Lin et al. "Three-party Encrypted Key Exchange: Attacks and a Solution". May 2000.
Cohen et al., "A Network Voice Protocol NVP-11", Lincoln Laboratory Massachusetts Institute of Technology, Apr. 1, 1981, ISI/RR-83-23.
Frezza, "The Internet Phone is Poised to Conquer", Communications Week, Dec. 11, 1995, http://techweb.cmp.com/cw/current.
Garrahan, James J., et al., "Intelligent Network Overview," IEEE Communications Magazine, vol. 31, No. 3, pp. 30-36, Mar. 1993.
Gross, "Proceedings of the Oct. 15-17, 1988 Joint Meeting of the Internet Engineering and Internet Architecture Task Forces", Fourth IETF, The Mitre Corporation.
Gys, L, et al., "Intelligence in the Network," Alcatel Telecommunications Review, pp. 13-22, 1st Quarter 1998.
Haiges, S. "JAIN/SLEE: EJB for Communications, Opening the telecommunications world for Java," http://java.syscon.com/read/46230.htm, Sep. 7, 2004. Not Prior Art.

(56) References Cited

OTHER PUBLICATIONS

Schulzrinne et al., "Simple Conference Invitation Protocol", Internet Engineering Task Force, draft-ieft-mmusic-sip-00, Feb. 22, 1996.
Handley et al., "SIP: Session Initiation Protocol", Internet Engineering Task Force, Internet Draft, Jul. 31, 1997, draft-ietf-mmusic-sip-03.txt, Jul. 31, 1997.
Handley, M., et al., "SIP: Session Initiation Protocol," Internet Engineering Task Force, pp. 1-30, Dec. 2, 1996.
Henk Uijterwaal and Olaf Kolkman, "Internet Delay Measurements Using Test Traffic Design Note", RIPE NCC, http://www.ripe.net/test-trafic/Notes/RIPE-158/ (Jun. 1997).
Henk Uijterwaal, "Internet Delay Measurements Using Test Traffic Installing and Hosting a Test Box", RIPE NCC, http://www.ripe.net/test-traffic/Notes/RIPE-168/note.html (Mar. 1998).
JAIN Integrated network APIs for the Java Platform, A white paper describing the JAIN objectives, overall technical architecture and program structure, Nov. 2000, 23 pages.
Keiser et al., "Digital Telephony and Network Integration", 1995, Chapman Hall, Second Edition, pp. 426-428.
Kelly, Katy, "Up to their laptops in packed powder: Mountaintop office keeps skiers in touch," USA Today, Final Edition, News, pp. 1A, Feb. 21, 1997.
Lantz, Keith A., "Towards a universal directory service," Operating Systems Review, vol. 20, No. 2, Apr. 1986.
McConnell, Brian, "How to Build an Internet PBX", Pacific Telephony Design, printed from http://www.phonezone.com/ip-phone.htm Mar. 5, 1997.
Mills, M. (Jan. 23, 1996) "It's the Net's Best Thing to Being There: With Right Software, Computer Becomes Toll-Free Telephone", The Washington Post, sec. C, pp. 1,5.
Mimosa Systems: Mimosa Architecture Internet, [Online] Oct. 29, 2004, 3 pages, XP002519438 Retrieved from the Internet: URL:http://web.archive.org/web/20041029172122/www.mimosasystems.com/arch.htm> [retrieved on Mar. 11, 2009].
Moy, J., "OSPF Version 2," Network Working Group, Proteon, Inc., Jul. 1991.
National Technical Information Service, Wideband Integrated Voice/Data Technology, ADA132284, Mar. 31, 1983, Massachusetts Inst. of Tech., Lexington, Lincoln Lab.
Non-Final Office Action—U.S. Appl. No. 90/012,855—Mailing Date: Dec. 23, 2013.
Final Office Action—U.S. Appl. No. 13/543,284—Mailing Date: Oct. 1, 2014.

* cited by examiner

METHOD FOR ACCESSING SERVICE RESOURCE ITEMS THAT ARE FOR USE IN A TELECOMMUNICATIONS SYSTEM

FIELD OF THE INVENTION

The present invention relates to a method of accessing service resource items that are intended to be used in setting up bearer channels through a switched telecommunications system.

As used herein, the term "switched telecommunication system" means a system comprising a bearer network with switches for setting up a bearer channel through the network. The term "switched telecommunication system" is to be taken to include not only the existing public and private telephone systems (whether using analogue phones or ISDN-based), but also broadband (ATM) and other switch-based bearer networks that are currently being implemented or may emerge in the future. For convenience, the term "switched telecommunication system" is sometimes shortened herein to telecommunication system.

Reference to a "call" in the context of a switched telecommunication system is to be understood as meaning a communication through a bearer channel set up across the bearer network, whilst references to call setup, maintenance and takedown are to be taken to mean the processes of setting up, maintaining and taking down a bearer channel through the bearer network. Terms such as "call processing" and "call handling" are to be similarly interpreted.

The term "communication system" when used herein should be understood as having a broader meaning than switched telecommunication system, and is intended to include datagram-based communication systems where each data packet is independently routed through a bearer network without following a predetermined bearer channel.

BACKGROUND OF THE INVENTION

Telecommunication companies running PSTNs (Public Switched Telephone Networks) and PLMNs (Public Land Mobile Networks) are in the business of providing communication services and in doing so are providing increasing built-in intelligence in the form of "IN services" such as 800 number services and call forwarding. In contrast, the World Wide Web (WWW), which has seen explosive growth in recent times, is an example of an Internet-based global network providing complex information services. These two worlds, that of the large communications utilities and that of the highly dynamic, pioneer-spirit WWW information culture, are uneasy companions and each plans to encroach on the domain previously occupied by the others; thus telephony services will be offered over the WWW and information services over the public communication infrastructure.

The present invention proposes technologies for a more synergetic relationship between these two worlds than is currently envisaged and in order to place the present invention in context, a review will first be given of each of these two worlds.

Telephone Networks with IN Services

The Basic PSTN. The basic service provided by a PSTN (Public Switched Telephone Network) is the interconnection of two telephones (that is, setting up a bearer channel between the telephones) according to a called-party telephone number input at the calling-party telephone. FIG. 1 is a simplified representation of a PSTN providing such a service. In particular, customer premises equipment, CPE, 10 (such as standard analogue telephones, but also more recently ISDN terminals) are connected through an access network 11 to switching points, SPs 12. The SPs 12 form nodes in an interexchange network 13 made up of interconnecting trunks 14 and SPs that are controlled by control entities 15 in the SPs. The control effected by the control entities 15 is determined by signalling inputs received from the CPEs and other SPs, and involves call setup, maintenance and clearance to provide the desired bearer channel between calling CPE and called CPE. Conceptually, the PSTN may be thought of as a bearer network and a control (signalling) network, the function of the latter being to effect call control through the bearer network, namely the control of setup, maintenance and take down of bearer channels through the bearer network; in practice, the bearer and signalling networks may use the same physical circuits and even the same logical channels.

Thus, where the CPE is a traditional dumb telephone, control signalling between the CPE and its local SP is in-band signalling, that is, the signalling is carried on the same channel as used for voice; this signalling is interpreted and converted at the SPs 12 into signalling between SPs that uses a dedicated common-channel signalling network 16 (implemented nowadays using the SS7 protocol suite). Where the CPE is an ISDN terminal, signalling is carried in a separate channel directly from the CPE on an end-to-end. Modern SPs use the ISUP (ISDN User Part) SS7 protocol for inter-exchange call control signalling whether the CPE is a standard telephone or an ISDN terminal.

Telephone Numbering Plans—As certain aspects of the present invention are influenced by the structuring of telephone numbers, a brief description will now be given of the structuring of such numbers. Telephone numbers form an international, hierarchical addressing scheme based on groups of decimal digits. The top level of the hierarchy is administered by the ITU-T, which has allocated single-digit numeric codes to the major geographic zones (for example "1" for North America, "2" for Africa, "3" for Europe, "4" for Europe, "5" for South America and Cuba, etc.). Within each zone countries are assigned 2 or 3 digit codes, so that within zone 3 France is "33", and within zone 4 the UK is "44". Administration of the numbering plan within a country is delegated to a national body, such as the Office of Telecommunications ("Oftel") in the UK. The following further description is based on the UK numbering plan, but the scheme described will be recognised as having widespread applicability.

In the UK all national numbers are prefixed by a code from 01 to 09 (the '0' prefix is dropped in international dialling). The currently assigned codes are "01" for Geographic Area Codes, "02" for Additional Geographic Area Codes, "04" for Mobile Services, "07" for Personal Numbers, and "08" for Special Service (freephone, information). Normal wireline PSTN subscriber telephone numbers are allocated from the Geographic Area Code codes, and currently only codes prefixed by 01 are allocated. Geographic area codes are presently 3 or 4 digits (excluding the leading '0') and there are currently 638 geographic areas each with its own code. A full national UK dialled number takes two forms:

| 0 | 171 | 634 8700 |
|---|---|---|
|   | area code | local number (7 digit) |
| 0 | 1447 | 456 987 |
|   | area code | local number (6 digit) |

The first case has the '0' prefix, a 3 digit area code and a 7 digit local number, and the second case has the '0' prefix, a 4 digit area code, and a 6 digit local number. Further interpretation of the local number will take place within the area exchange, as even a 6 digit address space is too large for a single switch, and for a typical local area several switches may be needed to host the required number of subscriber lines. This interpretation is opaque and is a matter for the area service provider.

In the current PSTN the inherently hierarchical and geographic interpretation of telephone numbers is mirrored by the physical architecture of the network. A telephone number is structured in a way that makes it easy to route a call through the network. At each step, the prefix of the number provides information about the current routing step, and the suffix (perhaps opaquely) provides information about subsequent routing steps; as long as a switch knows how to parse a prefix and carry out a routing step, it does not need to understand the content of the suffix, which is left for subsequent routing steps. For this reason the international and national switching fabric is also organised hierarchically.

Intelligent Networks. Returning now to a consideration of the current telephone network infrastructure, in addition to basic call handling, an SP may also serve to provide what are called IN (Intelligent Network) services; in this case the SP is termed a service switching point, SSP. An SSP 25 is arranged to suspend call processing at defined points-in-call upon particular criteria being met, and to delegate the continuation of call processing to a service control subsystem providing a service control function (SCF) either in the form of a service control point, SCP 17 (see FIG. 2) or an Adjunct 18. The Adjunct 18 is directly associated with an SSP 25 whilst the SCP 17 and SSP 25 communicate with each other via an extended common channel signalling (CCS) network 16 that may include signal transfer points (STP) 19. The SCP 17 may be associated with more than one SSP 25. Both the SCP 17 and Adjunct 18 provide a service logic execution environment (SLEE) 20 in which instances of one or more service logic programs (SLP) 21 can execute. The SLEE 20 and SLP 21 together provide service control functionality for providing services to the SSP 25.

Service logic running in an SCP or Adjunct will generally make use of subscriber information stored in a service data function (SDF) 22 that may be integral with the SCP/Adjunct or partially or wholly separate therefrom. The service data function (SDF), like the service control function (SCF) forms part of the service control subsystem of the PSTN. It may be noted that some or all of the service control function may be built into the PSTN switches themselves.

In addition to the SCP 17 and Adjunct 18, the FIG. 2 network includes an intelligent peripheral (IP) 23. The IP 23 provides resources to the SSP 25 such as voice announcements and DTMF digit collection capabilities. The network will also include an operation system (not shown) that has a general view of the network and its services and performs functions such as network monitoring and control.

In operation, when the SSP 25 receives a call, it examines internal trigger conditions and, possibly, user information (eg dialled digits) to ascertain if the call requires a service to be provided by the service control subsystem 17, 18; the checking of trigger conditions may be carried out at several different points in call processing. Where the SSP 25 determines that a service is required it messages the service control subsystem (either SCP 17 or Adjunct 18) requesting the desired service and sending it a logic representation of the call in terms of its connectivity and call processing status. The service control subsystem then provides the requested service and this may involve either a single interaction between the SSP and service control subsystem or a session of interactions. A typical service is call forwarding which is a called-party service giving expression to an end-user requirement as simple as "if you call me on number X and it rings ten times, try calling number Y". In this case, it is the SSP local to the called end-user that triggers its associated SCP (or Adjunct) to provide this service; it will, of course, be appreciated that the SSP must be primed to know that the service is to be provided for a called number X.

The above-described model for the provision of IN services in a PSTN can also be mapped onto PLMNs (Public Land Mobile Networks) such as GSM and other mobile networks. Control signalling in the case of a mobile subscriber is more complex because in addition to all the usual signalling requirements, there is also a need to establish where a call to a mobile subscriber should be routed; however, this is not a very different problem from a number of called-party IN services in the PSTN. Thus in GSM, the service-data function (SDF) is largely located in a system named a Home Location Register (HLR) and the service control function in a system named a Visitor Location Register (VLR) that is generally associated on a one-to-one basis with each SSP (which in GSM terminology is called a Mobile Switching Centre, MSC).

Because subscribers are mobile, the subscriber profile is transported from the HLR to whichever VLR happens to be functionally closest to be mobile subscriber, and from there the VLR operates the (fixed) service using the subscriber profile and interacts with the SSP. The HLR and VLR thus constitute a service control subsystem similar to an SCP or Adjunct with their associated databases.

It is, of course, also possible to provide IN services in private telephone systems and, in this case, the service control function and service data function are generally either integrated into a PABX (Private Automatic Branch Exchange) or provided by a local computer. The service control subsystem, whilst present, may thus not be physically distinct from the PABX.

The above-described general architectural framework for providing IN services has both strengths and flaws. Its main strength is that it works and many services have been successfully deployed, such as 800 number services, credit card calling, voicemail, and various call waiting and redirection services. However, despite years of standardisation, services are still implemented one-at-a-time on proprietary platforms and do not scale well. The approach has been based on large, fault-tolerant systems which provide services for hundreds of thousands or even millions of subscribers and take years to deploy. Furthermore, since the networks used to support these services also constitute the basic telephone infrastructure, anything attached to these networks must be rigorously vetted. Additionally, each country and operator tends to have local variations of the so-called standards making it difficult to supply standard products and thereby braking the dynamics of competition.

The World Wide Web

In contrast to the slow deliberate progress of the telephone infrastructure, the WWW has grown explosively from its inception in 1989 to become the primary electronic information distribution service in terms of spread, availability and richness of information content. Anyone can, for a modest outlay, become an information provider with a world-wide audience in a highly interconnected information architecture.

The WWW is a client-server application running over the Internet and using a client-server protocol which mandates only the simplest of exchanges between client and server. This protocol is HTTP (Hyper Text Transfer Protocol) which is optimised for use over TCP/IP networks such as the Internet; the HTTP protocol can, however, also be used over networks using different communication protocol stacks.

Since the availability of literature concerning the WWW has seen the same sort of growth as the WWW itself, a detailed description of the WWW, HTTP and the Internet will not be given herein. An outline description will, however, be given with attention being paid to certain features of relevance to the present invention.

The WWW uses the Internet for interconnectivity. Internet is a system that connects together networks on a worldwide basis. Internet is based on the TCP/IP protocol suite and provides connectivity to networks that also use TCP/IP. For an entity to have a presence on the Internet, it needs both access to a network connected to the Internet and an IP address. IP addresses are hierarchically structured. Generally an entity will be identified at the user level by a name that can be resolved into the corresponding IP address by the Domain Name System (DNS) of the Internet. Because the DNS or adaptions of it are fundamental to at least certain embodiments of the invention described hereinafter, a description will next be given of the general form and operation of the DNS.

The Domain Name System—The DNS is a global, distributed, database, and without its performance, resilience and scalability much of the Internet would not exist in its current form. The DNS, in response to a client request, serves to associate an Internet host domain name with one or more Registration Records (RR) of differing types, the most common being an address (A) record (such as 15.144.8.69) and mail exchanger (MX) records (used to identify a domain host configured to accept electronic mail for a domain). The RRs are distributed across DNS name servers world-wide, these servers cooperating to provide the domain name translation service; no single DNS server contains more than a small part of the global database, but each server knows how to locate DNS servers which are "closer" to the data than it is. For present purposes, the main characteristics of the DNS of interest are:

The host name space is organised as a tree-structured hierarchy of nodes with each host having a corresponding leaf node; each node has a label (except the root node) and each label begins with an alphabetic character and is followed by a sequence of alphabetic characters or digits. The full, or "fully qualified" name of a host is the string of node labels, each separated by a ".", from the corresponding leaf node to the root node of the hierarchy, this latter being represented by a terminating "." in the name. Thus a host machine "fred" of Hewlett-Packard Laboratories in Bristol, England will have a fully qualified domain name of "fred.hpl.hp.com." (note that if a host name does not have a terminal "." it is interpreted relative to the current node of the naming hierarchy).

Each host has one or more associated Registration Records (RRs).

There are a plurality of DNS servers each with responsibility for a subtree of the name space. A DNS server will hold RRs for all or part of its subtree—in the latter case it delegates responsibility for the remainder of the subtree to one or more further DNS servers. A DNS server knows the address of any server to which it has delegated responsibility and also the address of the server which has given it the responsibility for the subtree it manages. The DNS servers thus point to each other in a structure reflecting that of the naming hierarchy.

An application wishing to make use of the DNS does so through an associated "resolver" that knows the address of at least one DNS server. When a DNS server is asked by this resolver for an RR of a specified host, it will return either the requested RR or the address of a DNS server closer to the server holding the RR in terms of traversal of the naming hierarchy. In effect, the hierarchy of the servers is ascended until a server is reached that also has responsibility for the domain name to be resolved; thereafter, the DNS server hierarchy is descended down to the server holding the RR for the domain name to be resolved.

The DNS uses a predetermined message format (in fact, it is the same for query and response) and uses the IP protocols.

These characteristics of the DNS may be considered as defining a "DNS-type" system always allowing for minor variations such as in label syntax, how the labels are combined (ordering, separators), the message format details, evolutions of the IP protocols etc.

Due to the hierarchical naming structure, it is possible to delegate responsibility for administering domains (subtrees) of the name space recursively. Thus, the top-level domains are administered by InterNic (these top-level domains include the familiar 'com', 'edu', 'org', 'int', 'net', 'mil' domains as well as top-level country domains specified by standard two-letter codes such as 'us', 'uk', 'fr' etc.). At the next level, by way of example Hewlett-Packard Company is responsible for all names ending in 'hp.com' and British Universities are collectively responsible for all names ending in 'ac.uk'. Descending further, and again by way of example, administration of the domain 'hpl.hp.com' is the responsibility of Hewlett-Packard Laboratories and administration of the subtree (domain) 'newcastle.ac.uk' is the responsibility of the University of Newcastle-upon-Tyne.

FIG. 3 illustrates the progress of an example query made from within Hewlett-Packard Laboratories. The host domain name to be resolved is 'xy.newcastle.ac.uk', a hypothetical machine at the University of Newcastle, United Kingdom. The query is presented to the DNS server responsible for the "hpl.hp.com" subtree. This server does not hold the requested RR and so responds with the address of the "hp.com" DNS server; this server is then queried and responds with the address of the 'com' DNS server which in turn responds with the address of the '.' (root) DNS server. The query then proceeds iteratively down the 'uk' branch until the 'newcastle.ac.uk' server responds with the RR record for the name 'xy' in its subtree.

This looks extremely inefficient, but DNS servers are designed to build a dynamic cache, and are initialized with the addresses of several root servers, so in practice most of the iterative queries never take place. In this case the 'hpl.hp.com' DNS server will know the addresses of several root servers, and will likely have the addresses of 'uk' and 'ac.uk' servers in its cache. The first query to the 'hpl.hp.com' server will return the address of the 'ac.uk' server. The second query to the 'ac.uk' server will return the address of the 'newcastle.ac.uk' server, and the third query will return the RR in question. Any future queries with a 'newcastle.ac.uk' prefix will go direct to the newcastle DNS server as that address will be retained in the "hpl.hp.com" DNS server cache. In practice names within a local subtree are resolved in a single query, and names outside the local subtree are resolved in two or three queries.

Rather than a resolver being responsible for carrying out the series of query iterations required to resolve a domain name, the resolver may specify its first query to be recursive in which case the receiving DNS server is responsible for resolving the query (if it cannot directly return the requested RR, it will itself issue a recursive query to a 'closer' DNS server, and so on).

It should also be noted that in practice each DNS server will be replicated, that is, organised as a primary and one or more secondaries. A primary DNS nameserver initializes itself from a database maintained on a local file system, while a secondary initializes itself by transferring information from a primary. A subtree will normally have one primary nameserver and anything up to ten secondaries—the limitation tends to be the time required by the secondaries to update their databases from the primary. The primary database is the master source of subtree information and is maintained by the domain DNS administrator. The secondaries are not simply standby secondaries but each actively participates in the DNS with dependent servers that point to it rather than to the corresponding primary.

DNS implementations, such as BIND, are widely available as a standard part of most UNIX systems, and can claim to be among the most robust and widely used distributed applications in existence.

Operation of the WWW Referring now to FIG. 4 of the accompanying drawings, access to the Internet 30 may be by direct connection to a network that is itself directly or indirectly connected to the Internet; such an arrangement is represented by terminal 31 in FIG. 4 (this terminal may, for example, be a Unix workstation or a PC). Having a connection to the Internet of this form is known as having 'network access'. Any entity that has network access to the Internet may act as a server on the Internet provided it has sufficient associated functionality; in FIG. 4, entity 32 with file store 37 acts as a server.

Many users of the WWW do not have network access to the Internet but instead access the Internet via an Internet service provider, ISP, 33 that does have network access. In this case, the user terminal 34 will generally communicate with the ISP 33 over the public telephone system using a modem and employing either SLIP (Serial Line Interface Protocol) or PPP (Point-to-Point Protocol). These protocols allow Internet packets to traverse ordinary telephone lines. Access to the Internet of this form is known as "dialup IP" access. With this access method, the user terminal 34 is temporarily allocated an IP address during each user session; however, since this IP address may differ between sessions, it is not practical for the entity 34 to act as a server.

A cornerstone of the WWW is its ability to address particular information resources by means of an Uniform Resource Identifier (URI) that will generally be either a Uniform Resource Locator (URL) that identifies a resource by location, or a Uniform Resource Name (URN) that can be resolved into an URL. By way of example, a full or "absolute" URL will comprise the following elements:

| | |
|---|---|
| scheme | this is the access scheme to be used to access the resource of interest; |
| host | the Internet host domain name or IP address; |
| port | the host port for the (TCP) connection; |
| abs-path | the absolute path of the resource on the host. |

In fact, the 'port' may be omitted in which case port 80 is assumed.

FIG. 5 of the accompanying drawings shows an example URL for the Hewlett-Packard products welcome page. In this case, the elements are:

| | |
|---|---|
| scheme | http |
| host | www.hp.com |
| port | omitted (port 80 assumed) |
| abs-path | Products.html |

The HTTP protocol is based on a request/response paradigm. Referring again to FIG. 4 of the drawings, given a particular URI identifying a resource 30 to be accessed, a client establishes a connection with the server 31 corresponding to the "host" element of the URI and sends a request to the server. This request includes a request method, and the "Request-URI" (which is generally just the absolute path of the resource on the server as identified by the "abs-path" element of the URI); the request may include additional data elements. The server 31 then accesses the resource 36 (here held on storage 37) and responds and this response may include an entity of a type identified by a MIME (Multipurpose Internet Mail Extensions) type also included in the response.

The two main request methods are:

GET—This method results in the retrieval of whatever information (in the form of an entity) is identified by the Request-URI. It is important to note that if the Request-URI refers to a data-producing process, it is the produced data which is returned as the entity in the response and not the source text of the process.

POST—This method is used to request that the destination server accept the entity enclosed in the request as a new subordinate of the resource identified by the Request-URI. The POST method can be used for annotation of existing resources, providing a message to a bulletin board, providing data to a data-handling process (for example, data produced as the result of submitting a form), and extending a database through an append operation.

In summary, the GET method can be used to directly retrieve data, or to trigger any process that will return an entity (which may either be data or a simply an indication of the result of running the process). The POST method is used for registering data and specifying this method is also effective to trigger a process in the server to handle the posted data appropriately.

The passing of information to a process triggered to run on a server using either the GET or POST method is currently done according to an interface called the Common Gateway Interface (CGI). The receiving process is often written in a scripting language though this is not essential. Typically, the triggered server script is used for interfacing to a database to service a query included in a GET request. Another use, already referred to, is to append data associated with a POST request to a database.

Other important factors in the success of the WWW is the use of the HyperText Markup Language (HTML) for representing the makeup of documents transferred over the WWW, and the availability of powerful graphical Web browsers, such as Netscape and Mosaic, for interpreting such documents in a client terminal to present them to a user. Basically, HTML is used to identify each part of a document, such as a title, or a graphic, and it is then up to the browser running in the client terminal to decide how to display each document part. However, HTML is more than this—it also enables a URI and a request method to be associated with any element of a document (such as a particular word or an image) so that when a user points to and clicks on that element, the resource identified by the URI is accessed according to the scheme (protocol) and request method specified. This arrangement provides a hyperlink from one document to another. Using such hyperlinks, a user at a client terminal can skip effortlessly from one document downloaded from a server on one side of the world, to another document located on a server on the other side of the world. Since a document created by one author may include a hyperlink to a document created by another, an extremely powerful document cross-referring system results with no central bureaucratic control.

Hyperlinks are not the only intelligence that can be built into an HTML document. Another powerful feature is the ability to fill in a downloaded "Form" document on screen and then activate a 'commit' graphical button in order to have the entered information passed to a resource (such as a database) designed to collect such information. This is achieved by associating the POST request method with the 'commit' button together with the URI of the database resource; activating the 'commit' button results in the entered information being posted to the identified resource where it is appropriately handled.

Another powerful possibility is the association of program code (generally scripts to be interpreted) with particular documents elements, such as graphical buttons, this code being executed upon the button being activated. This opens up the possibility of users downloading program code from a resource and then running the code.

It will be appreciated by persons skilled in the art that HTML is only one of several currently available scripting languages delivering the functionality outlined above and it may be expected that any serious Web browser will have built-in support for multiple scripting languages. For example, Netscape 2.0 supports HTML 3.0, Java and LiveScript (the latter being Netscape proprietary scripting Language).

The importance of the role of the graphical Web browser itself should not be overlooked. As well as the ability to support multiple scripting languages, a Web browser should provide built-in support for standard media types, and the ability to load and execute programs in the client, amongst other features. These browsers may be viewed as operating systems for WWW interaction.

WWW and the Telephone Network

It is possible to provide a telephony service over the Internet between connected terminals by digitizing voice input and sending it over the Internet in discrete packets for reassembly at the receiving terminal. This is an example of a communication service on the Internet. Conversely, it is possible to point to a variety of information services provided over the telephone system, such as the Minitel system widely available in France. However, these encroachments into each anothers traditional territories pose no real threat to either the Internet or the public telephone system.

Of more interest are areas of cooperative use of the Internet and the telephone system. In fact, one such area has existed for some considerable time and has been outlined above with reference to FIG. 4, namely the use of a modem link over the PSTN from a user computer 34 to an Internet service provider 33 in order to obtain dialup IP access to the Internet. This cooperative use is of a very simple nature, namely the setting up of a bearer channel over the PSTN for subsequently generated Internet traffic; there is no true interaction between the Internet and the PSTN.

Another known example of the cooperative use of the Internet and PSTN is a recently launched service by which an Internet user with a sound card in his/her terminal computer can make a voice call to a standard telephone anywhere in the world. This is achieved by transferring digitised voice over the Internet to a service provider near the destination telephone; this service provider then connects into the local PSTN to access the desired phone and transfers across into the local PSTN the voice traffic received over the Internet. Voice input from the called telephone is handled in the reverse manner. Key to this service is the ability to identify the service provider local (in telephony charging terms) to the destination phone. This arrangement, whilst offering the prospect of competition for the telecom operators for long distance calls, is again a simple chaining together of the Internet and PSTN. It may, however, be noted that in this case it is necessary to provide at least a minimum of feedback to the Internet calling party on the progress of call set to the destination telephone over the PSTN local to that telephone; this feedback need only be in terms of whether or not the call has succeeded.

From the foregoing it can be seen that the current cooperative use of the Internet and telephone system is at a very simple level.

It is an object of the present invention to provide a method of accessing a service resource item over a communications network that facilitates the integration of the PSTN and the WWW.

SUMMARY OF THE INVENTION

According to the present invention, there is provided a method of accessing service resource items for use in respect of setting up bearer channels through a switched telecommunications system, the method including the steps of:

(a)—provisioning at least one server connected to a computer network with a plurality of service resource items that are thereafter locatable on said computer network by corresponding known URIs, said computer network being logically distinct from the telecommunications system, and said service resource items relating to setup control for bearer channels through said telecommunications system with each said service resource item being associated with a respective predetermined code, said predetermined codes being distinct from said URIs and identifying end-point entities for said bearer channels;

(b)—providing a mapping between each said predetermined code and the said known URI of the service resource item associated with that predetermined code; and (c)—utilising a said predetermined code to access a corresponding said service resource item by using said mapping to determine the URI corresponding to that resource item and then using this URI to access the service resource item over said computer network.

In one embodiment, at least some of the URIs are derivable from their corresponding said predetermined codes by manipulation according to a function specified by said mapping. In another embodiment, at least some of the URIs are derivable from their corresponding said predetermined codes by look up in an association table associating said predetermined codes and URIs according to said mapping. This association table can advantageously be held on at least one database server connected to the computer network, step (c) involving accessing the database server over the computer network to determine the URI corresponding to the said predetermined code. Preferably, the said at least one database server is provided by a DNS-type distributed database system in which the URIs are held in records associated with respective names, herein referred to as domain names, by which the records can be retrieved. In this case, step (c) involves translating said predetermined code into a corresponding domain name and using this domain name to retrieve the URI of the required service resource item from the DNS-type distributed database system.

More than one service resource item can be located at the same URI; in this case, the predetermined codes of these service resource items will include respective relative-resource-identifier values that can be used at the server holding the service resource items to identify the required resource item amongst the service resource items at the same URI.

The telecommunications system may be a telephone system with each said predetermined code being either the telephone number of the calling party or the telephone number of the called party (these numbers may either be the numbers of specific telephones, or personal numbers). In one preferred embodiment where at least some of said predetermined codes are called-party telephone numbers, the corresponding service resource items are the current telephone numbers of the called parties.

Generally as regards the nature of the service resources, these may be of the following type:

service logic intended to be executed by the corresponding server upon being accessed with the result of this execution being returned to the accessing entity;

downloadable service data which upon being accessed is intended to be downloaded to the accessing entity;

downloadable service logic which upon being accessed is intended to be downloaded to the accessing entity for execution thereby.

Preferably, where URIs are referred to in the foregoing, these URIs are URLs and/or URNs. Furthermore, the servers referred to are preferably HTTP servers.

It is to be understood that reference in the foregoing to the computer network being logically distinct from the telecommunications system is not to be taken to imply that there is physical separation of the two—indeed, there will frequently be joint use of the same physical infrastructure. Furthermore, not only may bearer channels set up in the telecommunications system share the same transmission medium as the computer network, but such a bearer channel may act as a pipe for traffic across the computer network. The intention of requiring the computer network to be logically distinct from the telecommunications system is to exclude computer networks that are dedicated to the management or monitoring of the bearer network and effectively form part of the telecommunications system itself.

Preferably, the computer network is generally accessible to users of the telecommunications system as this provides a number of benefits to users that will become apparent hereinafter. The phrase "generally accessible" should not be construed as meaning that all users of the telecommunications system have such access to the computer network or can get such access but, rather, it should be understood as meaning that a significant proportion of these users have or can obtain access to the computer network.

By way of example, in one preferred embodiment of the invention, the computer network generally accessible to users of the telecommunications system but logically distinct from it, is the Internet and the telecommunications system is a public telephone system. In another embodiment, the telecommunication system is a private system including a PABX, and the computer network is a LAN.

BRIEF DESCRIPTION OF THE DRAWINGS

Embodiments of the present invention will now be described, by way of non-limiting example, with reference to the accompanying diagrammatic drawings, in which.

BEST MODE OF CARRYING OUT THE INVENTION

Figure 6:
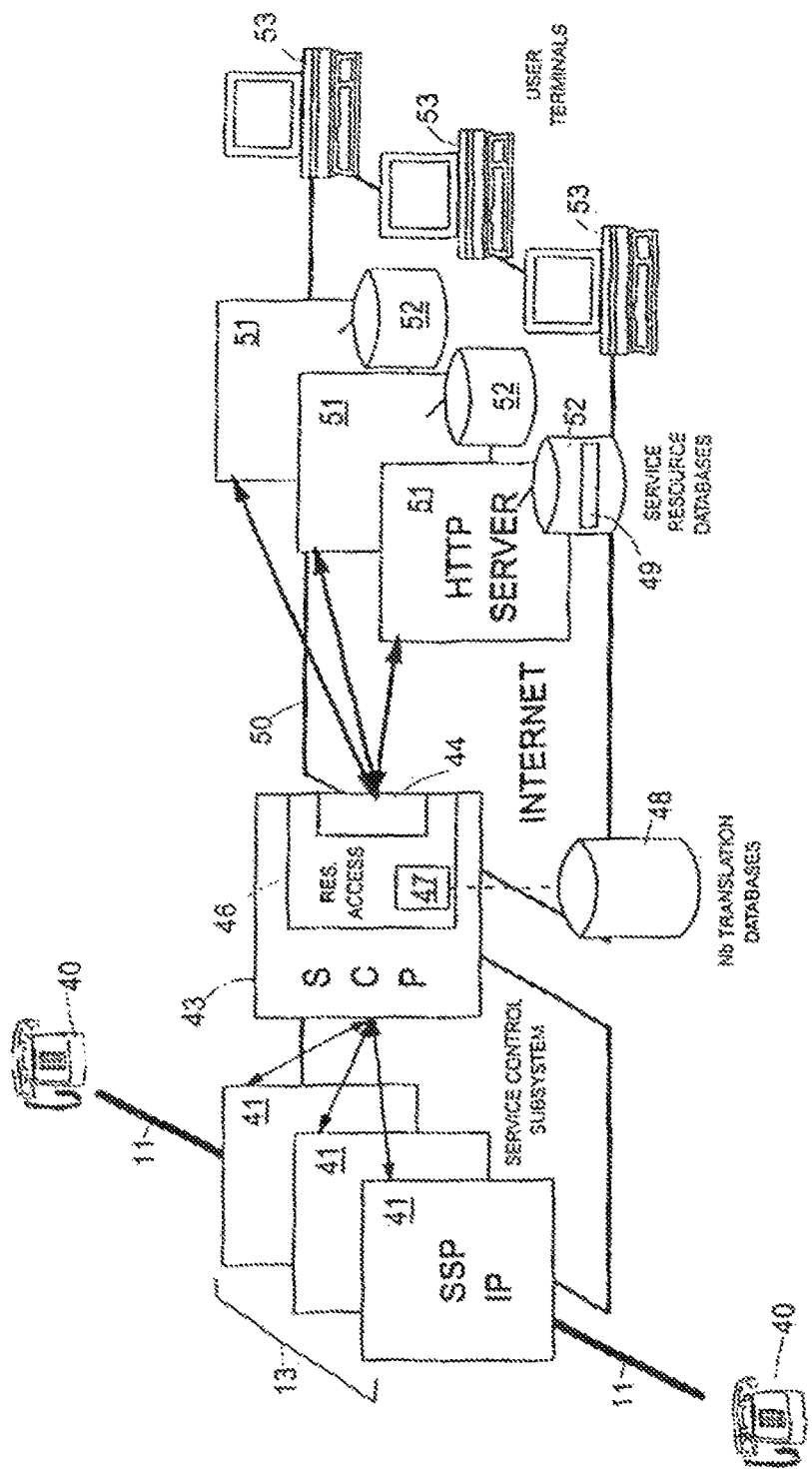
FIG. 6 is a diagram of a first arrangement in which service resource items are held on HTTP servers accessible both by the service control subsystem of a PSTN and by Web users.

FIG. 6 illustrates an arrangement for the provision of services in a PSTN conventionally comprising an inter-exchange network 13 (including trunks and switches at least some of which are SSPs 41 with associated IPs), an access network 11 connecting customer premise equipment (here shown as telephones 40) to the network 13, and a service control subsystem 42 including at least one SCP for providing services to the SSPs 41 upon request. It will be appreciated that the FIG. 6 representation of a PSTN is highly diagrammatic.

The SCP 43 may operate in a conventional manner responding to service requests from SSPs 41 to run specific service logic on particular data according to information contained in the service request, and to send back to the requesting SSP appropriate instructions for effecting call set up. A service request is generated by the SSP in response to predetermined trigger conditions being met at a trigger check point, there being one or more such check points in the course of handling a call (it may be noted that where the trigger conditions have been downloaded to the SSP from the SCP then it could be said that the SSP is responding to an information request by the SCP when contacting the SCP upon the trigger conditions being met—however, in the present specification, this initial communication from the SSP to the SCP will be referred to as a "service request").

The SCP 43 is also provided with a network access interface 44 to the Internet 50 in order to make use of certain service resource items 49 (also referred to below simply as "service resources") during the course of processing at least certain service requests from the SSPs 41. These service resources 49 are held as WWW pages on HTTP servers 51 (more particularly, on service resource databases 52 of these servers 51). The WWW pages containing these service resources are referred to below as "phone" pages. The servers 51 are connected to the Internet and the phone pages are read accessible using respective URLs or URNs (for convenience, the more general term URI will be used hereinafter to mean the Internet-resolvable indicator of the location of a phone page).

The service resources may be service logic or service data and may be used by an otherwise standard service logic program running on the SCP, by accessing the phone page of the required resource using the appropriate URI. In certain cases, the service resources 49 may provide substantially all of the service control and data associated with a particular service. In this case, the service logic program running in the SCP 43 is of skeleton form, being instantiated on receipt of a service request and then serving to initiate service resources access and to return the results of this access to the entity that made the service request. In fact, according to this approach, the SCP could be implemented simply as a platform for fetching and executing phone-page service logic and would not need to have the complex provisioning and management systems for such logic as is required by standard SCP platforms; SCPs could then become more ubiquitous, possibly being associated with every SSP.

Figure 7:
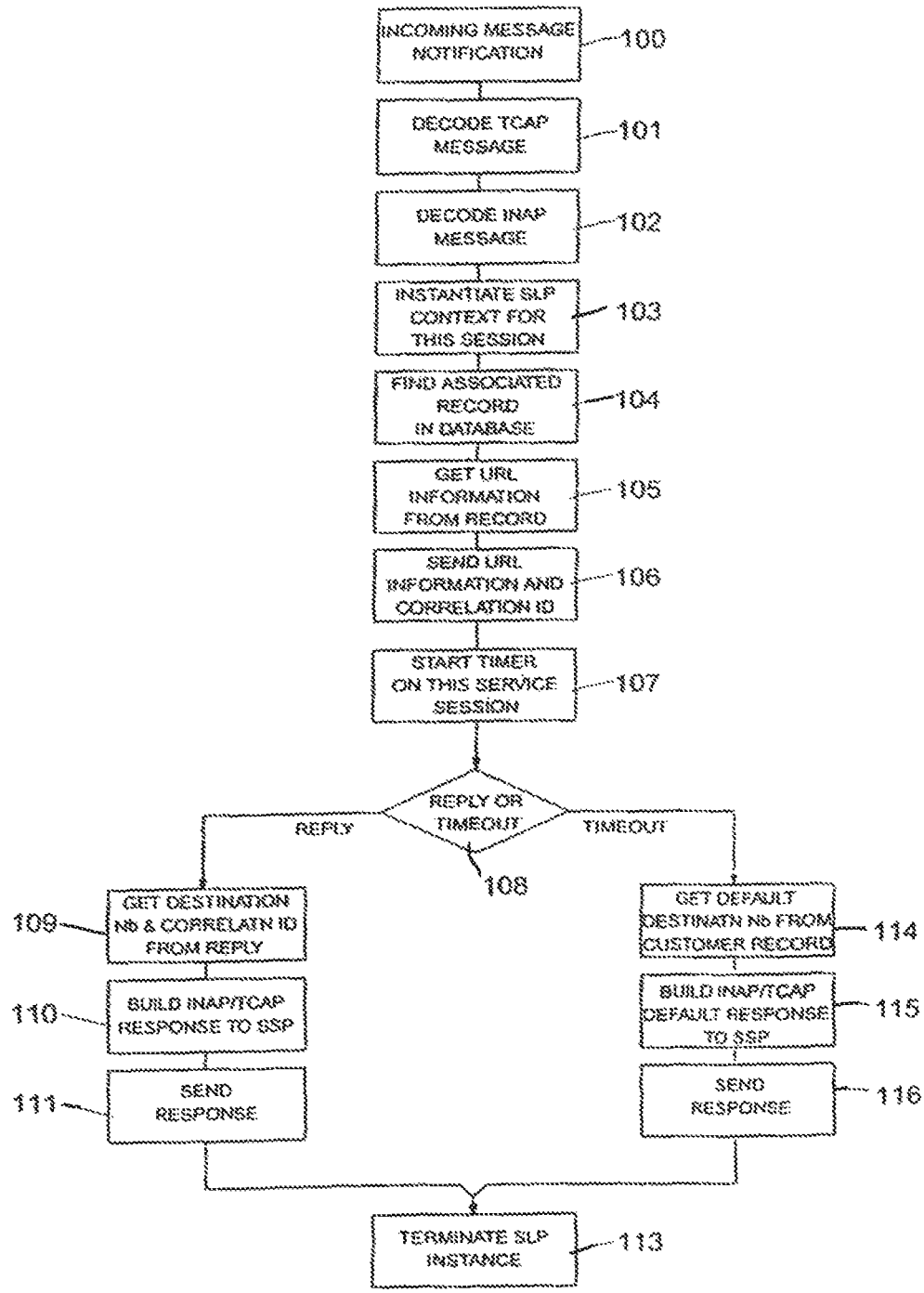
FIG. 7 is a diagram illustrating the processing of a service request by the SCP of FIG. 6.

FIG. 7 is a flow chart illustrating the progress of events in the case where the SCP 43 handles a service request by accessing a phone-page service resource. Upon receipt of a service request in an INAP message (step 100), SCP 43 decodes the TCAP/INAP message structure in standard manner (steps 101 and 102) well understood by persons skilled in the art. Next, SCP 43 instantiates a service logic program, SLP, to handle the request (step 103). This SLP is then responsible for looking up the URL of the required service resource as determined from information contained in the service request (steps 104, 105). For example, if the service request relates to a called-party service, then the required resource will be indicated by the dialled number and the latter will be used to derive the URL of the resource. Once the URL of the desired service resource has been ascertained, a resource request (for example, in the form of an HTTP request message) is sent over the Internet to the corresponding server holding the desired service resource (step 106); a correlation ID is also passed with the resource request to enable a response from the latter to be linked with the appropriate SLP instance. A timer is also started (step 107).

If a response is received from the accessed resource before the expiration of a time-out period (tested in step 108), then the response, which is usually in the form of a destination number, is supplied to the appropriate SLP as identified using the correlation ID passed with the response (step 109). An INAP/TCAP response message is then prepared and sent to the entity that made the original service request (steps 110 and 111) after which the SLP instance is terminated (113).

If in step 108, a time-out occurs before a response is received, then a default response value (generally a default destination number) may be looked up in the customer record and put in an INAP/TCAP message and sent back to the requesting entity (steps 114 to 116). The SLP instance is then terminated (113).

Locating & Accessing Service Resources

The functionality associated with accessing a phone-page resource is schematically represented in FIG. 6 by resource access block 46. Block 46 includes URI determination block 47 for determining the URI of the phone page containing the desired resource on the basis of parameters passed to block 46. Using the URI returned by block 47, the resource access block 46 then accesses the phone page of the required service resource 49 over the Internet through interface 44.

Resource Codes—It is possible that more than one service resource is associated with a particular telephone number; in this case the resource access block 46 will need to know additional information (such as current point-in-call, pic) to enable the appropriate service resource to be identified. If the service resources associated with a number are located on different phone pages, then the additional information is also passed to the URI determination block 47 to enable it to return the URI of the appropriate phone page. It is also possible for all the service resources associated with a number to be located on the same phone page. In this case, the resource access block 46 uses the additional information to pass a resource-identifying parameter with its access request to the phone page concerned; it is then up to the functionality associated with the phone page to access the correct service resource.

Figure 8:
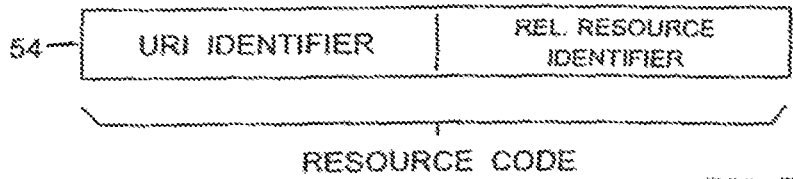
FIG. 8 is a diagram illustrating the format of a resource code used by the FIG. 6 SCP when accessing a service resource item.

Thus, each service resource can be considered as being identified by a respective resource code 54 (see FIG. 8) made up of a first part UI ("URI Identifier") used to identify the URI at which the resource is located on the Internet, and a second part RRI ("Relative Resource Identifier") used to identify the resource amongst plural resources at the same URI.

Figure 9:
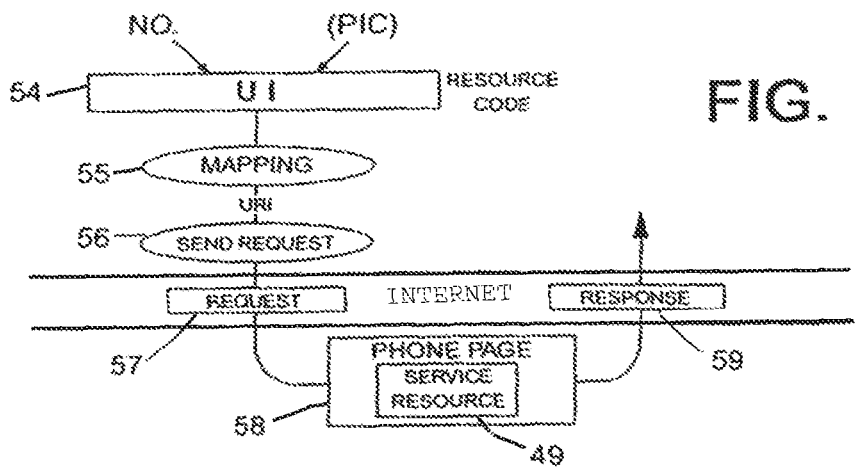
FIG. 9 is a diagram illustrating the process of accessing a service resource in the case where the service code does not include an RRI part.

Resource Access—Where only one service resource 49 is located on a phone page 58 identified by a unique URI, then the resource code 54 simply comprises the UI, generally either a telephone number alone or a telephone number plus a pic parameter (see FIG. 9). In this case, accessing a resource simply involves mapping the whole resource code 54 into the corresponding URI (process 55) and then sending a request 57 to the corresponding phone page 58, this latter itself constituting the desired service resource 49. The result of accessing resource 49 is then returned in response message 59.

In contrast, where multiple service resources 49 are located on the same phone page 58 (FIG. 10), the resource code 54 comprises both a UI and RRI, the UI generally being a telephone number and the RRI a pic or other parameter for distinguishing between the co-located resources. In this case, accessing a resource involves mapping the UI part of the resource code 54 into the corresponding URI (process 55) and then sending a request 57 to the corresponding phone page (process 56), the request including the RRI of the resource code. The phone page 58 includes functionality 64 for accessing the required resource on the basis of the RRI in the request message. The result of accessing the required resource 49 is then returned in response message 59.

Figure 10:
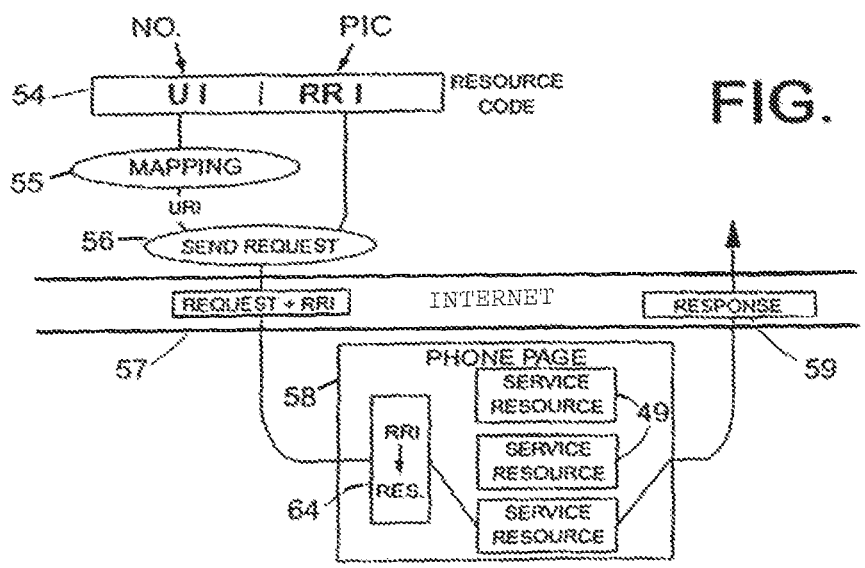
FIG. 10 is a diagram illustrating the process of accessing a service resource in the case where the service code includes an RRI part.

An alternative to the FIG. 10 method of accessing a service resource that is co-located with other resources on a phone page, would be to retrieve the whole page across the Internet simply using the URI derived from the UI part of the resource code, and then to extract the desired resource on the basis of the RRI.

URI Determination from Resource Code—The implementation of the URI determination block 47 that performs process 55 will next be considered. Block 47 may be implemented in a variety of ways, four of which are described below:

Direct Input

It would be possible, though not necessarily convenient, to arrange for the calling party to input directly the required URI. The calling party may thus input the host id component of the URI required (either in the form of a host domain name or host IP address) plus the path component of the URI. For example, in the case where the phone page of a called party is to be accessed, the calling party may input the URI of the called party and, indeed, this input may substitute for the normal input of a telephone number. A leading input string (for example "999") may be used to identify the input as an URI. As regards the input means, where a user only has a standard 12 key telephone, input of host domain names and other URI elements requiring alpha characters, will need to be done using one of the standard techniques for alpha input from a phonepad (such techniques are already used, for example, to enable a calling party to "spell" out the name of the called party). It would also be possible to provide users with a full alphanumeric keypad to facilitate URI input.

Computation

Service resource access over the Internet could be restricted to a set of dialled numbers from which it was possible to compute a corresponding URI; in this case, this computation would be the responsibility of block 47.

Association Table Lookup

Probably the simplest implementation for the block 47 is as an association table (either in memory or held on database disc store 48) associating a URI with the UI part of each resource code. A potential problem with this approach is that a service resource may be required for a called party number on the other side of the world which implies a rigorous update regime between PSTN operators worldwide in order to keep the association table up-to-date. (Note that the same implication is not necessarily applicable in respect of marking the called-party number as one required to trigger a service request, since the number may be arranged to be one of a group of numbers all triggering an appropriate service request, in a manner similar to 800 numbers).

DNS-Type Lookup

An alternative lookup solution is to use a hierarchically-structured distributed database system, similar to (or even part of) the Domain Name System (DNS) of the Internet, in order to resolve the UI part of a resource code to a corresponding URI. This approach, which will be described in more detail below, would typically involve databases maintained by each PSTN operator for its numbers with which URIs are associated. These databases would be accessible by all PSTNs through a network such as the Internet with resolution requests being pointed to the appropriate database in a manner similar to the Domain Name System. In this case, the block 47 is constituted by an appropriate resolution program arranged to request UI resolution over the Internet through interface 44.

Before describing a DNS-type lookup implementation for the URI determination block 47, some further general comments are appropriate. Whatever method is used to determine the URI, certain simplifications are possible if limited constraints are placed on the URIs permitted. In particular, it is not necessary to determine all components of an URI in the following cases:

(i) A part of the URI path component can be made standard for all service resources, this standard part being simply added by the block 47 once the rest of the URI has been determined. For example, where a roaming number is to be looked up, it may by convention always be held in a file "roam" in a subdirectory "tel" of a subscriber's directory on a particular server. In this case the URI host component and the subscriber-unique part of the path component are first determined and then the remaining path part "/tel/roam" is added.

(ii) The URI path component can be arranged to be the same as a predetermined part of the resource code, the block 47 needing only to determine the host component and then add the path. For example, it may be agreed that the path must always end with the telephone number concerned, or sufficient of the terminating digits to have a high probability of uniqueness on the host machine. The path may also include standard components to be added by block 47.

(iii) Blocks of telephone numbers may have their corresponding service resources located on the same host server so that it is only necessary to use a part of the telephone number to determine the host component of the URI; in this case, the path component can conveniently include all or part of each telephone number. This situation implies a tight degree of control by the telephone operators and does not offer the telephone user the freedom to choose the host server on which user places their phone page.

Another general point worthy of note is that however the URI is determined, the host component of the URI may be provided either in the form of a host domain name or a host IP address. Where the host is identified by a domain name, then a further resolution of URI host name to IP address will subsequently be carried out in standard manner by interface 44 using the Domain Name System of the Internet. This further resolution can be avoided if the host identity is directly provided as an IP address.

Where a database lookup is used to provide the number to URI translation, this database may be independent of, or combined with, a customer database containing other customer-related information. Factors affecting this choice include, on the one hand, the possible desirability of having the number-to-UI translation information widely available, and on the other hand, the possible desirability of restricting access to other customer-related information.

DNS-Type URI Lookup

A DNS-type lookup implementation for the URI determination block 47 will now be described in some detail for the case where the UI part of the resource code is a telephone number and there are no constraints on the URI, thereby requiring both the full host and path components of the URI to be returned by the lookup. A key part of the overall process is the formation of the equivalent of a host domain name from the telephone number of interest; this domain-name equivalent is then resolved into a corresponding URI by a lookup mechanism which in the present example is identical to that employed by the DNS (indeed, the lookup mechanism may be incorporated into the DNS though it can also be independently implemented).

Figure 1:
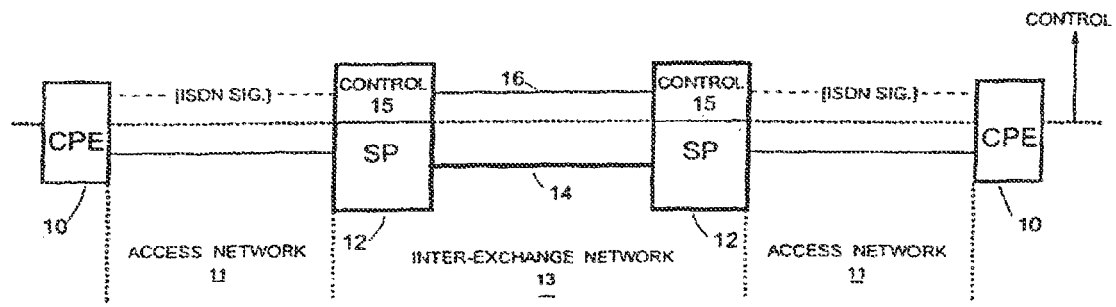
FIG. 1 is a simplified diagram of a standard PSTN.
Figure 2:
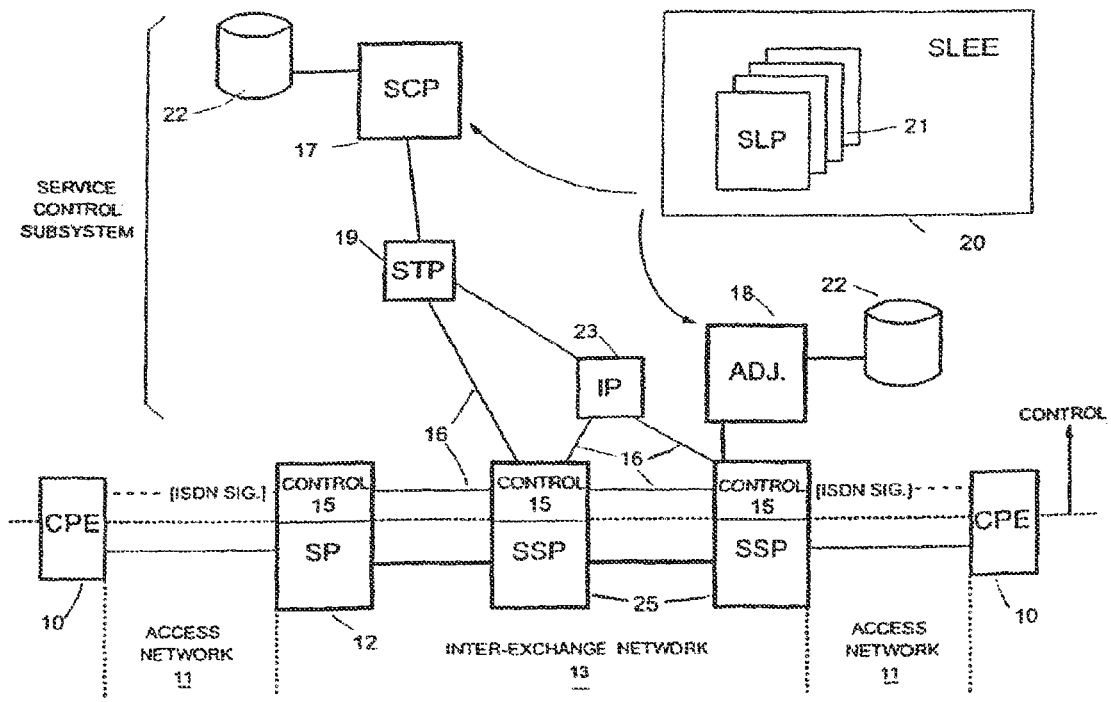
FIG. 2 is a simplified diagram of a known PSTN with IN service capability.
Figure 3:
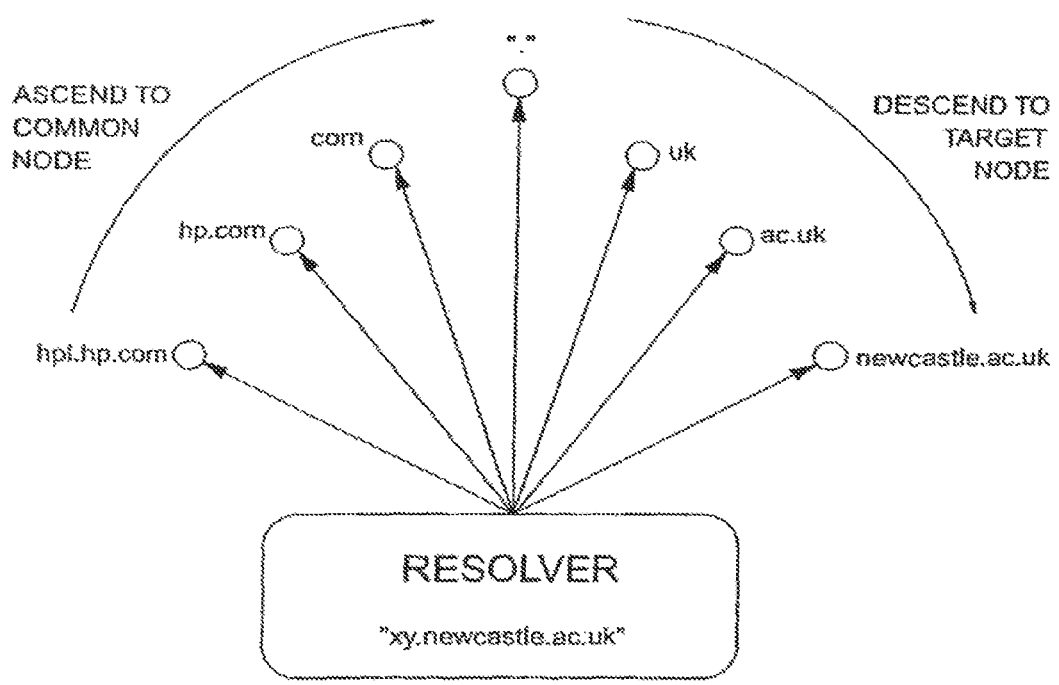
FIG. 3 is a diagram illustrating host domain name resolution by the DNS of the Internet.
Figures 4, 5:
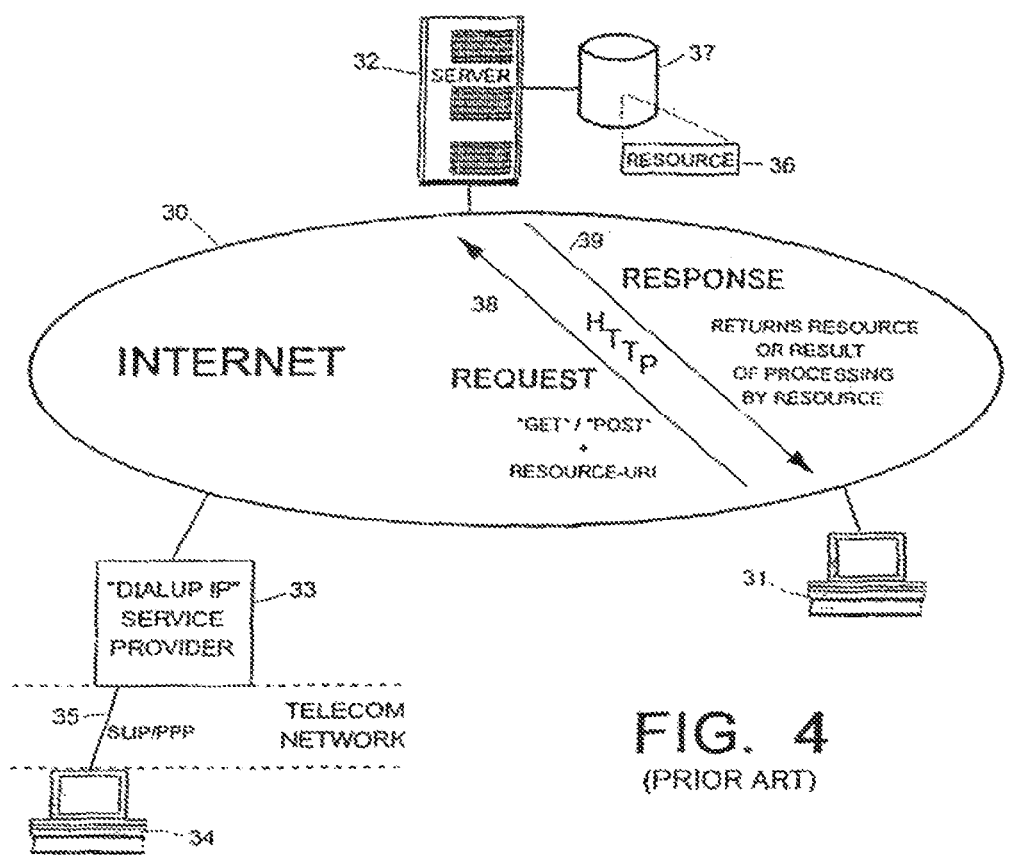
FIG. 4 is a diagram illustrating the functioning of the World Wide Web.
FIG. 5 is a diagram illustrating the format of a standard URL.

The nature of the DNS has already been described above with reference to FIG. 3 when the term "DNS-type" system was also introduced. For convenience in the following a DNS-type system organised to provide a telephone number to URI translation facility will be referred to as a "Duris" system (standing for "DNS-type URI Server" system).

The basic principles surrounding operation of a Duris system are:

every telephone number can be turned into a host domain name (the name space containing such host domain names for the telephone numbers of interest is referred to below as the "telname space"); and for every host domain name in the host domain space there is a Registration Record held by the Duris system containing the corresponding URI.

Thus, an input telephone number forming, in the present case, the UI part of a resource code 54 (see FIG. 11), is first parsed to form a domain name (step 120) and then passed to the Duris system (illustrated in FIG. 11 as formed by the DNS itself) to retrieve the RR with the corresponding URI (step 121). Following on from the URI lookup, if the URI returned has its host component as a domain name, the DNS is next used to derive the host IP address (step 122); this step is, of course not needed if the host component is stored as an IP address in the RR. The URI is then used to make a resource request to the appropriate server, passing any RRI part of the resource code 54 (step 123).

Figure 12A:
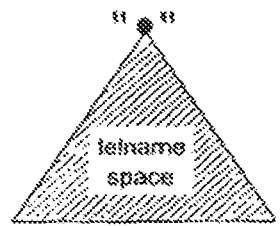
FIG. 12A is a diagram depicting a name space (the "telname space") constituted by the domain names derived by a parsing of a predetermined set of telephone numbers.

There are a number of possibilities at the top level as to how a Duris system could be implemented:

(a) Independent of the DNS. In this option, the telname space constitutes the entire name space to be managed with the root of the telname space being the "." name space root (see FIG. 12A where the telname space is shown hatched). In this case, the Duris system is independent of the DNS itself. The Duris system could, of course, use the same basic infrastructure as the DNS (that is, the Internet) or an entirely separate network. Where the telname space comprises all the domain names corresponding to all public telephone numbers worldwide, parsing a full international telephone number would give a fully qualified domain name. Of course, the telname space could be a much smaller set of names such as those derived from internal extension numbers within a company having worldwide operations.

(b) Unfragmented Telname Space within the DNS. In this option, the telname space is a domain of the DNS name space and the Duris system is provided by the DNS itself. Thus, where the telname space comprises all domain names derived from public telephone numbers worldwide, the telname space could be placed within the domain of the ITU, in a special subdomain "tel", the root of the telname space then being "tel.itu.int." (see FIG. 12B where again, the hatched area represents the telname space). The responsibility for administering the domain "tel.itu.int." would then lie with the ITU. With this latter example, to form a fully qualified domain name from an input telephone number, after the number has been parsed to form the part of the domain name corresponding to the structuring within the telname space, the tail "tel.itu.int." is added. The fully qualified domain name is then applied to the DNS and the corresponding RR record, holding the required URI, is retrieved. As a further example, the telname space could be all name derived from internal extension numbers within Hewlett-Packard in which case the root of the telname space would be "tel.hp.com." and Hewlett-Packard would be entirely responsible for managing this domain.

Figure 12B:
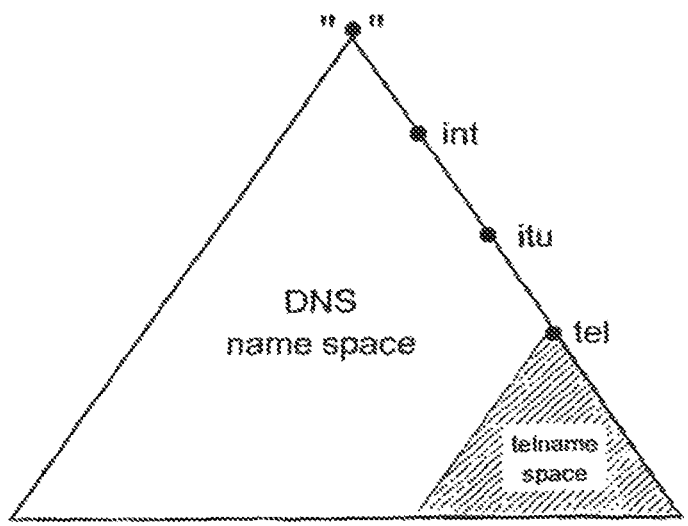
FIG. 12B is a diagram depicting the incorporation of the telname space without fragmentation into the DNS.
Figure 12C:
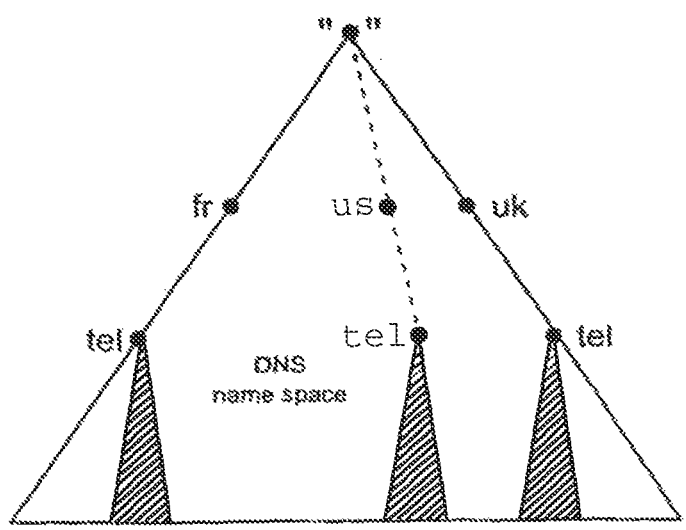
FIG. 12C is a diagram depicting the incorporation of the telname space in fragmented form into the DNS.

(c) Fragmented Telname Space within the DNS. In this option, the telname space is split between multiple domains of the DNS name space and the Duris system is provided by the DNS itself. Thus where the telname space comprises all domain names derived from public telephone numbers worldwide, the telname space could be split between respective "tel" subdomains of each country domain; thus, as illustrated in FIG. 12C, the part of the telname space corresponding to French telephone numbers would have a root of "tel.fr." and the part of the telname space corresponding to UK telephone numbers would have a root of "tel.uk.". The responsibility for administering each "tel" subdomain would then lie with each country. With this latter example, to form a fully qualified domain name from an input telephone number, the part of the telephone number following the country code is parsed to form the part of the domain name within a country 'tel' subdomain and then a host domain name tail is added appropriate for the country concerned. Thus for a French telephone number, the "33" country code is stripped from the number prior to parsing and used to add a tail of "tel.fr.". The tail appropriate to each country can be stored in a local lookup table. As a further example, two commercial organisations (X company and Y company) with respective DNS domains of "xco.com." and "yco.com." may agree to operate a common Duris system with a telname space split between "tel.xco.com." and "tel.yco.com". In this case, any Y company telephone number input from X company will be parsed to a fully qualified domain name terminating "tel.yco.com." and vice versa.

Consideration will next be given to the parsing of a telephone number into a domain name—in other words, where to insert the "." characters into the number to provide the structuring of a domain name. Of course, as already explained, telephone numbers are hierarchically structured according to each country's numbering plan. Thus one approach would be to follow this numbering plan structuring in dividing up a telephone number to form a domain name. By way of example, the telephone number "441447456987" which is a UK number (country code "44") with a four digit area code ("1447") and six digit local number ("456987") could be divided to form a domain name of 456987.1447.44 (note that the reversal of label order occasioned by the fact that the DNS labels are arranged least significant first). If the telname space is a subdomain of the DNS with a placement as illustrated in FIG. 12B, the fully qualified domain name derived from the telephone number would be:

456987.1447.44.tel.itu.int.

There are however, difficulties inherent with trying to match the numbering plan hierarchy when parsing a telephone number into a host name. Firstly, in order to parse an international number correctly, it would be necessary for each entity tasked with this operation to know the structuring of each country's numbering plan and where, as in the UK, area codes may be of differing length the required knowledge may need to take the form of a lookup table. Whilst this is not a complicated computational task, it is a major administrative nuisance as it means that each country will need to inform all others about its numbering plan and any updates. The second problem is that a six or seven digit local number is a very large domain; it would be preferable to create subdomains for performance and scaling reasons but there is no obvious way of doing this.

These problems can be overcome by giving up the restriction that the parsing of telephone number into a domain name should match the structuring of national numbering plans. In fact, there is no strong reason to follow such a scheme as DNS servers know nothing about the meaning of the name space. It is therefore possible to parse telephone numbers using a deterministic algorithm taking, for example, 4 digits at a time to limit the size of each subdomain and making it possible to 'insert the dots' without knowing the numbering plan concerned. So long as the DNS domains and zones served by the DNS servers are created correctly it will all work.

For international numbers it would still seem appropriate to separate off the country codes and so a hybrid parsing scheme would be to parse the initial part of a dialled number according to known country codes and thereafter use a deterministic scheme (for example 3, 7 or 4, 6 or 3, 3, 4) to separate the digits. Of course, if a fragmented telname space is being used as illustrated in Figure UC then the country code is used to look up the host name tail and it is only the national part of the number which would be parsed.

Finally, as regards the details of how a DNS server can be set up to hold RR records with URIs, reference can be made, for example, to "DNS and BIND", Paul Albitz and Criket Liu, O'Reilly & Associates, 1992 which describes how to set up a DNS server using the Unix BIND implementation. The type of the RR records is, for example, text.

It should be noted that DNS labels should not in theory start with a digit. If this convention is retained, then it is of course a trivial exercise when parsing a telephone number to insert a standard character as the first character of each label. Thus, a 4 digit label of 2826 would become "t2826" where "t" is used as the standard starting character.

It will be appreciated that as with domain names, where an input telephone number is not the full number (for example, a local call does not require any international or area code prefix), it would be parsed into a domain name in the local domain.

The foregoing discussion of Duris system implementation, has been in terms of translating a telephone number into an URI where the telephone number forms the full UI of a resource code and the Duris system returns a full URI. It will be appreciated that the described Duris implementation can be readily adapted to accommodate the various modification discussed above regarding the form of the UI and what parts of the URI need to be looked up. For example, where there are a number of different service resources associated with a subscriber each in its own file and the required source is identified by a pic part of the resource code, then the input telephone number will be used to look up, not the full URI, but the host component and that part of the path component up to the relevant subdirectory, the pic part of the UI then being appended to identify the required resource file.

For small local Duris implementations, it may be possible to have a single server; the implementation should still, however, be considered as of a DNS type provided the other relevant features are present.

Nature of Service Resources

Turning now to a consideration of the service resources 49, how these service resources can be provisioned onto the servers 51 will be described more fully below but, by way of present example, the service resource or resources associated with a particular PSTN user (individual or organisation, whether a calling or called party) can be placed on a server 51 over the Internet from a user terminal 53 in one or more WWW pages.

Consider the simple case where the service resource is a service data item such as a telephone number (for example, an alternative number to be tried if the user's telephone corresponding to the number dialled by a calling party is busy). This diversion number could be made the sole service resource of a phone page of the user. The phone page URI could be a URL with scheme set to HTTP in which case the GET method could be used to retrieve the diversion number. Such an arrangement is suitable if the phone page is only to be used for functional retrieval of the diversion number. However, if the diversion number is to be visually presented at a user terminal 53, then it may be desirable to accompany the number with explanatory material (this will often not be necessary as the diversion number can be arranged to be returned into an existing displayed page that already provides context information). However, where the phone page does include explanatory material as well as the diversion number, an entity only wishing to make functional use of the phone page, could be arranged to retrieve the phone page and then extract the diversion number (this would, of course, require a standard way of identifying the information to be extracted from the phone page).

An alternative and preferred arrangement for providing for both viewing and functional access to a resource requiring explanatory material for viewing, is to use an object-oriented approach to resource design. In this case, the resource object would have two different access methods associated with it, one for purely functional use of the resource and the other enabling viewing of associated explanatory material. It would then be up to the accessing entity to access the resource object using the appropriate object method.

Yet another arrangement for providing for both viewing and functional use of the diversion number, would be to provide separate resources appropriately configured for each use, each resource having its own resource code (generally, both such resources would be placed on the same phone page and in this case the UI part of each resource code would be the same).

Retrieval of a phone page for use by a human user will generally not be as time critical as retrieval for operational use by a PSTN. Thus, while for human use the scheme specified in the URL of a service resource could be HTTP, it may be advantageous for operational use to define a special "phone" scheme (access protocol) which would result in the server 51 using an optimised access routine to access the required resource (diversion number, in the current example) and respond to the accessing entity in the minimum possible time.

Besides data items, other possible types of service resource include service logic for execution in place (at the server) with the result of this execution being returned to the entity accessing the resource; service logic downloadable from the server to the accessing entity for execution at that entity; and a logging resource for logging information passed to it by the accessing entity (or simply for logging the fact that is has been accessed). It will be appreciated that the logging resource is really just a particular case of service logic executable in place.

By way of example, a service resource constituted by execute-in-place service logic can be arranged to implement time-of-day routing, the result of executing the service logic being the telephone number to which a call should be routed taking account of the time of day at the called party's location. An example of a service resource constituted by downloadable service logic is service logic for controlling calling-party option interrogation using the facilities provided by an IP. As regards the logging resource, this can be used for recording the number of calls placed to a particular number.

Where each resource has its own phone page and the resource is present only in its unembellished functional form, then the HTTP scheme can be employed for access using the GET method for both the downloadable service logic and the execution-in-place service logic, and the POST method for the logging resource. If it is desired to provide an explanatory material with each service resource, then any of the solutions discussed above in relation to data items, can be used.

Where more than one service resource is to be associated with a number, then each such resource can be placed on a respective phone page with its own URI. However, the preferred approach is to place all such service resources on the same page and use the RRI part of the corresponding resource codes to enable access to the appropriate resource. The accessed resource is then treated according to its form (executed if execute-in-place service logic, returned if downloadable service data or logic).

Thus if both a diversion-number service-data resource and a time-of-day execution-in-place service-logic resource are placed on the same phone page, the diversion-number resource code might have an RRI of "1" whilst the time-of day resource code might have an RRI value of "2".

Where calling/called party options are to be included in a service resource for presentation to such party, then as already indicated, this can conveniently be done by constituting the service resource as downloadable service logic with the chosen option possibly initiating request for a follow-up service resource.

It will be appreciated that a service resource will often be of a complex type, combining service data and/or downloadable service logic and/or execute in place service logic. A particularly powerful combination is the combination of the two types of service logic where the downloadable service logic is designed to interact with execute-in-place service logic; using this arrangement, the user can be presented with complex client-server type applications.

Example Usage of Service Resource

Figure 13:
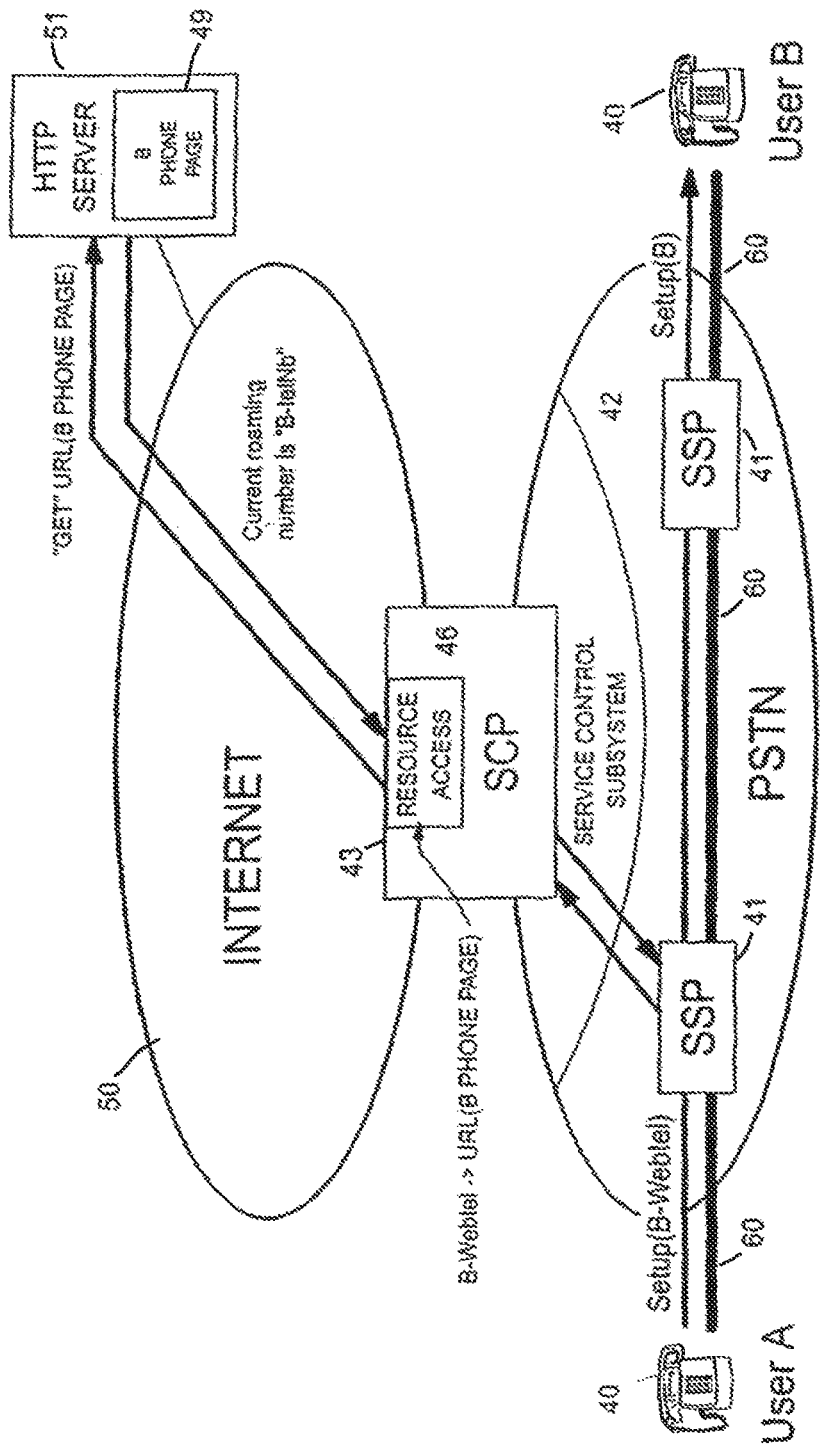
FIG. 13 is a diagram illustrating the overall operation of the FIG. 6 arrangement in providing a roaming number service in response to a telephone number being dialled at a standard phone.

FIG. 13 illustrates the operation of a service making use of a resource on a server 51. This service is equivalent to a "personal number" service by which a user can be accessed through a single, unchanging number even when moving between telephones having different real numbers. To achieve this, the user requiring this service (user B in the current example) is allotted a unique personal number (here referred to as the "Webtel" number of B) from a set of numbers all of which have the same leading number string to enable an SSP to readily identify a dialled number as a Webtel number. User B has a service resource 49 on a dedicated phone page on HTTP server 51, this phone page being located at a URL here identified as "URL (B phone page)". B's phone page when accessed returns the current roaming number ("B-telNb") where B can be reached. In the simplest case, B's phone page is just a single number that can be modified by B (for example, from a terminal 53) as B moves to a different phone. More likely is that B's phone page is an execute-in-place service logic providing time of day routing.

In the present example, the association between B's Webtel number and the URL of B's phone page is stored in an association table accessible to SCP 43.

Upon a user A seeking to contact user B by dialling the Webtel number of B, the telephone 40 being used by A passes a call set up request to SSP 41 (note that in FIG. 13 the bearer paths through the telephony network are shown by the thicker lines 60, the other heavy lines indicating signalling flows). SSP 41 detects the dialled number as a Webtel number and sends a service request to SCP 43 together with B's Webtel number. SCP 43 on receiving this service request initiates a service logic program for controlling translation of B's Webtel number into a current roaming number for B; in fact, in the present case, this program simply requests the resource access block 46 to access the service resource identified by B's Webtel number, (that is, B's phone page 49) and return the result of this access. To this end, block 46 first 'translates B's Webtel number into the URL of B's phone page and then uses this URL to access B's phone page over the Internet (for example, using the 'phone' scheme already referred to with a method corresponding to the HTTP GET method). This results in B's current roaming number B-telNb being passed back to block 46 and in due course this number is returned to the SSP 41 which then initiates completion of call set up to the telephone 40 corresponding to B-telNb.

The FIG. 13 example related to a called-party service; it will, of course, be appreciated that the principle of accessing service resources over the Internet can be applied to all types of services, including both calling-party and called-party services and hybrids. Thus, standard 800 number services can be implemented with the dialled 800 number resulting in access to a phone page resource constituted by execute-in-place service logic that returns the most appropriate number for controlling onward call routing.

It will be appreciated that although in the FIG. 13 example the service request from the SSP was triggered by a leading number string of a dialled number, a service request may be triggered by a variety of triggers including calling-party number, called-party number, or some other user input, such triggers being possibly qualified by call setup progress (for example, called-party number qualified by a busy status or by ringing for more than a certain time).

With respect to the logging service resource mentioned above, one possible application for such a resource is in telephone voting. In this case, dialling the voting number causes the SSP picking up the call to pass a service request to SCP 43 which then contacts the appropriate logging resource over the Internet to register a vote after which the call is terminated. To minimise bottlenecks, a logging resource could be provided at a different URL for each SCP, it being a simple matter to collect and collate voting from all these logging resources over the Internet. If an SCP with Internet access is provided at every SSP, then the risk of congestion is greatly reduced.

As already noted, a user's phone page may hold multiple service resources in which case the access request from the accessing SCP needs to contain an appropriate RRI identifying the required resource.

In the event that an SCP is to provide both a traditional IN service to some users and an equivalent service using an Internet-accessed service resource to other users, then a lookup table may need to be provided in the SCP to ensure that a service request is appropriately handled; such a lookup table can conveniently be combined with the customer record database.

Once a user, such as user B, has set up one or more phone pages specifying his desired service resources (particularly service logic defining personalised services), it is clearly logical for user B to want any PSTN operator he cares to use, to access and utilise such service resources. This is possible if the Webtel-to-URI databases are available to all operators. Thus multiple operators could be set to access B's phone page or pages. If an operator declines to use B's phone pages, B can obviously chose not to use that operator (at least where that operator provides a long haul carrier service subject to user selection). The possibility therefore arises that service provision will cease to command a premium from operators, but that the provision of phone-page utilisation by an operator will become a necessary basic feature of PSTN operation.

Provisioning and Updating Service Resources

Consideration will next be given as to how the service resources 49 are provisioned to the servers 51 and subsequently updated.

So far as provisioning is concerned, two basic actions are required: firstly, the service resource must be placed on a server 51 and, secondly, the URI of the service resource must be notified to the PSTN operator along with the trigger conditions (number plus any other condition such as point in call) calling for access to the resource; if multiple resources are provided at the same URI, then the RRI values needed to retrieve the appropriate resource for a particular trigger condition, must also be notified. This notification process will be referred to hereinafter as 'registering' the service resource with the PSTN operator; registration is, of course, necessary to enable the association tables used by SCP 43 to be set up and for trigger conditions to be set in SSPs 43. For certain services, such as that described above with reference to FIG. 13, it is not the user that supplies the triggering number (the Webtel number in the FIG. 13 example); instead, the PSTN operator allocates an appropriate number to the user as part of the registration process.

As to the process of placing a service resource on a server 51, how this is carried out will depend on the attitude of the PSTN operator to the possible effects of such service resources on operation of the PSTN. Where the service resource simply returns a data item to an accessing entity, then an operator may not be too concerned about possible errors (accidental or deliberate) in implementing the service resource. However, the operator will probably be much more concerned about the proper operation of any service logic that may be returned by a resource; indeed, an operator may not permit such a service resource.

Assuming for the moment that an operator has no concerns about the nature or implementation of service resources, then how a resource is placed on a server 51 will largely depend on the nature of the server concerned. For example, if a user has a computer with network access to the Internet and this computer is used as server 51, then the user can simply load a desired resource onto the server as a WWW phone page for external access. A similar situation arises if the server is an organisation server to which the server has access over an internal LAN. In both these latter cases, loading the resource as a WWW phone page does not itself require Internet access. However, if the server 51 is one run by an external Internet service provider, then a user can arrange to download the required service resource into the user's allocated Web site space on the server; this may or may not involve Internet access. One special case of this latter scenario is where the PSTN operator provides a special server for user phone pages containing service resources.

Except where a user's own computer acts as server 51, placing a service resource on a server will generally involve clearing one or more levels of password protection.

As regards the origin of the service resource loaded by a user onto server 51, this may be generated by the user or, particularly where the resource includes service logic, may be provided by a third party (including the PSTN operator).

If the PSTN operator wishes to have control over the service resources 49 to avoid any adverse effects on operation of the PSTN, two approaches are possible. Firstly, the operator could require that every resource (or, possibly, a particular subset) had to be subject to a verification process before use, appropriate measures then being taken to avoid subsequent alteration of the resource by the user (except, possibly, for particular data items); in this respect, the operator could require that the resource be placed on a server under the operator's control and to which the user had no write access (except possibly for altering particular data items, as indicated above). A second, more attractive, approach to minimising adverse effects by the service resources 49, is for the operator to provide standard service resources to which a user could-add the user's own data (and possibly make limited functional selections in case where the resource included service logic); the customised resource would then be loaded onto a server 51 controlled by the operator. This process can be conveniently implemented for a particular resource using an HTML "form" which a user could download over the WWW from the operator-controlled server. After completing the form and activating a 'commit' graphical button of the form, the entered information would be 'posted' back to the server where the information would be used to produce a customised service resource thereafter placed on the server for access over the Internet. An advantage of this approach is that registration of the service resource with the operator is simultaneously effected. (It may be noted that if registration needs to be done as a separate act from having a service resource loaded on a server, then using an HTML form is a very convenient way to implement the registration process).

From the foregoing it can be seen that whilst the provisioning process does not necessarily require information to be passed over the Internet, in many cases this will be the best solution, particularly if an HTML form exchanged over the WWW can be used to produce a customised service resource. It should be noted that producing a customised service resource using an HTML form is not limited to cases where the PSTN operator controls the server.

As regards updating service resources, there is likely to be a need to update certain data items on a fairly frequent basis (for example, roaming number). Where the PSTN operator does not place any controls on the service resources 49, then update is a relatively simple matter, only requiring write access to the server concerned (as already indicated, this will generally involve one or more levels of password protection). However, where the PSTN operator exercises control over the service resources, for example by only permitting customizations of standard service resources, such customised resources being loaded on servers controlled by the operator), then write access to the service resource may be tightly controlled. Again, an HTML form may conveniently be used as the medium for modifying a data item in such cases; to the operator, this has the benefit of limiting the modifications possible whilst to the user, a form interface should provide a simple route to resource modification.

For more complex updates, it may be necessary to go through a process similar to that required for initial provisioning.

Particularly where the service resources are held on a server 51 controlled by the PSTN operator, resource update will generally involve communication over the Internet.

Web User Interaction

Consideration will next be given to other possible uses of the service resources held in phone pages on the servers 51. For example, if user B's phone page contains a diversion number, then provided this phone page is read-accessible over the Internet from user A's terminal 53, user A can use a graphical Web browser running on terminal 53 to view B's phone page and discover B's diversion number. As earlier discussed, the diversion number may be passed to user A for display in an existing visual context giving meaning to the number, or may be passed to user A with accompanying explanatory text.

A more useful example is a current roaming number service for user B. Suppose B's phone page 49 on server 51 (see FIG. 14) is operative when accessed to return a current roaming number where B can be reached. Further suppose that user B has a Web site with several Web pages written in HTML and each page contains a graphical 'phone' button which when activated uses the GET method to access B's phone page by its URL. Now if user A whilst browsing (arrow 66) B's Web site over the WWW from user A's terminal 53, decides that he would like to call user B to discuss some item of interest, user A simply activates the phone button 65 on the currently viewed page of B. This causes B's phone page to be accessed using the HTTP request "GET URL (B Phone Page)"—see arrow 67.

B's current number to be called is then determined and passed to user A's terminal 53 (see arrow 68) where it is displayed. An explanatory text concerning the number will generally also be displayed; for example the text "Please call me at the following number:" could be displayed, this text being provided either by the HTML script associated with the phone button, or from the phone page when returning the current number. In fact, it would probably be more helpful to provide user A, not only with the current number for reaching user B, but also with all numbers where B could be reached together with the times when B was most likely to be at each number. Since this extra information is likely to be subject to frequent change, the only sensible way to provide the information is from the phone page. Thus, B's phone page not only provides the current number for reaching B, but also a text that includes numbers and times subject to change; scripting B's phone page is, of course, done in a way that ensures that variable data need only be altered in one place.

In a further example, B's phone page might include downloadable service logic for execution at user A's terminal. This is useful where choices are to be presented to a user, each choice producing a follow-up action such as fetching a further phone page. For example, the first-accessed phone page may be a family phone page giving the general telephone number for a family but also giving the user the possibility of selecting further phone information on each family member, such as a time-of-day dependent number; in this case, each family member has their own follow-up phone page.

In the above scenarios, user A has been presented with a number to call over the PSTN. User A can now pick up his standard telephone and dial the number given. In fact, a complication arises if A only has Internet access via a SLIP/PPP connection over an ordinary, non-ISDN, PSTN line since, in this case, A's telephone line is already tied up with making Internet access when gateway 90 seeks to set up a call to A's telephone; with an ISDN connection, as two channels are available, this problem does not arise. One way of overcoming this problem would be to have user A's terminal 53, after obtaining the number to call from B's phone page, automatically suspend its Internet session by storing any required state information (for example, current WWW URL being accessed) and then terminate its SLIP/PPP connection to thereby free up the telephone line. A can then telephone B. At the end of this call, A can resume the suspended Internet session, using the stored state information to return to the point where A left off to call B. An alternative approach is to operate a suitable multiplexing modulation scheme on the telephone line to A allowing voice and data to be simultaneously carried. A number of such schemes already exist. The PSTN would then need to separate the combined data and voice rams coming from A at some point and pass each to its appropriate destination (the Internet data being forwarded to the ISP providing the SLIP/PPP connection for user A and the voice stream being passed to B); of course, data and voice traffic in the reverse direction would also need combining at some point for sending over the last leg to A's terminal.

Rather than A manually dialling B using a standard telephone, another possibility is that user A's terminal is provided with functionality enabling A to make a call over the PSTN from his terminal; this functionality generally comprises a hardware interface 70 (FIG. 14) to a telephone line and phone driver software 71 for driving the interface 70 in response to input from application software such as the Web browser 73. A could call up his phone software and enter the required number or, preferably, A need only "select" on screen the number returned from B's phone page and then pass it into A's phone software. Indeed, provided user B knew the software interface to the software 71 providing dialling functionality on A's terminal, it would be possible for B's phone page to return to A's terminal program code for automatically dialling B's number upon A confirming that he wishes to proceed with call placement. As an alternative to placing a voice call, if A's terminal is equipped with a suitable modem and controlling software, A could, instead, elect to send a fax or data to B through the PSTN either to B's ordinary number or to one specified in B's phone page as the number to be used for such transmissions. Of course, placing a call from A's terminal over the PSTN may be subject to the problem already discussed of conflict for use of the telephone line where this is not an ISDN line and A gains Internet access via a SLIP/PPP connection.

However the call is placed, if B's telephone corresponding to the number tried by A is busy, a number of possibilities exist. Thus if B has a phone page that specifies a diversion number, and B has registered this service resource with the PSTN, then the diversion number should be automatically tried by the PSTN. However, if the diversion number resource has not been registered with the PSTN a busy signal will returned to A. Where A has placed the call through a standard telephone, A must now decide how to proceed and A may elect either to give up or to refer again to B's phone page to look up the diversion number and redial using this number. If A placed the original call using his terminal 53 then the latter can be programmed to detect the return of a busy signal and then automatically look up B's diversion number and redial using this number. This functionality can be included in service logic downloaded from B's phone page and run on A's terminal.

If A had to terminate his Internet session in order to free up the telephone line for voice use, then referring back to B's phone page requires a new Internet session to be started (in fact, this inconvenience could be avoided if B's diversion number were passed to A's terminal at the time the original number to be dialled for B was supplied).

The service resource accessed on B's phone page upon B's telephone being busy may, of course, be more complex than just a diversion number. In particular, user A may be presented with a range of options including, for example, B's fax or voice mailbox number, the selection of an option potentially initiating the running of appropriate accessing software. Another possible option would be for A to leave B a call back message using a form downloaded from B's phone page upon this option being chosen; the completed form would be posted back to server 51 and logged for B to check in due course.

Of course, it may arise that user A wishes to access B's phone page to find out, for example, B's current roaming number, but user A does not know the URI of B's Web site and only has B's Webtel number. A could just call B through the PSTN in which case the translation of B's Webtel number to roaming number would be automatically effected (assuming B is still registered for this service); however, A may not wish to call B straight away, but just note his current roaming number. In order to solve A's problem, the Webtel-to-URI association tables previously described are preferably made accessible on the Internet at a known address (for example, at a known Web site). All that A need now do is to access this Web site passing B's Webtel number; B's phone page URI will then be returned to A who can then use it to access B's phone page. This process can, of course be made automatic from the point when A sends B's Webtel number to the association-table Web site.

Internet/PSTN Call Interface

Figure 14:
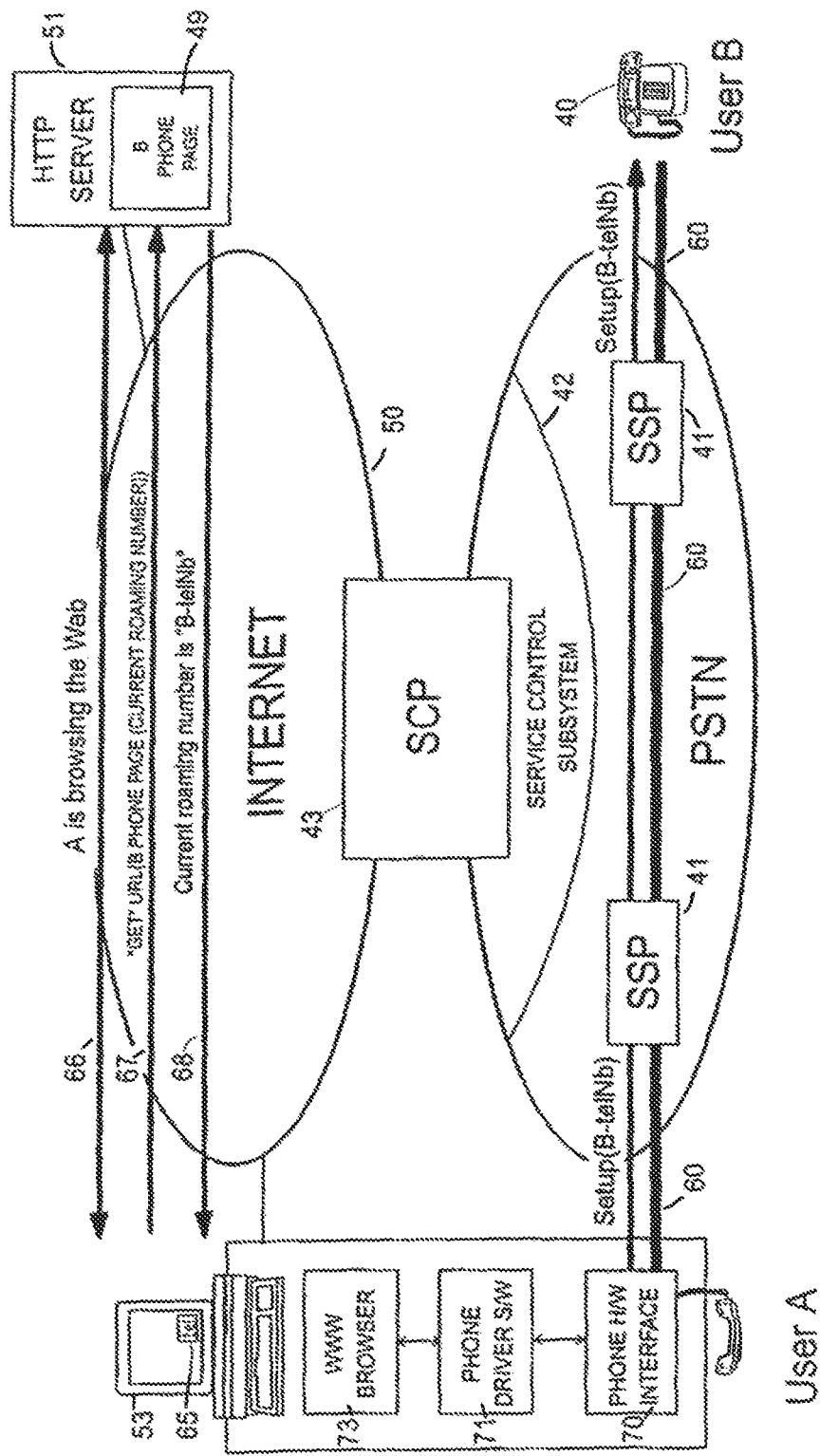
FIG. 14 is a diagram illustrating the overall operation of the FIG. 6 arrangement when utilised by a Web user in setting up a call through a telephone interface integrated into the user's Web terminal.
Figure 15:
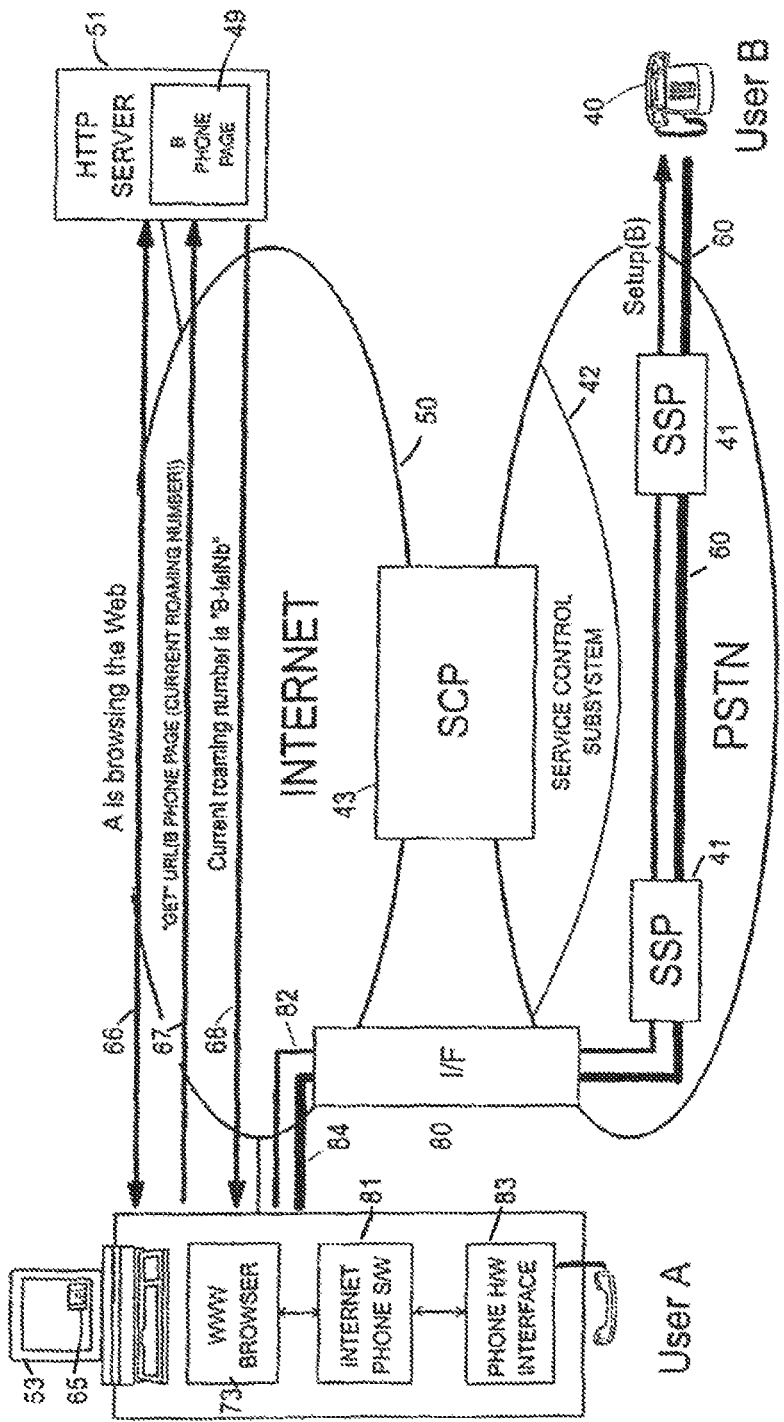
FIG. 15 is a diagram illustrating the overall operation of an arrangement in which an interface is provided between the PSTN and the Internet for telephone traffic.

In the FIG. 14 scenario, A's access to the PSTN was through a standard telephone interface even though the actual form of A's telephone differed from standard by being integrated into A's computer terminal 53. FIG. 15 illustrates a situation where A, after being supplied with B's current roaming number as in the FIG. 14 case, calls B via a route that starts out over the Internet and then passes through a user network interface 80 into the PSTN. Interface 80 is arranged to convert between ISDN-type telephone signalling on the PSTN and corresponding signalling indications carried across the Internet in IP packets; in addition, interface 80 transfers voice data from IP packets onto trunk 60 and vice versa.

Thus, upon A initiating a call to B, Internet phone software 81 in A's terminal sends call initiation signalling over the Internet to interface 80, the address of which is already known to A's terminal. At interface 80, the signalling is converted into ISDN-type signalling and passed to SSP 41. Call set up then proceeds in the normal way and return signalling is transferred back through interface 80, over the Internet, to the software 81 in A's terminal. This software passes call setup progress information to the WWW browser 73 for display to A. Upon the call becoming established, A can talk to B through his telephone and A's voice input is first digitised in phone hardware interface 83 and then inserted into IP packets by software 81 to traverse the Internet to interface 80 (see arrow 84); voice traffic from B follows the reverse path.

IN services can be provided to this call by SCP in response to a service request from an SSP 41. Thus, if B's phone is busy, and B is registered for call diversion, SCP 43 on receiving a service request will access B's appropriate phone page for call diversion and retrieve the diversion number. If SSP 41 is not set to initiate a service request on B's telephone being busy, the busy indication is returned to A's terminal where it can be handled in the manner already described with reference to FIG. 14.

In fact, interface 80 can be provided with functionality similar to an SSP to set trigger conditions and generate a service request to SCP 43 on these conditions being satisfied.

Third-Party Call Setup Gateway

Figure 16:
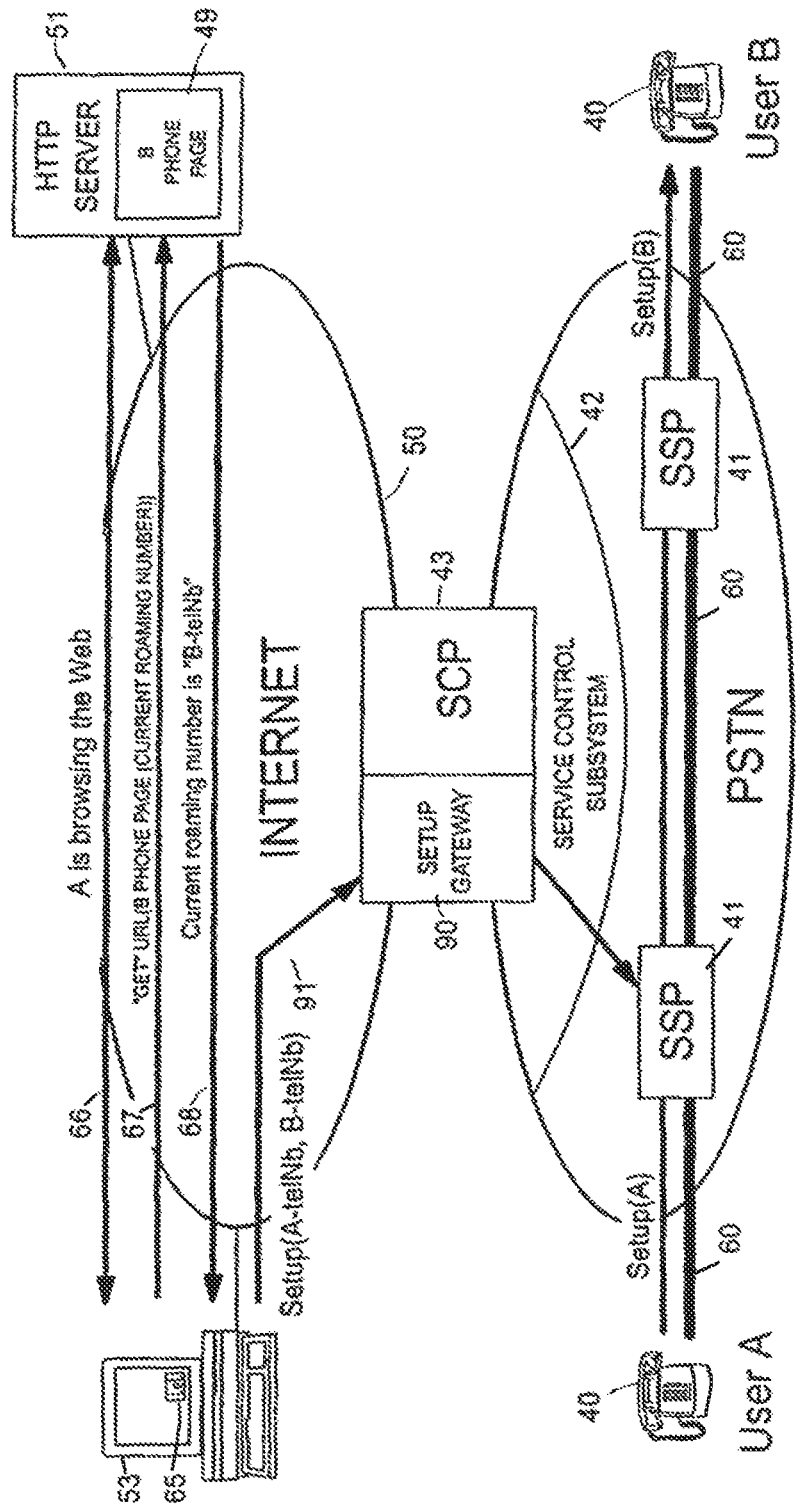
FIG. 16 is a diagram illustrating the overall operation of an arrangement in which a call setup gateway is provided between the Internet and the PSTN.

FIG. 16 illustrates a further arrangement by which A can call B after receiving B's current roaming number. In this case, a third-party call set-up gateway 90 is provided that interfaces both with the Internet 50 and with an SSP 41. Conveniently, gateway 90 can be co-located with SCP 43 (though this is not essential). Gateway 90 has the capability of commanding SSP 41 to set up a call between specified telephones.

Thus, upon A wishing to call B, a third-party call setup request is sent from A's terminal over the Internet to the gateway 90 (see arrow 91). This setup request includes A's telephone number and B's current roaming number. Gateway 90 first attempts to setup the call to A's telephone (which should generally succeed) and thereafter to set up the call to B's identified telephone. Once the call is setup, A and B communicate in standard manner across the PSTN.

If B's phone had been busy, then any of the previously described scenarios may ensue.

Gateway 90 can also be arranged to make service requests to SCP 43 upon predetermined trigger conditions being satisfied. Thus, gateway 90 might be set to pick up the busy condition on B's telephone and initiate a service request to SCP 43 for a diversion number. However passing the busy indication back to A's terminal via gateway 90 is preferred because of the flexibility it gives A regarding further action.

As already generally discussed in relation to FIG. 14, a complication arises if A only has Internet access via a SLIP/PPP connection over an ordinary, non-ISDN, PSTN line since, in this case, A's telephone line is already tied up with making Internet access when gateway 90 seeks to set up a call to A's telephone. The solutions discussed in respect of FIG. 14 (termination of Internet session; multiplexing voice and Internet data on same telephone line) can also be used here. An alternative approach both for FIG. 14 and for FIG. 16 scenarios is possible if user A's terminal can handle a voice call as digitised voice passed over the Internet. In this case, the voice call can be placed through an interface 80 of the FIG. 15 form, and the voice traffic and the Internet communication with the B's phone page and/or gateway 90 are both carried in Internet packets passed over the SLIP/PPP connection to/from A's terminal 53 but as logically distinct flows passed to separate applications ruining on terminal 53.

It may be noted that the third party call setup request made by A's terminal to gateway 90 could equally have been made by service logic held in B's phone page and executed by server 51 (such an arrangement would, of course, require A's telephone number to be passed to B's phone-page service logic and this could be arranged to occur either automatically or through a form presented to user A at terminal A and then posted back to server 51).

It may also be noted that the interface 80 of FIG. 15 and the gateway 90 of FIG. 516 provide examples of service requests being passed to the service control subsystem by entities other than SSPs 41.

Www-Based "FreePhone" (800 Number) Services

It is possible to implement a "FreePhone" or "800 number" type of service using a combination of the WWW and the PSTN. As will be seen from the following description of such a service with reference to FIG. 17, a WWW/PSTN implementation does not necessarily rely either on transferring call charges from the calling to called party or on the use of a special "800" number, two characteristics of standard "Freephone" schemes. The WWW/PSTN implementations do, however, possess the more general characteristic of placing an enquiring party and the party to whom the enquiry is directed, in telephone contact at the expense of the latter party.

Figure 17:
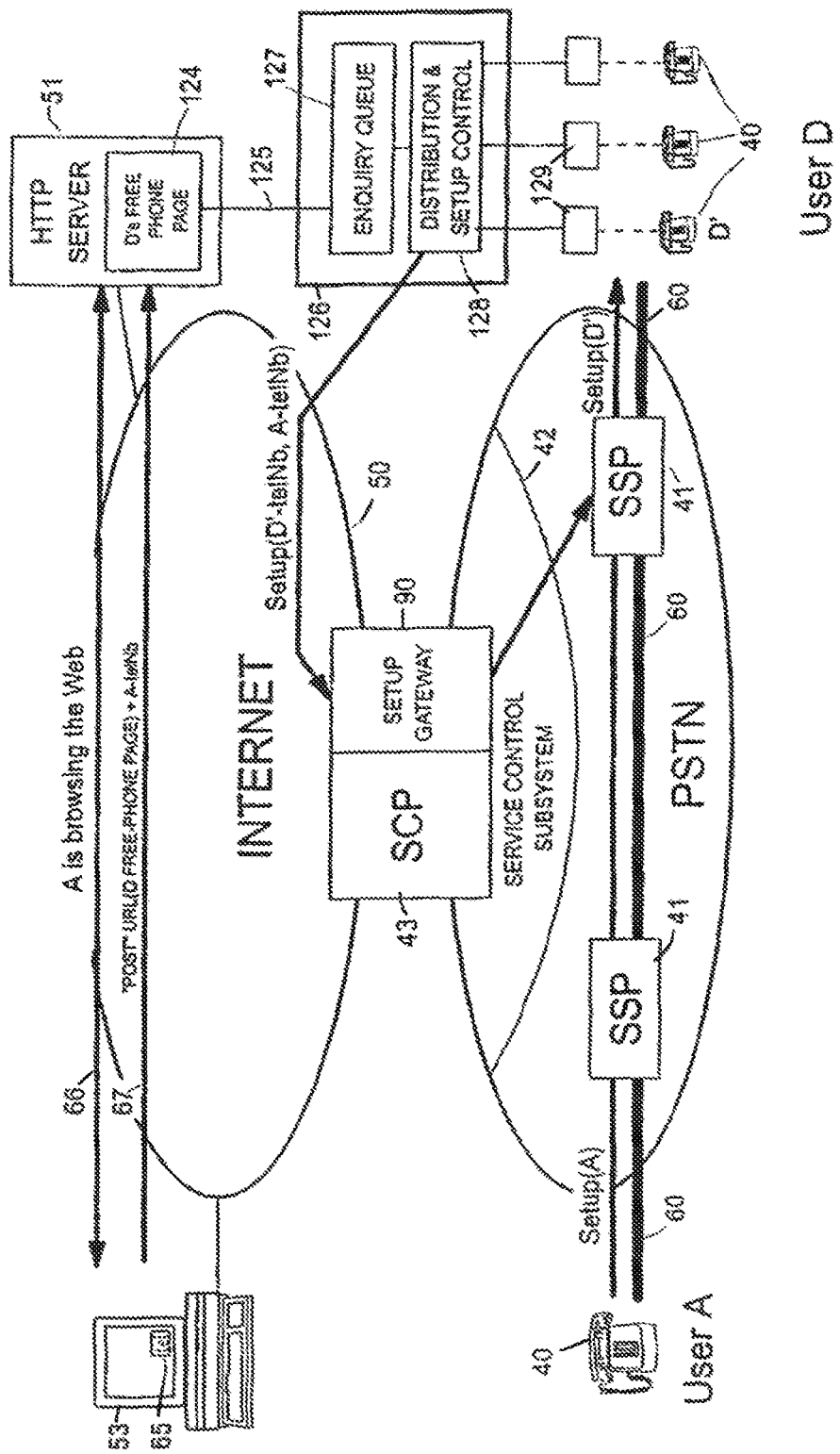
FIG. 17 is a diagram illustrating the overall operation of an arrangement in which a freephone service is implemented for Web users.

In the FIG. 17 arrangement, a user D such as a large department store has a website on a server 51; for the sake of simplicity, it will be assumed that the server is under the control of user D who has direct computer access to the server over line 125. D's Website may, for example, contain many catalogue-like Web pages illustrating goods offered for sale by D. In addition, D has a freephone page 124 for handling enquiries placed on a freephone basis; the URL of this page is associated with a "freephone" graphical button 122 placed on each of the Website catalogue pages.

Suppose user A at terminal 53 is browsing D's Website, looking at the catalogue pages (arrow 121). If A sees an item of interest and wishes to make an enquiry to D about this item, then A can activate at terminal 53 the graphical freephone button 122 associated with the catalogue page concerned. This activation causes code embedded in the catalogue page currently loaded in A's terminal to prompt the user to enter their telephone number and, optionally, their name, after which an HTTP request is sent to D's freephone page using the POST method and enclosing the entered data (arrow 123). D's freephone page on receiving this request executes service logic to enter a new enquiry (including A's name and telephone number) in an enquiry queue 127 maintained in an enquiry control system 126. In the present example, the enquiry control system is connected to the server 51 via line 125, externally of the Internet; however, it would also be possible to have server 51 communicate with the enquiry control system through the Internet and, indeed, this may be the most practical arrangement where D's Website is on an ISP server rather than on a server controlled by D. In fact, the code run in A's terminal upon activation of the freephone graphical button 122 could be arranged to directly forward the enquiry request to the enquiry control system over the Internet rather than passing it back through the server 51.

The enquiry control system 126 manages enquiries passed to it to ensure that they are dealt with in an ordered manner. The system 126 on receiving a new enquiry preferably estimates approximately how long it will be before the enquiry is dealt with, this estimation being based on the number of currently queued enquiries and the average time taken to handle an enquiry. This estimation of waiting time is passed back via server 51 to user A in the response to the POST request message.

The enquiry control system 126 looks after the distribution of enquiries to a number of agents each of which is equipped with a telephone 40 and a display 129. A's enquiry will be dealt with as soon as it reaches the head of the queue 127 and there is an agent detected as available to handle the enquiry (thus, for example, the system may be arranged to detect when an agent's telephone goes on hook). When these conditions are met, a distribution and setup control unit 128 takes A's enquiry and displays A's name and telephone number on the display 129 of the available agent (for clarity, herein referenced as agent D'); if user D keeps a database on D's past customers or credit rating data, then unit 128 will also look for and display any such further information known about A. At the same time, unit 128 makes a third-party call setup request (arrow 130) over the Internet to gateway 90 asking for a call to be set up between the telephone of the available agent D' and the telephone of user A, both telephones being identified by their respective numbers. If both D' and A pick up the call, the enquiry then proceeds, the cost of the call being paid for by D as it is D that originated the call over the PSTN. If, for whatever reason, the call remains incomplete (for example, unanswered by A) for a predetermined timeout period, then unit 128 can be arranged to automatically pass on to the next enquiry at the head of the queue 127.

It would, of course, be possible to dispense with having the unit 128 request call setup through gateway 90 and either have the agent D' dial A's number manually or have unit 126 initiate auto-dialling for D' telephone (agent D' having, for example, a computer-integrated telephone similar to that of A's in FIG. 14). The advantage of these approaches is that the existing PSTN could be used without adaption and without any service installation, in implementing the WWW-based freephone service.

Figure 11:
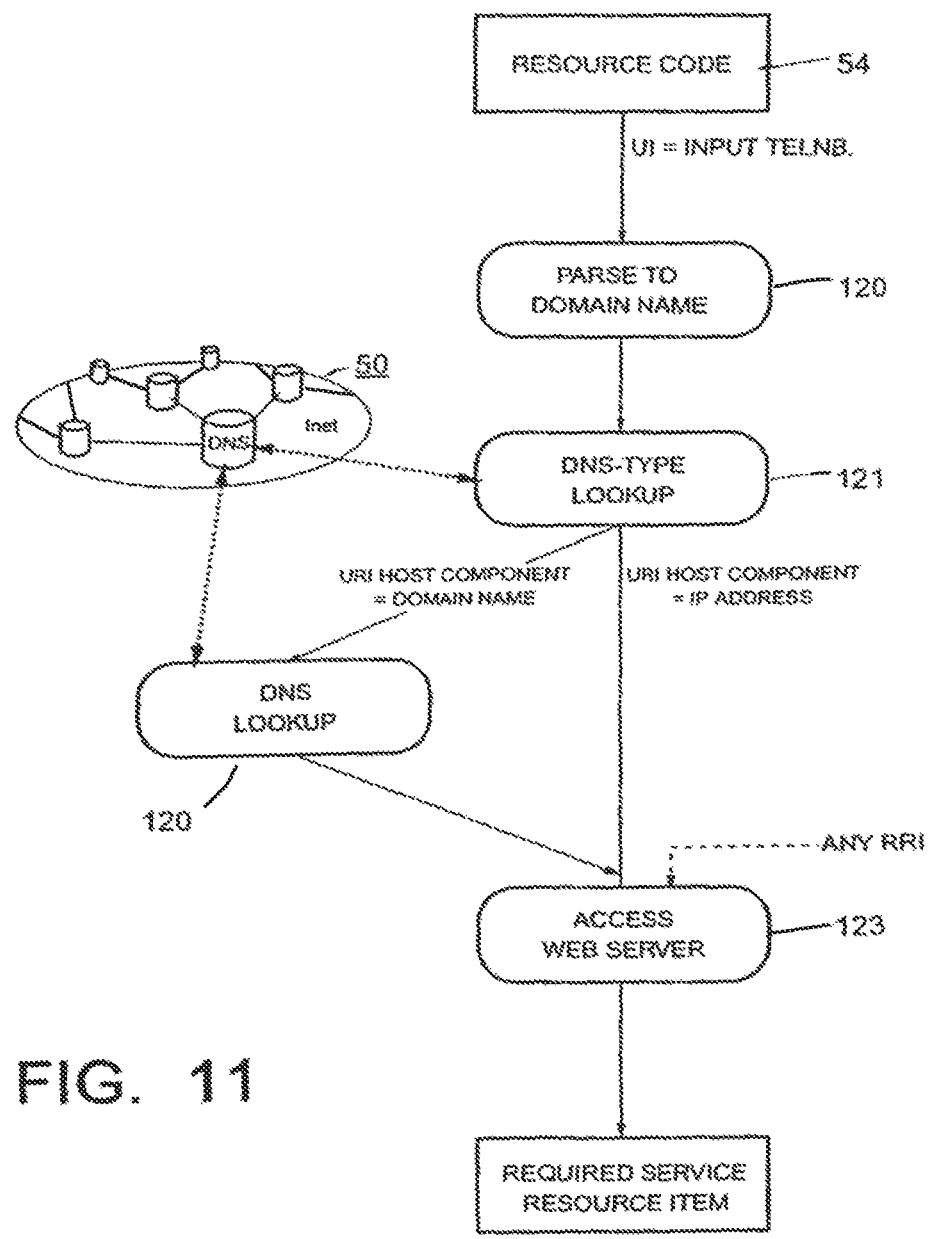
FIG. 11 is a diagram illustrating the derivation of the URI of a service resource by parsing an input telephone number in accordance with the present invention.

As discussed in relation to FIGS. 11 and 13, a complication arises in placing a call to A if A only has Internet access via a SLIP/PPP connection over an ordinary, non-ISDN, PSTN line since, in this case, A's telephone line is already tied up with making Internet access when user D tries to set up a call to A's telephone. The solutions discussed in respect of FIGS. 11 and 13 can also be used here (termination of Internet session; multiplexing voice and Internet data on same telephone line; and placing the call over the Internet to A's terminal). With respect to the solution based on termination of the Internet session, such termination could be delayed until A's enquiry was about to be dealt with; however, to do this, it would be necessary to provide feedback from the control system 126 over the Internet to A's terminal 53 and to associate this feedback with code for bringing about Internet-session termination. One way to achieve this would be to have the response message sent by server 51 in reply to the original POST request message from A, include a correlation code; any subsequent feedback from system 126 passed to A would also include this code (server A having also passed the code to control system 126) thereby allowing A's terminal to correctly identify this feedback. In fact, the same mechanism could be used to provide user A with updates on how much longer user A is likely to be waiting to be called back, this mechanism being usable independently of whether or not there was a conflict problem for use of A's telephone line.

Where user A only has a telephone 40 and no terminal 53, it is still possible to utilise the basic structure of FIG. 17 to provide a freephone service for user A without resorting to the complexity of call charge transfer. More particularly, A would dial a special number for user D's freephone service (typically an 800 number), and the SSP 41 would recognise this special number in standard manner and make a service request to SCP 43 including both this special number and A's number. SCP 43 would then ascertain D's freephone-page URL by doing a number-to-URL translation and access D's freephone page using a POST-method HTRP request similar to request 123. Once this request had been registered as an enquiry by D's freephone page 124, the latter could send a response to SCP 43 asking it to play an announcement such as "Your freephone enquiry has been registered; please hang up and you will be contacted shortly". This announcement could be played to A by an IP in standard manner. A would then hang up and be ready to receive a call from D.

A significant advantage of the above freephone schemes using WWW, is that user D is not running up charges for use of the PSTN during periods when an enquiry is enqueued, waiting to be handled.

Variants

Many variants are, of course, possible to the above-described arrangements and a number of these variants are described below.

Figure 18:
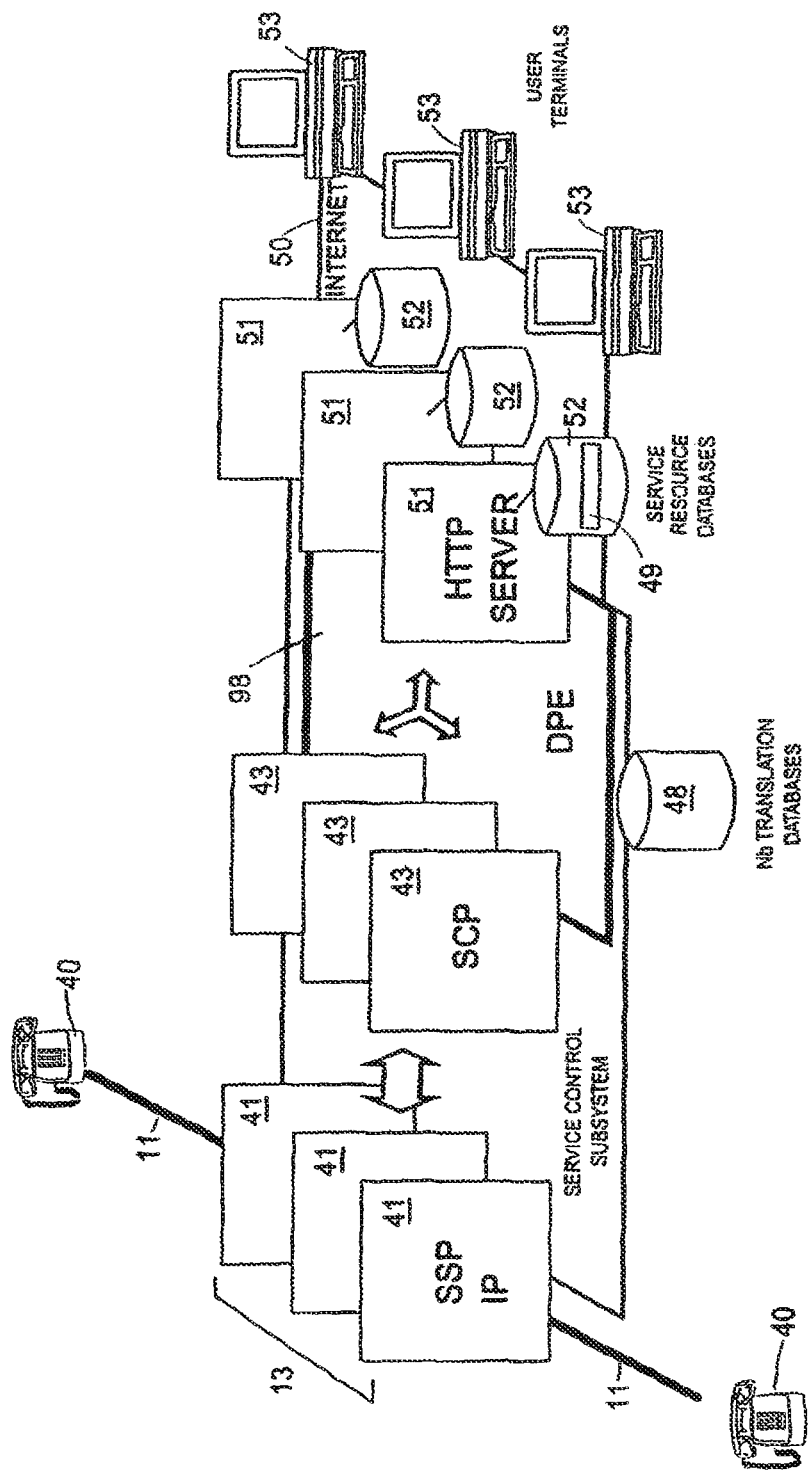
FIG. 18 is a diagram similar to FIG. 6 illustrating the provision of a distributed processing environment for interconnecting elements of the service control subsystem of the PSTN.

Distributed Processing Environment. As is illustrated in FIG. 18, the SCP 43 may access the HTTP servers 51 through a distributed processing environment, DPE 98, at least logically separate from the Internet. Preferably in this case the servers 51 are controlled by PSTN operators and are thus restricted in number.

Service Resources on DNS-Type Servers. In the foregoing examples, the service resource items have been placed on servers 51 connected to the Internet and a desired service resource has then been accessed over the Internet by the service control subsystem of the PSTN, and/or by Internet users, through the use of an URI derived from a resource code that identifies the desired service resource item. In a preferred arrangement for deriving the URI from a resource code in the form of a telephone number, all or part of the telephone number concerned was parsed into domain name form and then resolved into an URI using a DNS-type distributed database system that, indeed, could be integrated into the DNS itself (see FIGS. 11 and 12, and related description). In fact, it would be possible to place service resource items directly in Registration Records held by a DNS-type distributed database system so that instead of the parsed telephone number being resolved to an URI which is then used to access the required resource, the parsed telephone number is directly resolved to the required service resource item. The mechanism employed in this process is exactly as already described for resolving a parsed telephone number into an URI. The DNS-type distributed database system used for this would preferably be one accessible over the Internet or the DNS itself so as to provide access to the service resource items for Internet users as well as for the service control subsystem of the PSTN (in the same manner as described above with reference to FIG. 18, the DNS-type servers holding the service resource items may be accessible to the service control subsystem by a network other than the Internet). Whilst the placing of service resource items in RRs held on DNS-type servers may not be suitable for all types of service resource items, it is suitable for items such as telephone numbers that do not change frequently. Thus, a suitable usage is to provide number portability; in this case, a dialled personal number triggers a lookup in the DNS-type system with all or part of the personal number being first parsed and then applied to the DNS type system to return a current number for call routing. All dialled numbers could be treated as personal numbers or simply a subset of such numbers, this subset comprising numbers that are readily identifiable as personal numbers by, for example, local lookup at an SSP or the presence of a predetermined leading digit string. The general concept of parsing a telephone number (or similar number) in whole or in part to form a domain name for resolution in a DNS-type distributed database system can be used for the retrieval of other items of information besides URIs and service resource items.

Feedback Mechanisms. In discussing the WWW-based freephone arrangement of FIG. 17, it was mentioned that user A could be supplied with feedback on the likely length of waiting time before A would be called back. This is one example of using the Internet to provide a feedback path for a potential or actual telephone user. Another example was provided in relation to FIG. 16 where the progress of call setup was reported back by the call setup gateway to user A's terminal. In fact, generally where a user is known to be using a terminal actively on the Internet the opportunity arises to provide the user with feedback on the progress of call setup through the telephone system. In order to do this, it is of course necessary to ensure that the feedback can be passed to the appropriate application running on terminal A and this will generally require the application to have made appropriate linking information available. As well as call setup progress information, other information can also be fedback for example during a call holding period. Thus, for example, a special server can be provided on the Internet holding multimedia clips or even videos that could be output to user A during a call holding period.

In the described arrangements, the servers 51 have held service resource items concerned primarily with call setup control. It may be noted that in a somewhat different application, Internet servers could be arranged to hold data that could be accessed from the telephone system in response to a user-initiated telephone request and returned to that telephone user. Such a service would be provided, for example, in response to an SSP triggering a service request upon a particular telephone number being input, the service request prompting an SCP to cause an intelligent peripheral to access a particular Internet server (not necessarily an HTTP server) and retrieve the required data for return to the calling party. The intelligent peripheral may include a text-to-voice converter for replaying the data vocally to the user.

One further feedback process is also worthy of note, in this case in relation to service resource items themselves. By way of example, a telephone user G may subscribe to a service by which calls passed through to G's telephone are to be separated by a minimum of X minutes, X being user settable. To implement this service, G has a phone page on a server 51 that includes a "busy" status indication. Upon termination of a successful call to G, G's local SSP triggers the sending of a message by the associated SCP over the Internet to G's phone page. This message causes G's busy indication to be set to indicate that G is busy; the message also starts a timer which times out after a period X and causes the busy status indication to be reset. A call attempt to G will either be rejected at G's SSP because G's line is genuinely busy or will trigger the SSP to enquire via the SCP whether G's phone-page busy status indication is set. If the busy status indication is set (which it will be during the period X following termination of a successful call) the call attempt is rejected whereas if the busy status indication is in its reset condition, the call attempt is allowed to proceed.

By placing the busy status indication mechanism on G's phone page, it is possible to arrange for G to be able to easily change the value of X.

More General Variants. Whilst the service control subsystem of the PSTN has been embodied as an SCP in the foregoing examples, it will be appreciated that the functionality of the service control subsystem could be provided as part of an SSP or in an associated adjunct. Furthermore, the triggering of service requests can be effected by equipment other than SSPs, for example by intercept boxes inserted in the SS7 signalling links.

It will be appreciated that the term "Internet" is to be understood to include not only the current specification of the TCP/IP protocols used for the Internet and the current addressing scheme, but also evolutions of these features such as may be needed to deal with isochronous media. Furthermore, references to the WWW and the HTTP protocol should equally be understood to encompass their evolved descendants.

The present invention can also be applied to telephone systems other than just PSTNs, for example to PLMNs and other mobile networks, and to private systems using PABXs. In this latter case, a LAN or campus-wide computer network serving generally the same internal users as the PABX, will take the role of the Internet in the described embodiments.

Furthermore, the present invention has application where any switched telecommunication system (for example, a broadband ATM system) requires service control and a computer network can be used for the delivery of service resources to the service control subsystem of the telecommunication system.

The invention claimed is:

1. A method, comprising:
   setting up at least a portion of a call using at least a portion of a call signaling system of a telephone network, further comprising:
   determining, by at least one computing device, a domain name based on a telephone number associated with the call,
   sending a first message identifying the domain name,
   receiving a second message in response to the first message,
   using the second message to determine an access scheme and an address suitable for accessing a resource on a packet-based network, and
   using the resource to initiate the at least the portion of the call through the telephone network.

2. The method of claim 1, wherein the packet-based network comprises an Internet Protocol (IP) network.

3. The method of claim 1, wherein the determining comprises determining the domain name to comprise a plurality of digits of the telephone number.

4. The method of claim 1, wherein the determining comprises parsing at least a portion of the telephone number to determine the domain name.

5. The method of claim 1, wherein the second message comprises the access scheme.

6. The method of claim 1, wherein the using the resource comprises using the resource to initiate the at least the portion of the call through a switched telecommunication system of the telephone network.

7. The method of claim 1, wherein the using the resource comprises using the resource to initiate the at least the portion of the call through a bearer channel of the telephone network.

8. The method of claim 1, wherein the telephone network comprises a switched telecommunication system.

9. A method, comprising:
receiving, in a telephony call signaling system, a request for a call that identifies a first telephone number; and
in response to the request:
determining, by the call signaling system, a domain name based on the first telephone number,
sending, by the call signaling system, a first message identifying the domain name,
receiving, by the call signaling system, a second message in response to the first message, and
using, by the call signaling system, the second message to route the call through at least a bearer network.

10. The method of claim 9, wherein the using the second message to route the call comprises using the second message to determine a uniform resource identifier (URI) and using the URI to route the call.

11. The method of claim 9, wherein the bearer network is a bearer network of a switched telecommunication system.

12. A method, comprising:
receiving, in a telephony call signaling system, a request for a call that identifies a first number string; and
in response to the request:
using, by the call signaling system, the first number string to determine a domain name,
providing, by the call signaling system, the domain name to a database,
receiving, by the call signaling system, a record in response to the domain name that was provided to the database, and
using, by the call signaling system, the record to route the call through at least a bearer network.

13. The method of claim 12, wherein the using the record to route the call comprises using the record to determine a uniform resource identifier (URI) and using the URI to route the call.

14. The method of claim 12, wherein the using the first number string comprises determining the domain name to comprise a plurality of digits of the first number string.

15. The method of claim 12, wherein the using the first number string comprises parsing at least a portion of the first number string to determine the domain name.

16. The method of claim 12, wherein the using the record comprises:
using the record to determine an access scheme;
using the access scheme to access a resource; and
using the resource to route the call through the at least the bearer network.

17. A system, comprising:
a first one or more computing devices of a telephony call signaling system of a communication system, the first one or more computing devices configured to:
in response to a request for a call that identifies a number string, use the number string to determine a domain name; and
use a record to initiate routing of the call through at least a bearer network; and
a second one or more computing devices configured to use the domain name to determine the record.

18. The system of claim 17, wherein the first one or more computing devices is configured to use the record to initiate the routing of the call by using the record to determine a uniform resource identifier (URI) and using the URI to initiate the routing of the call.

19. The system of claim 17, wherein the first one or more computing devices is configured to use the number string by determining the domain name to comprise a plurality of digits of the number string.

20. The system of claim 17, wherein the first one or more computing devices is configured to use the number string by parsing at least a portion of the number string to determine the domain name.

21. The system of claim 17, wherein the first one or more computing devices is configured to use the record by:
using the record to determine an access scheme;
using the access scheme to access a resource; and
using the resource to initiate the routing of the call through at least the bearer network.

22. The system of claim 17, wherein the bearer network is a bearer network of a switched telecommunication system.

23. The system of claim 17, wherein the bearer network comprises a switch-based bearer network.

24. The system of claim 17, wherein the first one or more computing devices are configured to use the record to initiate the routing of the call through at least a bearer channel of the bearer network.

25. The system of claim 17, wherein the communication system comprises a switched telecommunication system.

26. The system of claim 17, wherein the communication system is configured for datagram-based communications.

27. The system of claim 17, wherein the telephony call signaling system is configured for datagram-based communications to initiate the routing of the call.

28. The system of claim 17, wherein the telephony call signaling system is configured for datagram-based communications to initiate the routing of the call using a Signalling System No. Seven ("SS7") protocol suite-based signaling network.

29. The system of claim 17, wherein the number string comprises a telephone number.

30. A method, comprising:
performing, by a telephony call signaling system of a communication system:
in response to a request for a call that identifies a telephone number, deriving a domain name from the telephone number;
providing the domain name to a database;
receiving a record in response to the domain name that was provided to the database; and
using the record to route the call through at least a bearer network.

31. The method of claim 30, wherein the using the record to route the call comprises using the record to determine a uniform resource identifier (URI) and using the URI to route the call.

32. The method of claim 30, wherein the deriving comprises determining the domain name to comprise a plurality of digits of the telephone number.

33. The method of claim 30, wherein the deriving comprises parsing at least a portion of the telephone number to determine the domain name.

34. The method of claim 30, wherein the using the record comprises:
- using the record to determine an access scheme;
- using the access scheme to access a resource; and
- using the resource to route the call through the at least the bearer network.

* * * * *

UNITED STATES PATENT AND TRADEMARK OFFICE
CERTIFICATE OF CORRECTION

PATENT NO.         : 8,938,062 B2
APPLICATION NO.    : 13/525454
DATED              : January 20, 2015
INVENTOR(S)        : Colin Low et al.

It is certified that error appears in the above-identified patent and that said Letters Patent is hereby corrected as shown below:

ON THE TITLE PAGE, ITEM (56)

Page 13, Column 1, Other Publications, Line 10:
    Please delete "Raatikainan," and insert --Raatikainen,--

Page 13, Column 1, Other Publications, Line 45:
    Delete "200704171005814." and insert --20070417/005814.--

Page 13, Column 1, Other Publications, Line 53:
    Delete "CTM20010618S0010" and insert --CTM2001061850010--

Page 13, Column 2, Other Publications, Line 7:
    Delete "1227ba19866a342612" and insert --1227ba19866a3426/2--

Page 13, Column 2, Other Publications, Line 16:
    Delete "http://tools.iettorg/html/rfc1495" and insert
    --http://tools.ietf.org/html/rfc1495--

Page 13, Column 2, Other Publications, Line 23:
    Delete "8bit-MIMEtransport"," and insert --8bit-MIME transports",--

Page 13, Column 2, Other Publications, Line 26-27:
    Delete "http://tools.ietf.org/html/rfd1703" and insert
    --http://tools.ietf.org/html/rfc1703--

Page 14, Column 1, Other Publications, Line 3:
    Delete "Mullett," and insert --Muffett,--

Signed and Sealed this
Twenty-fourth Day of November, 2015

Michelle K. Lee
*Director of the United States Patent and Trademark Office*

CERTIFICATE OF CORRECTION (continued)
U.S. Pat. No. 8,938,062 B2

ON THE TITLE PAGE, ITEM (56)

Page 14, Column 1, Other Publications, Line 61:
    Delete "Tele.com," and insert --Telecom,--

Page 14, Column 2, Other Publications, Line 8:
    Delete "Telephne"," and insert --Telephone",--

Page 14, Column 2, Other Publications, Line 60:
    Delete "Packerization" and insert --Packetization--

Page 15, Column 1, Other Publications, Line 53:
    Delete "Scaleable" and insert --Scalable--

Page 16, Column 1, Other Publications, Line 30:
    Delete "VocalTech" and insert --VocalTec--

Page 16, Column 2, Other Publications, Line 51:
    Delete ""OpenSwitching-Extending" and insert --"Open Switching-Extending--

Page 17, Column 1, Other Publications, Line 1:
    Delete "Structred" and insert --Structured--

Page 17, Column 1, Other Publications, Line 39:
    Delete "ACMConference" and insert --ACM Conference--

Page 17, Column 2, Other Publications, Line 7:
    Delete "E-Commercce" and insert --E-Commerce--

Page 17, Column 2, Other Publications, Line 30:
    Delete "RepresentationStandard," and insert --Representation Standard,--

Page 18, Column 1, Other Publications, Line 30:
    Delete "Commerical" and insert --Commercial--

Page 18, Column 2, Other Publications, Line 1:
    Delete "NRENAISSANCE" and insert --RENAISSANCE--

Page 18, Column 2, Other Publications, Line 12:
    Delete "Oppostion" and insert --Opposition--

Page 18, Column 2, Other Publications, Line 23:
    Delete "Millenium" and insert --Millennium--

CERTIFICATE OF CORRECTION (continued)
U.S. Pat. No. 8,938,062 B2

ON THE TITLE PAGE, ITEM (56)

Page 18, Column 2, Other Publications, Line 62:
    Delete "inthe" and insert --in the--

Page 19, Column 1, Other Publications, Line 22:
    Delete "Url:http://www.Flexnetcom/Exchange-Email-" and
    insert --Url:http://www.Flexnet.com/Exchange-Email- --

Page 19, Column 1, Other Publications, Line 54:
    Delete "IEE" and insert --IEEE--

Page 19, Column 2, Other Publications, Line 22:
    Delete "IEE," and insert --IEEE,--

Page 19, Column 2, Other Publications, Line 23:
    Delete "IEE" and insert --IEEE--

Page 19, Column 2, Other Publications, Line 60:
    Delete "Intemet2" and insert --Internet2--

Page 20, Column 1, Other Publications, Line 7:
    Delete "http:www.cs.columbia.edu/-hgs/" and
    insert --http://www.cs.columbia.edu/~hgs/--

Page 20, Column 1, Other Publications, Line 26:
    Delete ""Rec.0.1211"," and insert --"Rec.Q.1211",--

Page 20, Column 1, Other Publications, Line 43:
    Before "Dean", insert --D.--

Page 20, Column 2, Other Publications, Line 15:
    Delete "0.1211," and insert --Q.1211,--

Page 20, Column 2, Other Publications, Line 16:
    Delete "http://www.kenmccraiy.com/jtella/," and
    insert --http://www.kenmccrary.com/jtella/,--

Page 20, Column 2, Other Publications, Line 28:
    Delete "Holdings!," and insert --Holdings I,--

Page 21, Column 1, Other Publications, Line 25:
    Delete "Yesterdym" and insert --Yesterday--

CERTIFICATE OF CORRECTION (continued)
U.S. Pat. No. 8,938,062 B2

ON THE TITLE PAGE, ITEM (56)

Page 21, Column 1, Other Publications, Line 31:
    Delete "Justifyy" and insert --Justify--

Page 21, Column 1, Other Publications, Line 37:
    Delete "Intelligence" and insert --Intelligent--

Page 21, Column 1, Other Publications, Line 53:
    Delete "Describred" and insert --Described--

Page 21, Column 2, Other Publications, Line 20:
    Delete "TCPIP Illustrated"," and insert --"TCP/IP Illustrated",--

Page 21, Column 2, Other Publications, Line 22:
    Delete "Internati;nal" and insert --International--

Page 22, Column 1, Other Publications, Line 39:
    Delete "i" and insert --in--

Page 22, Column 1, Other Publications, Line 39:
    Delete "mangement" and insert --management--

Page 22, Column 1, Other Publications, Line 54:
    Delete "Ge3neric" and insert --Generic--

Page 22, Column 1, Other Publications, Line 63:
    Delete "ARchives," and insert --Archives,--

Page 22, Column 2, Other Publications, Line 31:
    Delete "Nework" and insert --Network--

Page 22, Column 2, Other Publications, Line 59:
    Delete "transacitons" and insert --transactions--

Page 22, Column 2, Other Publications, Line 59:
    Delete "cybermetics," and insert --cybernetics,--

Page 23, Column 1, Other Publications, Line 22-23:
    Delete "Communiations," and insert --Communications,--

Page 23, Column 1, Other Publications, Line 25:
    Delete "databass" and insert --database--

CERTIFICATE OF CORRECTION (continued)
U.S. Pat. No. 8,938,062 B2

ON THE TITLE PAGE, ITEM (56)

Page 23, Column 1, Other Publications, Line 33:
    Delete "Worshop" and insert --Workshop--

Page 23, Column 1, Other Publications, Line 37:
    Delete "transalation" and insert --translation--

Page 23, Column 1, Other Publications, Line 60:
    Delete "achitectures" and insert --architectures--

Page 23, Column 1, Other Publications, Line 68:
    Delete "Interworkin,"" and insert --Interworking,"--

Page 23, Column 2, Other Publications, Line 5-6:
    Delete "Clarificiations" and insert --Clarifications--

Page 24, Column 2, Other Publications, Line 30:
    Delete "appera, Communcations" and insert --appear Communications--

Page 24, Column 2, Other Publications, Line 52:
    Delete "LLV" and insert --LLC--

Page 26, Column 1, Other Publications, Line 56:
    Delete "Rebutal" and insert --Rebuttal--

Page 26, Column 2, Other Publications, Line 50:
    Delete "EP 020005682" and insert --EP 02000568.2--

Page 26, Column 2, Other Publications, Line 71:
    Delete "xp000458691." and insert --XP000458691.--

Page 27, Column 1, Other Publications, Line 67:
    Delete "Worlwide," and insert --Worldwide--

Page 27, Column 2, Other Publications, Line 16:
    Delete "amd" and insert --and--

Page 27, Column 2, Other Publications, Line 40:
    Delete "Apprioach" and insert --Approach--

Page 27, Column 2, Other Publications, Line 45:
    Delete "Architecure" and insert --Architecture--

CERTIFICATE OF CORRECTION (continued)
U.S. Pat. No. 8,938,062 B2

ON THE TITLE PAGE, ITEM (56)

Page 27, Column 2, Other Publications, Line 70:
    Delete "Optomizations," and insert --Optimizations,--

Page 28, Column 2, Other Publications, Line 23:
    Delete "Serivce" and insert --Service--